US006823984B2

(12) United States Patent
Nozawa et al.

(10) Patent No.: US 6,823,984 B2
(45) Date of Patent: Nov. 30, 2004

(54) AUTOMATIC DEVELOPING DEVICE, ROLLER WASHING METHOD, PHOTOSENSITIVE MATERIAL PROCESSING DEVICE, AND PREPARATION METHOD FOR PROCESSING LIQUID

(75) Inventors: Ryoei Nozawa, Kanagawa (JP); Shinichi Matsuda, Kanagawa (JP); Takayuki Iwamoto, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 135 days.

(21) Appl. No.: 10/105,966

(22) Filed: Mar. 26, 2002

(65) Prior Publication Data

US 2002/0148822 A1 Oct. 17, 2002

(30) Foreign Application Priority Data

| | | | |
|---|---|---|---|
| Mar. 28, 2001 | (JP) | ...................................... | 2001-093149 |
| Mar. 28, 2001 | (JP) | ...................................... | 2001-093151 |
| Mar. 30, 2001 | (JP) | ...................................... | 2001-101656 |
| Mar. 30, 2001 | (JP) | ...................................... | 2001-101657 |
| Mar. 30, 2001 | (JP) | ...................................... | 2001-101658 |
| Mar. 30, 2001 | (JP) | ...................................... | 2001-101660 |
| Jun. 27, 2001 | (JP) | ...................................... | 2001-194996 |

(51) Int. Cl.$^7$ ................................................ B65G 37/00

(52) U.S. Cl. ........................ 198/577; 198/571; 198/784

(58) Field of Search ................................ 198/571, 572, 198/577, 783, 784, 780

(56) References Cited

FOREIGN PATENT DOCUMENTS

JP 06-332193 A 12/1994

*Primary Examiner*—James R. Bidwell

(74) *Attorney, Agent, or Firm*—Sughrue Mion, PLLC

(57) ABSTRACT

A photosensitive material processing device for processing a photosensitive material with a processing liquid while conveying the photosensitive material by a roller pair. A driving device for providing a rotation drive to the roller pair. A drive controlling device that gradually raises voltage of the electric power at the time of starting the rotation drive of the roller pair.

7 Claims, 32 Drawing Sheets

FIG. 32

REPLENISHING PATTERN

| REPLENISHING PATTERN | TYPE OF PLATE PRECURSOR | | | SUPPLY AMOUNT (ADJUSTING REPLENISHMENT AMOUNT) |
|---|---|---|---|---|
| P1 | COMMONLY USED PS PLATE PRECURSOR | POSITIVE TYPE | BOTH SIDES | 0.5 LITTER OF WATER + 1.0 LITTER OF REPLENISHING LIQUID (1:12) |
| P2 | | | ONE SIDE | 0.5 LITTER OF WATER + 2.0 LITTER OF REPLENISHING LIQUID (1:12) |
| P3 | | NEGATIVE TYPE | BOTH SIDES | 0.5 LITTER OF WATER + 1.0 LITTER OF REPLENISHING LIQUID (1:1) |
| P4 | | | ONE SIDE | 0.5 LITTER OF WATER + 2.0 LITTER OF REPLENISHING LIQUID (1:1) |
| P5 | THERMAL PLATE PRECURSOR | POSITIVE TYPE | ONE SIDE | 0.5 LITTER OF WATER + 2.0 LITTER OF REPLENISHING LIQUID (1:12) |
| P6 | | NEGATIVE TYPE | ONE SIDE | 0.5 LITTER OF WATER + 2.0 LITTER OF REPLENISHING LIQUID (1:12) |
| P7 | PHOTO POLYMER PLATE PRECURSOR | NEGATIVE TYPE | ONE SIDE | 0.5 LITTER OF WATER + 2.0 LITTERS OF REPLENISHING LIQUID (1:100) OR 2.5 LITTERS OF WATER |

THE DILUTING RATIO OF THE REPLENISHING LIQUID IS SHOWN IN THE PARENTHESES.

AUTOMATIC DEVELOPING DEVICE, ROLLER WASHING METHOD, PHOTOSENSITIVE MATERIAL PROCESSING DEVICE, AND PREPARATION METHOD FOR PROCESSING LIQUID

BACKGROUND OF THE INVENTION

1. Field of the Invention

The present invention relates to an automatic developing device provided with a preheating section for heating a photosensitive planographic printing plate prior to a developing process. Moreover, it relates to an automatic developing device provided with a pre-water washing section in addition to the preheating section.

Moreover, the present invention relates to a photosensitive material processing device for processing a photosensitive material such as a photosensitive planographic printing plate with a processing liquid while being conveyed by a roller. More specifically, it relates to a roller washing method for eliminating the processing liquid adhered to the roller.

Furthermore, the present invention relates to a photosensitive material processing device for processing a photosensitive material by soaking in a processing liquid. More specifically, it relates to a photosensitive material processing device for circulating a processing liquid by suctioning the processing liquid in a processing vessel and jetting into the processing vessel.

Moreover, the present invention relates to a photosensitive material processing device for processing a photosensitive material while being conveyed by transmitting driving force to a conveying roller for the photosensitive material disposed along the conveying path of the photosensitive material.

Furthermore, the present invention relates to a photosensitive material processing device for processing a photosensitive material such as a photosensitive planographic printing plate with a processing liquid while being conveyed by a roller pair.

Moreover, the present invention relates to a preparation method for a processing liquid for preparing a processing liquid according to the capacity of a processing vessel of the above-mentioned processing device.

2. Description of the Related Art

According to a photosensitive planographic printing plate comprising a photosensitive layer formed on a supporting body made of an aluminum, or the like, a light receiving part and a light unreceiving part are produced in the photosensitive layer by exposure, and thereafter the unnecessary photosensitive layer is eliminated by performing a developing process with a developing liquid so as to form an image.

Among the photosensitive planographic printing plates, there is a so-called photo polymer plate comprising a photosensitive layer of a photo adhesion layer, a photo polymerization layer, or the like, and further with the surface protection by an overcoat layer. According to the photo polymer plate, the printing resistance is improved by firmly bonding the photo polymerization layer of the light receiving part onto the supporting body via the photo adhesion layer by being heated to a predetermined temperature. Moreover, the overcoat layer covering the photo polymerization layer is water-soluble.

Therefore, according to an automatic developing device for processing the photo polymer plate, a preheating section and a pre-water washing section are provided on the upstream side with respect to the developing section for reliably eliminating the photo polymerization layer of the light unreceiving part at the time of the developing process by eliminating the overcoat layer by brushing the surface of the photo polymer plate while supplying washing water after heating the photo polymer plate prior to the developing process.

The preheating section provided in such an automatic developing device in general heats the photo polymer plate by the radiation heat discharged from a far infrared radiation heater, and by the zone temperature in the preheating section.

The operation of heating the photo polymer plate by the preheating section is controlled by the heating temperature and the heating time. However, in order to heat in a short time, a high zone temperature should be provided. Under a high zone temperature, the rear end portion of the aluminum plate passing through the preheating section is heated to a high temperature due to the heat conduction of the aluminum plate as the supporting body of the photo polymer plate, and the rear end portion easily exceeds the upper limit temperature.

Moreover, the photo polymer plate can easily wrinkle by the thermal expansion at the time of heating, or by nipping by the conveying roller pair while being heated. Furthermore, when dispatching the highly heated plates to the pre-water washing section, adhering water to the heated plate therein results in stains.

When the heating process is attempted with a lowered heating temperature in order to avoid such a problem (first problem), the heating operation needs a longer performing time, and thus the preheating section requires a larger space.

Further, the photo polymer plates have different thermal capacities depending on the supporting body thickness and the plate size. Consequently, the heating temperature needs to be adjusted according to the thickness and the size for heating at appropriate temperature and of an appropriate duration. Therefore this adjustment of the heating temperature complicates the heating process for the photo polymer plate.

Next, among the photosensitive materials, there is a photosensitive planographic printing plate (hereinafter referred to as a "PS plate") comprising a photosensitive layer on a supporting body made of an aluminum or the like. A PS plate processor as a photosensitive material processing device for processing the PS plate comprises a plurality of processing steps such as developing, water washing, desensitizing processes and the like. The PS plate after imagewise exposure is treated in the developing step of processing the PS plate by soaking in a developing liquid. water washing, desensitizing process using a processing liquid, such as a developing step of processing the PS plate by soaking in a developing liquid, a water washing step of applying a water washing process by blowing washing water onto the PS plate, a desensitizing step of performing a desensitizing process by coating a desensitizing process liquid such as a gum liquid onto the surface of the PS plate after the water washing process.

According to the desensitizing process step for the PS plate, a thin film for protecting the plate surface is formed on the front and rear surfaces of the PS plate by coating a gum liquid evenly on the front and rear surfaces of the PS plate while conveying the PS plate by a conveying roller pair disposed outside the stored gum liquid, and squeezing off the excessive gum liquid by the conveying roller pair.

Here, when the gum liquid used for the desensitizing process for the PS plate is adhered to the circumferential surface of the conveying roller pair (roller), problems such as rotation disability of the roller pair, conveyance failure, pollution, damage and the like of the PS plate may occur. Therefore, in the PS plate processor, the circumferential surface of the roller to which the gum liquid adheres is washed with a washing liquid according to a preset schedule such as the time of stopping the drive of the PS plate after finishing the PS plate processes so as to wash off the gum liquid from the roller surface.

Additionally, among the PS plates, there is one having a width of about 1100 mm orthogonal to the conveyance direction. In a PS plate processor for processing such a PS plate, the length along the axis direction of the roller for conveying the PS plate is elongated as well. The elongated roller has difficulty in evenly supplying a washing liquid in the axis. Thus a larger amount of the washing liquid is used for removing the gum liquid from the roller successfully. Consequently, the amount of waste liquid increases as well.

Moreover, among the PS plate processors, there is one using the washing liquid after washing the roller as a diluting liquid for the gum liquid. According to this PS plate processor, a problem exists that the gum liquid can be diluted excessively due to the large amount of the washing liquid for removing the gum liquid from the roller (second problem).

Next, the PS plate is treated in the developing process after the image-wise exposure. According to the PS plate processor for treating the PS plate, the developing process is performed while conveying the PS plate soaked in the developing liquid stored in the developing vessel.

A heater and the like for heating the developing liquid to a predetermined temperature is provided in the developing vessel so as to maintain a temperature range of the optimum processing state of the PS plate. Moreover, according to the PS plate processor, the developing liquid in the developing vessel is agitated by suctioning the developing liquid in the developing vessel and jetting the developing liquid from a spray pipe disposed on one side of the PS plate conveying path in the developing vessel so as to prevent developing irregularity due to the temperature irregularity and the like.

In a submerged spray method where a developing liquid is sprayed from a spray pipe with an axis direction disposed along the PS plate width direction, the developing liquid on one side can not easily be agitated in the direction orthogonal to the axis direction while the developing liquid on the other side of the PS plate can easily be agitated. Due to this, substituting the developing liquid may delay.

Therefore, when an environmental temperature is lower than the developing liquid temperature, the developing liquid temperature will differ at the circumferential rim of the PS plate. Such a temperature difference will lead to a sensitivity difference in the PS plate after the developing process. As a result the finish quality of the PS plate will be deteriorated. For example, the temperature difference of about 0.2° C. causes the sensitivity difference of about 5 to 10%.

In contrast, a lateral jetting method allows jetting a developing liquid in the direction orthogonal to the PS plate conveyance direction from an outer side of the PS plate width direction. As a result the temperature difference in the circumferential rim of the PS plate can be prevented even with a low environmental temperature since substituting the developing liquid can be performed rapidly in the vicinity of the PS plate surface.

However, in the lateral jetting method, difference occurs in the flow rate of jetted developing liquid; one rate in the vicinity of the jetting opening differs from another rate at a position away from the jetting opening. The developing liquid flow rate difference will lead to the difference in the progress of development. That is, the development is promoted in a region with a higher developing liquid flow rate compared with another region with a lower developing liquid flow rate. Consequently, the sensitivity difference will appear locally (third problem)

Next, the PS plate processor as the photosensitive material processing device for processing the PS plate comprises a pair of side plates for laying the PS plate on the conveying roller for conveyance. The pair of side plates is disposed in a processing vessel for storing a processing liquid such as a developing liquid. With the driving force transmitted to the conveying roller, the conveying roller conveys the PS plate.

In such a PS plate processor, the convenience of maintaining the driving system generally leads to disposing a drive shaft along the PS plate conveyance direction and on one end side of the direction orthogonal to the PS plate conveyance direction. The drive shaft transmits the driving force to each conveying roller. Here, by providing a worm gear in the drive shaft and a helical gear in the side plates, and elongating the rotation shaft provided with the helical gear in the direction orthogonal to the PS plate conveyance direction, the driving force is transmitted to the conveying roller.

Here, in the combination of the worm gear and the helical gear, the speed reduction ratio is 4 to 12 times. That is, the worm gear on the driving source side transmits the driving force to the helical gear on the side plate side, reducing the speed.

Furthermore, in the PS plate processor, conveyance failure of the PS plate such as jamming may occur. In this case, removing the jammed PS plate immediately can resume processing of the PS plate.

However, when the so-called jamming as the PS plate conveyance failure occurs, the roller will be locked. At the time, a large torque acts on the helical gear side since the speed reduction ratio is large in the driving system using a combination of the worm gear and the helical gear. As a result, the helical gear or the other gears on the side plate side may be damaged (fourth problem).

Next, a gum liquid used for the desensitizing process of the PS plate includes a component of a gum arabic or the like. When rotating the conveying roller pair is stopped with the gum liquid adhered to the surface of the conveying roller pair and the adhered liquid is left as it is, the component in the gum liquid will precipitate and fix on the circumferential surface of the roller.

Accordingly, if the gum liquid is adhered to the contact part of the rollers comprising the conveying roller pair, the rollers can attach to each other due to the gum liquid. With this attaching state, rotating the conveying roller pair causes a large torque on a gear for transmitting the driving force to the rollers so as to result in breakage of the gear (fifth problem).

The PS plates include conventionally existing commonly used PS plates (conventional), thermal plates, and photo polymer plates. The commonly used PS plates include the positive type and the negative type. And furthermore, each of them has a one side type provided with a photosensitive layer on one surface of the supporting body, and a both side type provided with a photosensitive layer on both surfaces. Moreover, the photo polymer plates are, in general, a one surface type (one side type) and a negative type, but the thermal plates are one surface type (one side type) and both negative type and positive type.

The PS processors include for example, those including a conveying path for the PS plate with conveying roller pairs in a developing vessel, those including a conveying path with conveying rollers and guide plates, and those with brush rollers, depending on the kind of the PS plate to be processed. Moreover, the number of the brush rollers depends on the kind of the PS plate (such as the one side type or the both side type).

That is, among the PS plate processors, despite of a common processing tank such as a developing vessel, there are those including arranging of conveying rollers and brush rollers corresponding to the kind of the PS plates to be processed. Furthermore, modifying the conveying path configuration has been discussed and practiced so as to make the PS plate processor capable of processing different PS plates.

In the PS plate processors, a replenishing liquid is replenished according to the PS plate process amount and for compensating the aging deterioration of the developing liquid as well as the developing liquid in the developing vessel is replaced per certain period. Consequently, the processing performance of the developing liquid is always maintained so as to enable the optimum developing process.

The basic liquid of the developing liquid and the replenishing liquid for replenishment to be introduced into the developing vessel at the time of periodical replacing the developing liquid may be those prepared by diluting a common original liquid with a common diluting ratio. Diluting ratios may be different between the basic liquid and the replenishing liquid. Further, the basic liquid may differ from the replenishing liquid.

In general, a certain amount of the original liquid for the basic liquid is contained in a bottle. When a preparation liquid as the basic liquid for processing the PS plate is newly prepared, the original liquid and the diluting water are preliminarily prepared according to the capacity of the developing vessel and the preparation liquid is supplied to the developing vessel. If the developing vessel capacity changes, the preparation liquid must be prepared according to the changed capacity.

That is, although the original capacity of the developing vessel in the processing tank remains the same, the net capacity of the developing vessel (the storable amount of the developing liquid) depends on the number of the rollers, guide plates, and brush rollers to be disposed inside the developing vessel. Therefore, for the PS plate processors with different developing vessel capacities, it is difficult to commonly use a preparation device for preparing a preset amount of the preparation liquid.

Therefore, a method of preparing the preparation liquid by directly introducing the original liquid and the diluting water into the developing vessel is conceivable.

Here, the PS plate processor is provided with a replenishing mechanism for supplying the original liquid and the water (diluting water) for replenishing the replenishing liquid to the developing vessel. In the replenishing mechanism, the replenishing liquid (the original liquid and the water for dilution) can be supplied accurately to the developing vessel using a bellows pump corresponding to the PS plate processing amount and the time.

When the preparation liquid is prepared in the developing vessel, a large amount of water should be supplied in a short time into the developing vessel with the original liquid preliminarily stored. Accordingly, the water is supplied using a magnet pump, monitoring the liquid level with a float sensor.

However, when a pump with high ejection ability such as a magnet pump makes it difficult to supply an amount of water accurately and appropriately to the original liquid with the liquid level monitored. Moreover, when the diluting ratio of a predetermined amount of the original liquid depends on the kind of the PS plate, the amount of the diluting water to be added to the original liquid must be changed. This hinders versatility of a device for replenishing (sixth problem).

SUMMARY OF THE INVENTION

In view of the above-mentioned fact (first problem), the present invention has been achieved. A first objective thereof is to provide an automatic developing device comprising a preheating section capable of achieving a compactness, and capable of performing a heating process or performing the heating process and a water washing process, with an appropriate temperature range with respect to a photosensitive planographic printing plate.

The present invention has also been achieved in view of the above-mentioned fact (second problem). A second objective thereof is to provide a roller washing method capable of washing reliably the circumferential surface of rollers without increasing the waste liquid amount of the washing water after washing the rollers.

The present invention has also been achieved in view of the above-mentioned fact (third problem). A third objective thereof is to provide a photosensitive material processing device capable of processing uniformly at the time of processing the photosensitive material such as a PS plate with a processing liquid jetted from a spray pipe, or the like, while circulating the processing liquid in the processing vessel.

The present invention has also been achieved in view of the above-mentioned fact (fourth problem). A fourth objective thereof is to provide a photosensitive material processing device without the risk of damaging the driving system even when jamming of the photosensitive material occurs.

The present invention has also been achieved in view of the above-mentioned fact (fifth problem). A fifth objective thereof is to provide a photosensitive material processing device capable of smoothly starting the drive without the risk of damaging the gear for transmitting the driving force to the roller pairs when the component in the processing liquid such as the gum liquid precipitates to fix the roller pairs.

The present invention has also been achieved in view of the above-mentioned fact (sixth problem). A sixth objective thereof is to provide a processing liquid preparation method enabling providing a processing tank with versatile members as well as versatile preparation of a preparation liquid and the like by supplying the original liquid and the water in the processing vessel in the photosensitive material processing device.

According to a first aspect of the present invention, there is provided an automatic developing device, including a preheating section and a developing section, for processing an imagewise exposed planographic printing plate, comprising: a heating chamber providing the preheating section; a heating device provided in the heating chamber capable of heating the photosensitive planographic printing plate by discharging the radiation heat to a conveying path of the printing plate; a circulator for circulating air in the heating chamber by blowing the air in the heating chamber toward the conveying path of the printing plate; a temperature detecting device for detecting the temperature in the heating chamber; and a temperature controller for maintaining an inside of the heating chamber at a predetermined temperature by controlling the heating device and the circulator based on the temperature detected by the temperature detecting device.

According to the invention, the heating device for discharging the radiation heat and the circulator for circulating the air in the heating chamber are provided in the heating chamber comprising the preheating section. The temperature controller controls the circulator and the heating device such that the temperature in the heating chamber detected by the temperature detecting device is maintained at a predetermined temperature.

Here, the photosensitive planographic printing plate sent into the heating chamber is heated by the radiation heat discharged from the heating device as well as the air maintained at the predetermined temperature by the circulator is blown onto the photosensitive planographic printing plate for eliminating the air of a relatively low temperature from the outside of the heating chamber in the vicinity of the surface of the photosensitive planographic printing plate so as to promote heating of the photosensitive planographic printing plate.

Thereby, the photosensitive planographic printing plate can be heated to the predetermined temperature efficiently in a short time so that compactness of the preheating section can be facilitated. Moreover, since the predetermined temperature can be maintained while agitating the air in the heating chamber, a large thermal capacity can be provided to the heating chamber so that the temperature change of the air in the heating chamber can be restrained even when the thickness or the size of the photosensitive planographic printing plate is changed. Thus adjustment of the heating temperature, or the like is unnecessary even when the thickness or the size of the supporting body of the photosensitive planographic printing plate is changed, and the developing work of the photosensitive planographic printing plate can be simplified.

In the first aspect of the present invention, it is preferable that at least one of the rollers of the roller pair for nipping and conveying the photosensitive planographic printing plate sent out from the heating chamber is a skewered roller comprising a plurality of short rollers.

According to the invention, at least one roller of the roller pair for nipping the photosensitive planographic printing plate sent out from the heating chamber is a skewered roller comprising a plurality of short rollers disposed along the axial direction.

Thereby, deformation stress generation can be restrained at the time the photosensitive planographic printing plate is sent out from the heating chamber so as to be shrunk.

At the time, it is further preferable that each of the short rollers is provided movably along the axial direction. Thereby, the deformation stress of the photosensitive planographic printing plate can be discharged reliably so as to prevent deformation, such as warpage of the photosensitive planographic printing plate after preheating.

In the first aspect of the present invention, it is preferable that a cooling device disposed between the heating chamber and the roller pair including the skewered roller, is provided for blowing the cooling air toward the photosensitive planographic printing plate sent out from the heating chamber.

According to the invention, the cooling device is provided on the downstream side of the heating chamber so that cooling of the photosensitive planographic printing plate sent out from the heating chamber can be facilitated by the cooling device. Thereby, the temperature of the high temperature photosensitive planographic printing plate sent out from the heating chamber can be lowered quickly to a room temperature level, and stain caused by adherence of water on the high temperature photosensitive planographic printing plate in the pre-water washing section can be prevented.

Moreover, since the high temperature photosensitive planographic printing plate can be cooled down before contacting with the water in the pre-water washing section, deformation such as wrinkles in the photosensitive planographic printing plate by quenching, can be prevented.

In the first aspect of the present invention, it is further preferable that the conveying path of the photosensitive planographic printing plate in the heating chamber is a skewered roller comprising a plurality of short rollers disposed along the conveyance direction of the photosensitive planographic printing plate.

According to the invention, the conveying path of the photosensitive planographic printing plate in the heating chamber is a skewered roller comprising a plurality of short rollers so that the photosensitive planographic printing plate can be conveyed by the skewered roller while being supported. Thereby, generation of wrinkles on the photosensitive planographic printing plate being heated due to nipping by the roller pair can be prevented reliably.

In the present invention, as to the control of the heating device and the circulator for maintaining the air in the heating chamber at a predetermined temperature, conventionally known optional methods can be adopted.

According to the first aspect of the present invention, there is provided an automatic developing device for further preferably performing a developing process at a developing section after providing a heating process at a preheating section and providing a washing process at a pre-water washing section while conveying a photosensitive planographic printing plate with an image exposed, wherein a conveying device for conveying the photosensitive planographic printing plate after the heating process at the preheating section obliquely downward while being contacted with the conveying roller disposed zigzag, is provided at the upstream part of the pre-water washing section.

According to the invention, the photosensitive planographic printing plate sent out from the preheating section is conveyed by the conveying device with the conveying roller disposed zigzag. Wrinkles may form in the photosensitive planographic printing plate if the photosensitive planographic printing plate to be conveyed at a high temperature after being heated by the preheating section is nipped by the conveying roller pair. The conveying device, however, provides the conveyance force by disposing the conveying roller zigzag without nipping the photosensitive planographic printing plate. Consequently, finishing failures such as the wrinkles will not form in the photosensitive planographic printing plate.

In the first aspect of the present invention, it is further preferable that the conveying roller disposed zigzag comprises a skewered roller facing one surface of the photosensitive planographic printing plate, and a rubber roller facing the other surface.

According to the invention, the conveying path for the photosensitive planographic printing plate is provided by the skewered roller facing one surface of the photosensitive planographic printing plate and the rubber roller facing the other surface. Thereby, the conveyance force can be provided reliably without generating wrinkles or the like in the photosensitive planographic printing plate at the time the photosensitive planographic printing plate shrinks due to the temperature drop.

As to the conveying device, it is preferable that skewered roller faces the photosensitive layer side surface of the photosensitive planographic printing plate and the rubber roller faces the surface on the opposite side with respect to the photosensitive layer.

In the first aspect of the present invention, it is more preferable that a conveying roller pair disposed on the downstream side of the conveying path inclined obliquely downward of the photosensitive planographic printing plate, and a water supply device for supplying the washing water to the surface of the photosensitive planographic printing plate being conveyed in the inclined state, are provided.

According to the invention, the photosensitive planographic printing plate is conveyed in the inclined state between the conveying device with the conveying roller disposed zigzag, and the conveying roller pair provided on the downstream side of the conveying device. The water supply device supplies the washing water to the photosensitive planographic printing plate being conveyed on the inclined conveying path.

Thereby, since the washing water remains on the surface of the photosensitive planographic printing plate between the upper side roller of the conveying roller pair and the photosensitive planographic printing plate inclined downward, the water soluble overcoat layer can easily be dissolved by reliably soaking the upper surface of the photosensitive planographic printing plate in the washing water. Moreover, since the interval is ensured between the washing water remained on the surface of the photosensitive planographic printing plate supplied from the water supply device, and the conveying roller disposed zigzag, so as not to adhere the washing water on the conveying roller, irregularity generation on the surface of the photosensitive planographic printing plate due to adherence of the washing water on the photosensitive planographic printing plate in the high temperature state via the conveying rollers can be prevented.

In the first aspect of the present invention, it is further preferable that one roller of the conveying roller pair is a brush roller for brushing the surface of the photosensitive planographic printing plate with the washing water supplied.

According to the invention, since the brush roller brushes the surface of the photosensitive planographic printing plate soaked in the washing water, the washing effect can be obtained reliably.

In the device of the first aspect according to the present invention, it is more preferable that a supporting guide facing the lower side surface of the photosensitive planographic printing plate being conveyed along the inclined conveying path and facing the conveying path, for supporting and guiding the rear end part of the photosensitive planographic printing plate sent out by the conveying device, and a receiving plate disposed between the inclined conveying path and the liquid surface of the washing water collected from the photosensitive planographic printing plate, for receiving the washing water falling from the photosensitive planographic printing plate, are provided. Thereby, scattering of the washing water supplied to the photosensitive planographic printing plate, and bubbling of the washing water can be prevented so that finish failure of the photosensitive planographic printing plate derived from the scattered washing water, the washing water bubbling, or the like, can be prevented.

According to a second aspect of the present invention, there is provided a roller washing method in a photosensitive material processing device for processing a photosensitive material with a processing liquid while conveying the photosensitive material with a roller, wherein the surface of the roller disposed outside the processing liquid is washed with washing water. In the washing method, an idle roller disposed in contact with the circumferential surface of the roller, to be rotated following the roller is provided so that the circumferential surface of the roller is washed by rotation drive of the roller with the washing water supplied in the contact part of the roller and the idle roller.

According to the invention, the idle roller to be rotated integrally with the roller is provided facing the circumferential surface of the roller to be washed so that the washing water can be supplied between the roller and the idle roller. Thereby, the washing water stays at the contact part of the roller and the idle roller so as to be spread at the contact part along the axial direction.

By rotating the roller in this state, the washing water can be adhered in the roller circumferential direction so that the entire region of the roller circumferential surface can be washed with the washing water adhered.

Therefore, even with a roller lengthy in the axial direction, the washing operation can be performed efficiently and reliably with a relatively small amount of washing water.

In the second aspect of the present invention, it is also possible to wash the roller circumferential surface by supplying the washing water by a predetermined time interval while rotating the roller. Moreover, in the present invention, it is also possible to wash the roller circumferential surface by starting the rotation drive of the roller after passage of a predetermined time after starting the washing water supply. Furthermore, it is also possible to wash the roller circumferential surface by repeating the washing water supply and the roller rotation drive each by a predetermined time interval.

Moreover, the washing method of the second aspect according to the present invention can be achieved by comprising a driving device for the rotation drive of the roller, an idle roller to be rotated following the rotation of the roller, with the axis disposed parallel with the axis of the roller, a supply device for supplying the washing water between the roller and the idle roller, and a washing controller for washing the roller by controlling the operation of the supply device and the driving device by a predetermined timing.

At the time, as to the supply device, it is more preferable that the washing water is supplied to a plurality of points along the roller axis direction.

According to a device of a third aspect of the present invention, there is provided a photosensitive material processing device for processing a photosensitive material by circulating a processing liquid in the processing vessel by a circulating device for suctioning a processing liquid in a processing vessel for jetting the same into the processing vessel, wherein a jetting opening for jetting the processing liquid is provided in a middle part in the width direction of the photosensitive material on one side of the conveying path of the photosensitive material so that the processing liquid can be jetted from the jetting opening toward the side wall of the processing vessel.

According to the invention, the jetting opening for jetting the processing liquid is provided in the middle part in the width direction of the photosensitive material on one side of the conveying path of the photosensitive material. The processing liquid is jetted from the jetting opening toward the side wall of the processing vessel along the photosensitive material width direction.

Thereby, the processing liquid jetted from the jetting opening is reflected by the side wall of the processing vessel toward the conveying path of the photosensitive material so as to flow moderately along the photosensitive material surface on the other side of the conveying path of the photosensitive material.

Therefore, flow rate of the processing liquid of the front surface does not differ from that of the rear surface of the photosensitive material so that sensitivity difference derived from the processing liquid flow rate difference cannot be caused in the photosensitive material.

The jetting opening of the third aspect of the present invention can be formed on the tip end of a jetting pipe provided projecting from the other side wall side of the processing vessel.

Moreover, in the device of the third aspect according to the present invention, when a plurality of jetting pipes each capable of jetting the processing liquid are provided in the processing vessel, the jetting opening can be provided in at least one of the jetting pipes.

It is more preferable that the jetting pipe provided with the jetting opening is disposed on the downstream side with respect to the middle part along the conveyance direction of the photosensitive material. That is, since the sensitivity difference derived from the processing liquid flow rate difference can easily be caused on the downstream side with the photosensitive material process proceeded, the sensitivity difference can accurately be restrained.

In the third aspect of the present invention, it is preferable that a suction opening for suctioning the processing liquid jetted from the jetting opening is provided between the jetting opening and the side wall in the opposite direction with respect to the processing liquid jetting direction from the jetting opening.

According to the invention, the suction opening is provided between the jetting opening and the other side wall. That is, the jetting pipe is provided projecting from the other side wall side to a position exceeding the suction opening.

Thereby, the processing liquid jetted from the jetting opening can be provided along the width direction of the photosensitive material toward the side wall of one side so that the processing liquid can be circulated and agitated efficiently.

In the third aspect of the present invention, it is more preferable that a guide plate disposed between a pair of side plates of a processing rack in the processing vessel, for guiding the photosensitive material along the conveyance direction, is provided between the jetting opening and the conveying path of the photosensitive material.

According to the invention, the jetting opening is disposed on the side opposite to the conveying path of the photosensitive material with respect to the guide plate for guiding the photosensitive material. Thereby, direct contact with the photosensitive material of the processing liquid of a high flow rate, jetted from the jetting opening can reliably be prevented.

In the third aspect of the present invention, it is preferable to form a notch part between a pair of the side plates of the processing rack and the guide plate, for communicating the upper surface side and the lower surface side of the guide plate. Thereby, the processing liquid jetted from the jetting opening can be supplied to the conveying path of the photosensitive material.

Moreover, in the third aspect of the present invention, it is possible that a through hole for allowing passage of the processing liquid between the side wall side of the processing vessel of the side plate and the conveyance side of the photosensitive material is formed in the pair of the side plates of the processing rack instead of the notch part.

According to a fourth aspect of the present invention, there is provided a photosensitive material processing device for processing a photosensitive material while conveying by transmitting the driving force of the driving source to the conveying roller provided between the pair of the side plates, comprising a worm gear provided on a shaft to be rotated by the driving force of the driving source, a helical gear supported integrally rotatably with a rotation shaft provided between the pair of the side plates so as to be engaged with the worm gear for transmitting the rotation force to the conveying roller, and an urging device for forcing the helical gear to the direction of engaging with the worm gear as well as having at least the shaft and the rotation shaft relatively rotatably when a predetermined amount or more of the rotation torque is applied between the helical gear and the worm gear.

According to the invention, the driving force is transmitted to the conveying roller by mounting the worm gear on the shaft to be rotated by the driving force of the driving source, and engaging the worm gear with the helical gear in the driving system with the helical gear mounted on the side plates.

At the time, the helical gear is engaged integrally rotatably with the worm gear according to the urging force of the urging device. Moreover, the urging device is provided such that the shaft provided with the worm gear, and the rotation shaft provided with the helical gear are provided relatively rotatably when a predetermined amount or more of the torque is applied to the helical gear.

Thereby, application of the torque of a predetermined amount or more on the helical gear can be prevented when the conveying roller placed between the pair of the side plates is locked due to jamming, or the like so that damage of the helical gear or the other gears can be prevented due to application of a large torque. Moreover, application of a large load on the driving source via the shaft can be prevented.

In the forth aspect of the present invention, it is preferable that the urging device forces the helical gear away from the worm gear.

According to the fourth aspect of the present invention, when a predetermined amount or more of the torque is applied on the helical gear, the helical gear is moved away from the worm gear, resisting to the urging force. Thereby, application of a predetermined amount or more of the torque on the helical gear can reliably be prevented.

In the fourth aspect of the present invention, the helical gear may comprise a base plate to be mounted rotatably, and the urging device may be provided between the base plate and the side plates so that the base plate is forced by a predetermined urging force such that the helical gear is engaged with the worm gear.

In the fourth aspect of the present invention, it is further preferable that the urging device is a one way clutch mechanism provided either between the shaft and the worm gear, or between the helical gear and the rotation shaft.

According to the fourth aspect of the present invention, the one way clutch mechanism is provided either between the shaft and the worm gear, or between the rotation shaft and the helical gear. In general, the one way clutch mechanism is rotated integrally in the positive direction, and relatively in the negative direction. However, the urging force of the urging device is set such that relative rotation can be provided when a predetermined amount or more of the torque is applied with respect to the positive direction.

According to a device of a fifth aspect of the present invention, there is provided a photosensitive material processing device for processing a photosensitive material with a processing liquid while conveying by a roller pair, comprising a driving device for the rotation drive of the roller by the drive of a driving source by supplying electric power of a predetermined voltage, and a drive controlling device for gradually raising the voltage of the electric power supplied to the driving source at the time of starting the rotation drive of the roller pair.

According to the invention, at the time of processing the photosensitive material again with the processing liquid by stopping the rotation drive of the roller pair after processing the photosensitive material with the processing liquid while being conveyed by the roller pair, the driving source of the driving device is operated for the rotation drive of the roller pair. At the time, the drive controller gradually raises the voltage of the electric power supplied to the driving source. Thereby, rotation with the rotational frequency of the roller gradually raised can be enabled at the time the rollers comprising the roller pair are not attached with each other at the contact part.

Moreover, when the rollers are attached with each other at the contact part by the processing liquid or a component in the processing liquid, since gradual raise of the output of the driving source (output torque) for drastically providing a large output torque to the driving device such as the gears for transmitting the driving force to the roller can be prevented, the gears will not be damaged.

Moreover, since the torque is provided gradually also to the roller pair, the rollers can be detached with each other without damaging the surface of the rollers so as to solve the attached state.

According to the device of the fifth aspect of the present invention, a zero cross detecting device for detecting the zero cross point of the alternating current voltage input as the driving electric power, and a setting device for setting the electric power supply time of each half cycle of the alternating current voltage at the time of starting the drive of the driving source when of using an alternating current motor driven by the alternating current electric power as the driving source, are provided such that the drive controller drives the driving source by repeating the supply and the blockage of the alternating current electric power based on the setting result of the setting device and the detection result of the zero cross detecting device.

According to the invention, the electric power supply time in the half cycle of the alternating current voltage is set so that the supply and the blockage of the electric power is controlled in the half cycle of the alternating current voltage by the electric power supply time. At the time, by gradually prolonging the electric power supply time, the alternating current voltage (effective value) is raised gradually.

Accordingly, by performing the supply and the blockage of the electric power in the half cycle of the alternating current voltage, generation of the rotation irregularity or the output irregularity of the driving source can be restrained so that the driving force can be provided stably to the roller pair.

The fifth aspect of the present invention is not limited thereto, but various controlling methods can be adopted. For example, the effective value of the alternating current voltage to be supplied to the driving source can be controlled by the ratio of the on cycle and the off cycle by providing an on cycle for providing the electric power and an off cycle for shielding the electric power supply in the alternating current voltage.

By adopting such a control method, for example, the torque to be applied on the roller can be enlarged gradually with fluctuation by generating the output irregularity of the driving source, the attached state of the rollers can be released effectively.

According to sixth aspect of the present invention, there is provided a processing liquid preparation method for preparing a processing liquid stored in a processing vessel by introducing an original liquid and diluting water for diluting the original liquid in the processing vessel, comprising a step of supplying a predetermined amount of the original liquid and an amount of the diluting water adjusted to the amount of the original liquid in the processing vessel, and a step of adjusting replenishment by supplying the original liquid for the replenishment and the diluting water for diluting the original liquid for the replenishment by a diluting ratio according to the kind of the photosensitive material to be processed.

According to the method, a certain amount of the diluting water is added to a predetermined amount of the original liquid in the processing vessel. The supply of the diluting water at the time can be performed in a short time by using a supply device with high ejection ability, such as a magnet pump.

After adding a certain amount of the diluting water to a predetermined amount of the original liquid, the adjusting replenishment is performed for the residual amount to a desired amount by a diluting ratio according to the kind of the photosensitive material. The adjusting replenishment can be performed by the original liquid for the replenishment and the diluting water for diluting the original liquid for the replenishment. Thereby, a desired amount of the processing liquid can be prepared in the processing vessel.

Moreover, the processing liquid preparation method of a sixth aspect of the present invention is a processing liquid preparation method for preparing a processing liquid stored in a processing vessel by introducing an original liquid and diluting water for diluting the original liquid in the processing vessel, comprising a step of supplying a predetermined amount of the original liquid and a certain amount of the diluting water in the processing vessel and supplying the original liquid for the replenishment and the diluting water for diluting the original liquid for the replenishment by a diluting ratio according to the kind of the photosensitive material to be processed, and a step of adjusting replenishment for supplying the original liquid for the replenishment or the diluting water for diluting the original liquid for the replenishment according to the detection result by an electric conductivity sensor.

According to the invention, a certain amount of the diluting water is added to a predetermined amount of the original liquid in the processing vessel. Then, for the residual amount to the desired amount, the original liquid for the replenishment and the diluting water for diluting the original liquid for the replenishment are supplied by the diluting ratio according to the kind of the photosensitive material. Thereafter, when a targeted electric conductivity is not obtained with reference to the electric conductivity detected by the electric conductivity sensor, the adjusting replenishment for supplying the original liquid for the replenishment or the diluting water is performed according to the detection result.

Thereby, a desired amount of the processing liquid can be prepared in the processing vessel by a desired electric conductivity.

In the sixth aspect of the present invention, it is preferable that the certain amount of the diluting water is set based on the amount of the processing liquid with the least processing liquid capacity stored in the processing vessel.

According to the invention, it is preferable that the certain amount of the diluting water supplied to the processing vessel is set smaller than the least processing liquid amount by for example, 0.2 l (litter) to 0.5 l.

Moreover, in the sixth aspect of the present invention, a liquid level detecting device for detecting attainment of the predetermined amount of the processing liquid amount in the processing vessel is provided in the processing vessel so that the diluting water is supplied in addition to the original liquid until the processing liquid can reach the predetermined amount according to the liquid level to be detected by the liquid level detecting device.

Furthermore, in the sixth aspect of the present invention, it is preferable that the adjusting replenishment is performed using a replenishing device for supplying the original liquid for the replenishment and the diluting water to the processing vessel so that the adjusting replenishment can be performed accurately without the need of additionally providing a mechanism for the adjusting replenishment.

BRIEF DESCRIPTION OF THE DRAWINGS

FIG. 32 is a table showing an example of the replenishing pattern at the time of the adjusting replenishment.

DESCRIPTION OF THE PREFERRED EMBODIMENTS

Hereinafter, embodiments of the present invention will be explained with reference to the drawings.

First Embodiment

Figure 1:
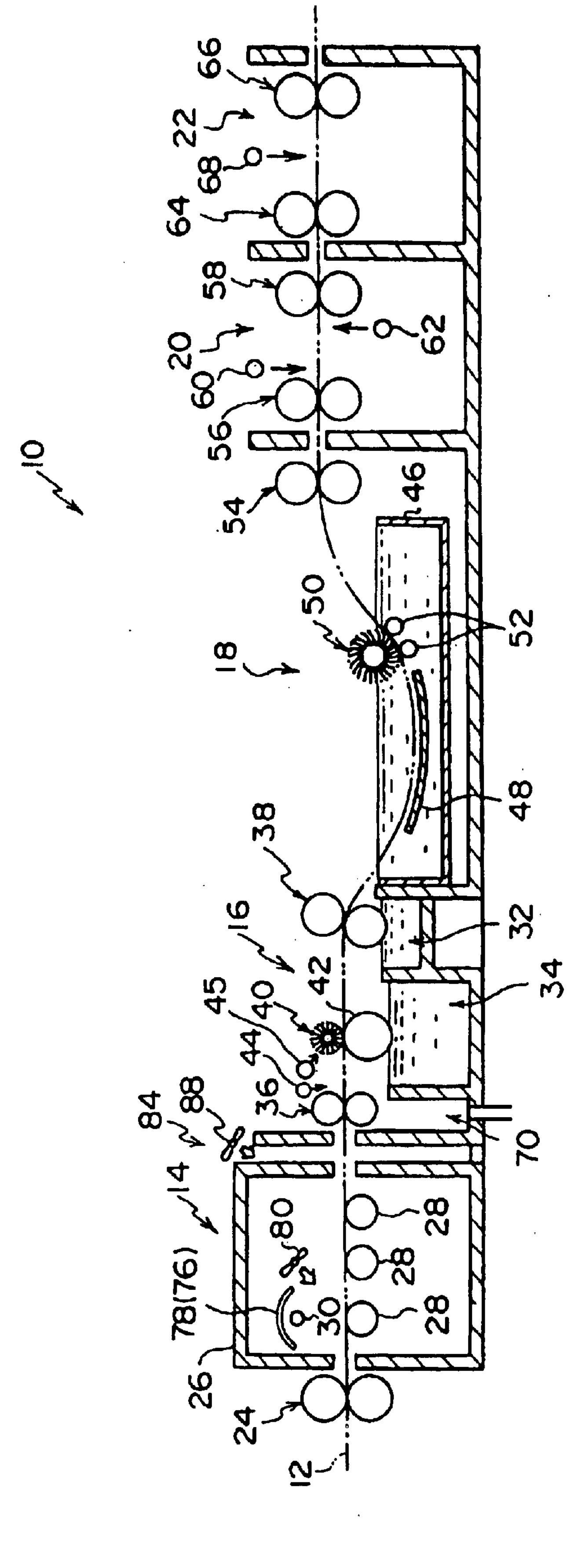
FIG. 1 is a schematic diagram showing the configuration of an automatic developing device adopted in a first embodiment.

FIG. 1 shows the schematic configuration of an automatic developing device 10 adopted in the first embodiment. The automatic developing device 10 is used for the developing process of the so-called photo polymer plate (hereinafter referred to as the "photo polymer plate 12") comprising an aluminum plate, or the like as the supporting body, a photo adhesion layer and a photo polymerization layer superimposed on one side surface of the supporting body, and further an overcoat layer superimposed on the photo polymerization layer as the photosensitive planographic printing plate.

In the photo polymer plate 12 with the four-layer structure, the polymerization reaction of the image portion of the photo polymerization layer is promoted by the image-wise exposure by a laser beam or the like. The image-wise exposure for the photo polymer plate 12 is performed by scanning a laser beam with a setter or the like based on the digital image information.

The automatic developing device 10 comprises a preheating section 14, a pre-water washing section 16, a developing section 18, a rinsing section 20 and a finisher section 22 along the photo polymer plate 12 conveyance direction. The photo polymer plate 12 is nipped by an inserting roller pair 24 and sent into a heating chamber 26 of the preheating section 14 to be treated by a developing process of the automatic developing device 10.

Figure 3:
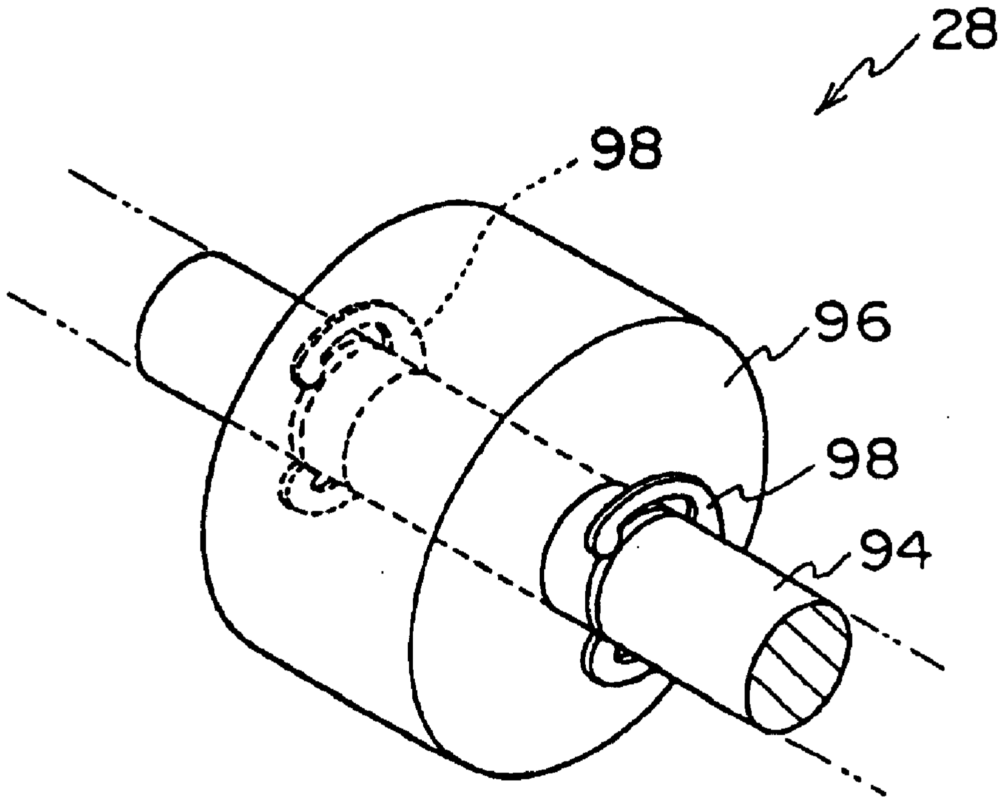
FIG. 3 is a schematic perspective view showing the essential part of a skewered roller adopted in the present embodiment.

In the preheating section 14, a plurality of skewered rollers 28 are provided in the heating chamber 26. As shown in FIG. 3, each of the skewered rollers 28 is provided as a short roller 96 pivoted by the rotation shaft 94 with an interval provided. Moreover, a pair of E rings 98, or the like is fitted onto the rotation shaft 94 so as to interpose the short roller 96 at a predetermined interval. Thereby, each of the skewered rollers 28 has the short roller 96 slightly movable along the axis of the rotation shaft 94.

Figure 2:
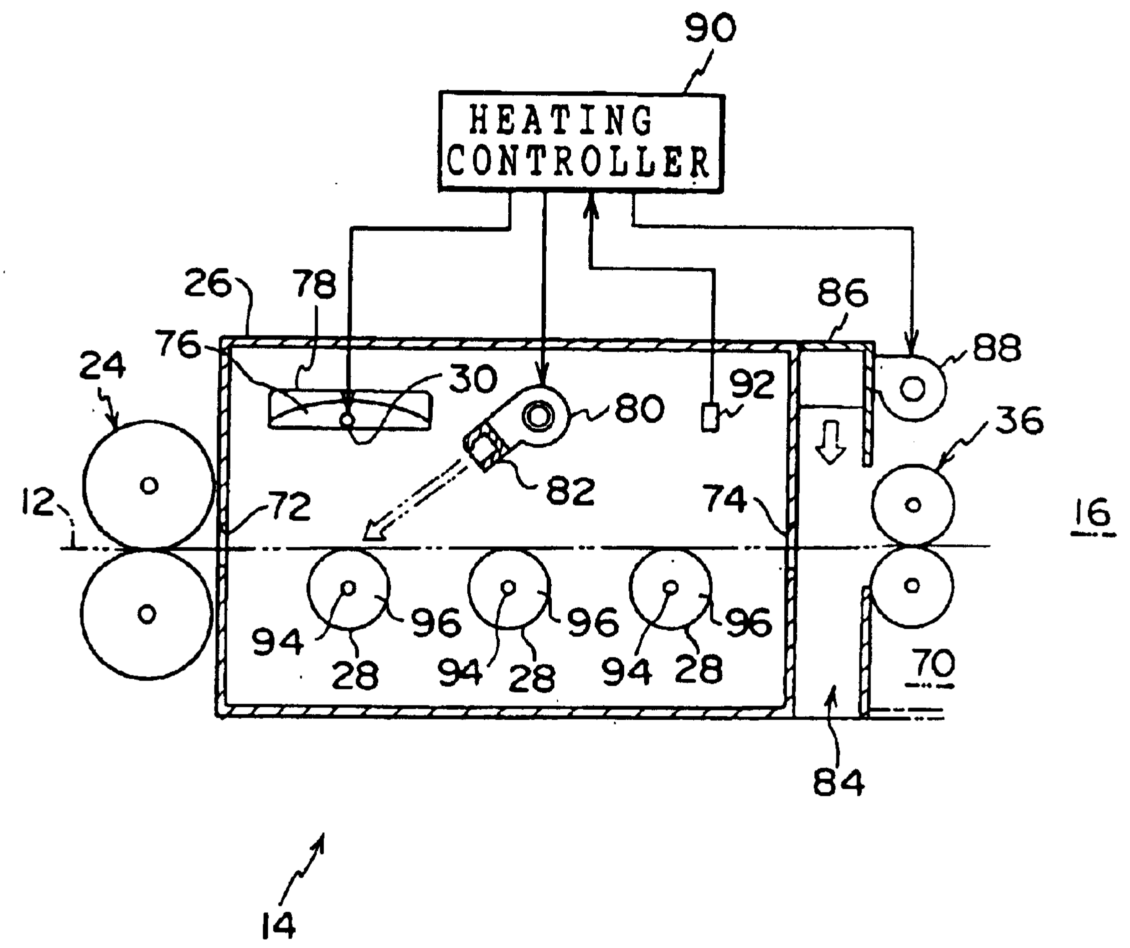
FIG. 2 is a schematic diagram showing the configuration of the essential part of a preheating part adopted in the present invention.

As shown in FIG. 1 and FIG. 2, in the heating chamber 26, the conveying path for the photo polymer plate 12 comprises a plurality of the skewered rollers 28. The photo polymer plate 12 sent into the heating chamber 26 by the inserting roller pair 24 is conveyed to the pre-water washing section 16 while being supported substantially horizontally by the skewered rollers 28.

Moreover, in the preheating section 14, a far infrared ray heater 30 is provided as a heating device in the heating chamber 26. Thereby, the photo polymer plate 12 is heated to a predetermined temperature at the time of passing through the heating chamber 26. Details of the preheating section 14 will be described later.

The pre-water washing section 16 comprises a conveying roller pair 36 on the preheating section 14 side, and a conveying roller pair 38 on the developing section 18 side. Thereby, the photo polymer plate 12 is nipped by the conveying roller pair 36 so as to be conveyed toward the conveying roller pair 38 while being introduced into the pre-water washing section 16. Further, the conveying roller pair 38 sends out the photo polymer plate 12, on a slant, conveyed through the pre-water washing section 16 toward the developing section 18.

In the pre-water washing section 16, a brush roller 40 and a backup roller 42 are disposed between the conveying roller pairs 36, 38. A spray pipe 44 and a spray pipe 45 are disposed between the conveying roller pair 36 and the brush roller 40.

Further, the pre-water washing section 16 comprises a post-water washing vessel 32, a pre-water washing vessel 34 and an overflow vessel 70 disposed successively from the developing section 18 side. Washing water for the washing process of the photo polymer plate 12 is stored in the post-water washing vessel 32 and the pre-water washing vessel 34. The lower side roller of the conveying roller pair 38 is partially soaked in the washing water in the post-water washing vessel 32. Additionally, the washing water in the pre-water washing vessel 34 is supplied to the spray pipes 44, 45.

In the pre-water washing section 16, supplying the washing water in the pre-water washing vessel 34 to the spray pipe 44, the spray pipe 44 sprays the washing water onto the surface of the photo polymer plate 12. Thereby, the water soluble overcoat layer on the surface of the photo polymer plate 12 can dissolve easily. Furthermore, the washing water is supplied from the spray pipe 45 to the brush roller 40 by supplying the washing water in the pre-water washing vessel 34 to the spray pipe 45.

In this structure, the brush roller 40 brushes the surface of the photo polymer plate 12 nipped by the brush roller 40 and the backup roller 42. With the washing water supplied from the spray pipe 45, the brush roller 40 eliminates the overcoat layer dissolving easily by the washing water from the spray pipe 44. Moreover, the washing water sprayed from the spray pipe 45 is collected into the pre-water washing vessel 34 together with the overcoat layer eliminated by the brush roller 40.

In the pre-water washing section 16, the photo polymer plate 12 brushed by the brush roller 40 is sent into the developing section 18 while being nipped by the conveying roller pair 38. When the conveying roller pair 38 is not activated for conveying the photo polymer plate 12, the conveying roller pair 38 is washed with the washing water in the post-water washing vessel 32. For this washing, the washing water is pumped up to the lower side roller of the conveying roller pair 38 to wet the upper side roller of the conveying roller pair 38.

Next, in the pre-water washing section 16, for example, the processing amount (processing area, or the like) of the photo polymer plate 12 is detected. Water to be the washing water is replenished to the post-water washing vessel 32 when the processing amount reached at a preset value. Thereby, by overflowing the excessive washing water in the post-water washing vessel 32 to the pre-water washing vessel 34, the washing water can be replenished to the pre-water washing vessel 34. Furthermore, by overflowing the washing water from the pre-water washing vessel 34 to the overflow vessel 70, the overcoat layer eliminated from the photo polymer plate 12, and the washing water with the overcoat layer dissolved can be discharged.

Accordingly, in the pre-water washing section 16, by replenishing the washing water with this cascade method to supply the washing water with a low concentration of the overcoat layer dissolved from the photo polymer plate 12 to the conveying roller pair 38, the conveyance failure is prevented from happening due to adhesion of the overcoat layer component to the conveying roller pair 38.

In the developing section 18, a developing vessel 46 storing the developing liquid is provided. The conveying roller pair 38 conveys the photo polymer plate 12 toward the developing vessel 46. By being soaked in the developing liquid, the light unreceiving part of the photo polymerization layer of the photo polymer plate 12 swells so as to be eliminated. In the developing section 18, the photo polymerization layer of the light unreceiving part is eliminated from the photo polymer plate 12.

In the developing vessel 46, a guide plate 48 is provided at an inlet of the photo polymer plate 12. Further, in the developing vessel 46, a brush roller 50 and a roll roller 52 are provided on the downstream side of the guide plate 48. Like the skewered rollers 28 disposed in the heating chamber 26, the roll roller 52 is a skewered roller with a plurality of short rollers spaced at an interval along the axis direction of the rotation shaft. Furthermore, the roll roller 52 is slightly movable along the axis direction of the rotation shaft by E rings, or the like, fitted on the rotation shaft so as to face with each other at both ends of the short roller.

The guide roller 48 guides the photo polymer plate 12 conveyed into the developing vessel 46 to a position between the brush roller 50 and the roll roller 52 while smoothly curving the photo polymer plate 12 in a large arc soaked in the developing liquid.

The brush roller 50 rotates to brush the surface of the photo polymer plate 12 while nipping the photo polymer plate 12 with the roll roller 52 by a predetermined pressure. Thereby, the photo polymerization layer of the light unreceiving part swelled by the developing liquid is eliminated by the brush roller 50 from the photo polymer plate 12. The brush roller 50 can reliably eliminate the unnecessary light unreceiving part in the vicinity of the boundary between the light receiving part and the light unreceiving part.

In the developing section 18, a conveying roller pair 54 is provided on the rinsing section 20 side. The conveying roller pair 54 nips the photo polymer plate 12 conveyed from the developing vessel 46 and brushed by the brush roller 50 in order to convey the same into the rinsing section 20. Besides this conveyance, the conveying roller pair 54 also serves for squeezing out the developing liquid from the surface of the photo polymer plate 12.

The rinsing section 20 is provided with conveying roller pairs 56, 58. The conveying roller pairs 56, 58 convey the photo polymer plate 12 coming in the rinsing section 20 in the substantially horizontal state.

Moreover, spray pipes 60, 62 are provided in the rinsing section 20 between the conveying roller pairs 56, 58. The spray pipes 60, 62 are provided above and below with respect to the conveying path of the photo polymer plate 12 for spraying the washing water as the rinsing liquid toward the front and rear surfaces of the photo polymer plate 12 conveyed in the rinsing section 20. Thereby, the photo polymer plate 12 are ready to be conveyed to the finisher section 22 after having the front and rear surfaces washed.

In the finisher section 22, conveying roller pairs 64, 66 are provided. The conveying roller pairs 64, 66 convey the photo polymer plate 12 coming into the finisher section 22 in the substantially horizontal state.

Moreover, a spray pipe 68 is provided between the conveying roller pairs 64, 66 in the finisher section 22. The spray pipe 68 is provided on the upper side of the conveying path of the photo polymer plate 12 for spraying the finisher liquid toward the upper surface of the photo polymer plate 12 conveyed in the finisher section 22. Thereby, the image forming surface of the photo polymer plate 12 is coated with the finisher liquid.

To the photo polymer plate 12 after the developing process mentioned above is subject to a drying process by a drying device (not shown) or the like.

As shown in FIG. 2, an inlet 72 is formed on the inserting roller pair 24 side, and an outlet 74 is formed on the pre-water washing section 16 side in the heating chamber 26 of the preheating section 14. The above-mentioned skewered rollers 28 are disposed rotatably at a predetermined interval between the inlet 72 and the outlet 74.

Thereby, the photo polymer plate 12 conveyed into the heating chamber 26 by the inserting roller pair 24 is guided toward the outlet 74 in the substantially horizontal state while being supported by the skewered rollers 28 so as to be handed to the conveying roller pair 36. The conveying roller pair 36 nips the photo polymer plate 12 so as to draw it out from the heating chamber 26 and convey it into the pre-water washing section 16.

Next, the far infrared ray heater 30 as the heating device is disposed on the inlet 72 side of the heating chamber 26. The far infrared ray heater 30 is arranged with the longitudinal direction thereof along the width direction orthogonal to the conveying path of the photo polymer plate 12. Due to this arrangement, the entire region of the photo polymer plate 12 along the width direction can be heated when the photo polymer plate 12 is inserted to be heated in the heating chamber 26 by the inserting roller pair 24. Moreover, the upper side of the far infrared ray heater 30 is covered with a cover 78 with a reflection plate 76.

Accordingly, the radiation heat is discharged from the far infrared ray heater 30 toward the conveying path of the photo polymer plate 12 so as to heat the air in the heating chamber 26. The photo polymer plate 12 is brought into the heating chamber 26 to be heated by the radiation heat discharged from the far infrared ray heater 30.

A circulation fan 80 is provided in the central upper part of the heating chamber 26. The circulation fan 80 comprises a chamber 82 along a blowing direction such that the air is blown from the chamber 82 into the heating chamber 26 by sending the air in the heating chamber 26 to the chamber 82.

By operating the circulation fan 80 in the heating chamber 26 with the far infrared ray heater 30 radiating the heat, the air inside the heating chamber 26 can be agitated while being heated so as to reach a uniform temperature.

The chamber 82 diffuses the blowing air along the width direction of the photo polymer plate 12 as the direction orthogonal to the conveyance direction of the photo polymer plate 12.

Furthermore, the chamber 82 is oriented to the upstream side of the conveyance direction of the photo polymer plate 12 (inlet 72 side of the heating chamber 26). Thereby, while heating the photo polymer plate 12 inserted from the inlet 72 by the radiation heat of the far infrared ray heater 30, the cold air drawn from the outside of the heating chamber 26 on the surface of the photo polymer plate 12 can be eliminated by blowing the heated air in the heating chamber 26 by the circulation fan 80. In this embodiment, as an example thereof, an angle of the heated air blowing from the chamber 82 is substantially 45° with respect to the photo polymer plate 12 conveyance direction. Although the blowing angle is preferably in the range between 30° and 80° with respect to the photo polymer plate 12 conveyance direction, it may be parallel with the conveyance direction, orthogonal to the conveyance direction, or any orientation.

Next, the preheating section 14 comprises a cooling section 84 next to the heating chamber 26 (FIG. 2). The cooling section 84 comprises a chamber 86 above the conveying path of the photo polymer plate 12 delivered from the outlet 74 of the heating chamber 26. The lower side of the chamber 86 is formed hollow. Moreover, a cooling fan 88 as a cooling device supplies cooling air to the chamber 86.

Thereby, the chamber 86 blows the cooling air supplied from the cooling fan 88 onto the photo polymer plate 12 drawn from the heating chamber 26 while diffusing the cooling air substantially uniformly along the width direction of the photo polymer plate 12. The cooling air is blown to lower the temperature of the photo polymer plate 12 drawn from the heating chamber 26.

The upper side roller 36A of the conveying roller pair 36 in the pre-water washing section 16 is a skewered roller having the structure substantially same as that of the skewered rollers 28 in the above-mentioned preheating section 14.

Thereby, even with shrinkage of the supporting body or the photosensitive layer of the photo polymer plate 12 due to being cooled in the cooling section 84, the wrinkles of the photo polymer plate 12 can be prevented when the conveying roller pair 36 nips to convey the photo polymer plate 12.

In the preheating section 14, a heating controller 90 is provided such that the far infrared ray heater 30, the circulation fan 80 and the cooling fan 88 are connected to the heating controller 90.

Moreover, the heating chamber 26 of the preheating section 14 comprises a temperature sensor 92 as a temperature detecting device for detecting the temperature in the heating chamber 26, with the temperature sensor 92 connected to the heating controller 90.

The heating controller 90 with the temperature sensor 92 controls the operation of the far infrared ray heater 30 and the circulation fan 80 so as to maintain the heating chamber 26 at a predetermined temperature.

The photo polymer plate 12 adopted in this embodiment can increase the printing resistance by appropriately hardening the photo polymerization layer in the light receiving part without the wrinkles under a heating temperature in a range between 80° C. and 120° C. with a heating time not less than 8 seconds, preferably not less than 10 seconds.

Therefore, the heating controller 90 is to have a temperature measured by the temperature sensor 92 at 120° C. or less. That is, the heating controller 90 controls such that the temperature of the air in the heating chamber 26 cannot exceed the upper limit heating temperature (120° C.) for the photo polymer plate 12.

The automatic developing device 10 comprises a plate detecting sensor (not shown) in the vicinity of the upstream side of the inserting roller pair 24. Driving of the conveying rollers, including the inserting roller pair 24, for the photo polymer plate 12 can start by detecting the photo polymer plate 12 with the plate detecting sensor. A method known to the public can be applied for controlling the cooling fan 88. In such a method, the heating controller 90 controls the operation of the cooling fan 88 when forwarding the photo polymer plate 12 detected by the plate detecting sensor from the outlet 74 of the heating chamber 26; the heating controller 90 stops the cooling fan 88 when forwarding the rear end of the photo polymer plate 12 by the conveying roller pair 36 to the pre-water washing section 16.

In the automatic developing device 10 arranged as described, when the photo polymer plate 12 after the imagewise exposure is inserted to the preheating section 14, the photo polymer plate 12 is heated so as to increase the printing resistance by increasing the polymerization degree of the photo polymerization layer in the light receiving part.

The photo polymer plate 12 passed through the preheating section 14 is conveyed into the pre-water washing section 16 for swelling the surface overcoat layer by the washing water sprayed from the spray pipe 44, and thereafter it is brushed with the brush roller 40. Thereby, the overcoat layer of the photo polymer plate 12 is eliminated.

Moreover, the photo polymer plate 12 after being brushed is conveyed into the developing section 18 while being nipped by the conveying roller pair 38. At the time, in the pre-water washing section 16, the photo polymer plate 12 is washed with the washing water pumped up from the post-water washing vessel 32, and the washing water is squeezed off by the conveying roller pair 38.

Furthermore, the washing water including the overcoat layer eluted from the photo polymer plate 12 is adhered to the conveying roller pair 38. The polluted washing water including the overcoat layer component adhered to the conveying roller pair 38 is washed off with the fresh washing water pumped up from the post-water washing vessel 32 by the lower roller of the conveying roller pair 38 when the photo polymer plate 12 is not passing through. Thereby, the conveyance failure such as slippage of the photo polymer plate 12 to be nipped and conveyed by the conveying roller pair 38 due to adherence of the overcoat layer component having the slime to the conveying roller pair 38 can be prevented. Adherence of the precipitated overcoat layer component to the photo polymer plate 12 or flaw of the photo polymer plate 12 can also be prevented when the rotation drive of the conveying roller pair 38 is stopped.

The photo polymer plate 12 after finishing the pre-water washing is conveyed into the developing section 18 so as to be soaked in the developing liquid in the developing vessel 46 for having the photo polymerization layer of the light unreceiving part swelled. Thereafter, by being brushed by the brush roller 50, the photo polymerization layer of the swelled light unreceiving part is eliminated so that an image can be formed by the exposed photo polymerization layer.

The photo polymer plate 12 from the developing section 18 has the front and rear surfaces washed by blowing the washing water sprayed from the spray pipes 60, 62 while being conveyed in the rinsing section 20 by the conveying roller pairs 56, 58 in the substantially horizontal state. Accordingly, the photo polymerization layer of the unexposed part is reliably washed off.

The photo polymer plate 12 after finishing the rinsing process is coated with a finisher liquid (desensitizing liquid) from the spray pipe 68 while being conveyed by the conveying roller pairs 64, 66 in the substantially horizontal state in the finisher section 22. Thereby, the image forming surface of the photo polymer plate 12 is coated with the finisher liquid, and it is conveyed from the automatic developing device 10.

In the preheating section 14, prior to the process of the photo polymer plate 12, the far infrared ray heater 30 and the circulation fan 80 are operated based on the temperature detected by the temperature sensor 92 in order to maintain the temperature of the air in the heating chamber 26 at 120° C., the upper limit temperature, for heating the photo polymer plate 12.

In the heating chamber 26, the conveying path of the photo polymer plate 12 comprises a plurality of the skewered rollers 28. The photo polymer plate 12 conveying path in the heating chamber 26 has the distance (conveying path length) set such that the heating time can be 10 sec or longer based on a photo polymer plate 12 conveyance speed.

The photo polymer plate 12 nipped by the inserting roller pair 24 is conveyed through the heating chamber 26 while being supported by the skewered rollers 28 with the upper surface side opened.

In the heating chamber 26, the far infrared ray heater 30 is provided at the inlet 72 side. The photo polymer plate 12 can be heated by the radiation heat from the far infrared ray heater 30 by being introduced from the inlet 72 into the heating chamber 26. Furthermore, to the photo polymer plate 12 introduced into the heating chamber 26, the heated air (warm air) in the heating chamber 26 is blown to the photo polymer plate 12 by the circulation fan 80.

Thereby, the air of a relatively low temperature in the vicinity of the surface of the photo polymer plate 12 drawn from the outside of the heating chamber 26 is eliminated effectively to promote the heating operation up to a predetermined temperature. Since the air temperature of the heating chamber 26, as the temperature of the warm air blown by the circulation fan 80, is maintained at the upper limit of the temperature for heating the photo polymer plate 12, the photo polymer plate 12 is heated rapidly to the upper limit temperature. Even if the heating temperature by the far infrared ray heater 30 is higher than the upper limit, the air temperature of the heating chamber 26 will not exceed the upper limit of the heating temperature.

The photo polymer plate 12 heated by the far infrared ray heater 30 is conveyed further through the heating chamber 26. The photo polymer plate 12 is conveyed while receiving the heat of the air in the heating chamber 26 with the predetermined temperature maintained and the heat from the skewered rollers 28 heated by the air in the heating chamber 26.

Next, the photo polymer plate 12 is delivered from the heating chamber 26 while being heated in a predetermined temperature range (80° C. to 120° C.) by a predetermined time. Therefore, only the photo polymerization layer of the light unreceiving part can be eliminated reliably in the developing section. This is because the photo polymer plate 12 from the heating chamber 26 has the increased polymerization degree of the photo polymerization layer of the light receiving part so as to harden properly for improving the printing resistance as well as making the boundary of the light unreceiving part clear.

At the time, wrinkles do not form on the photo polymer plate 12 due to nipping force since the skewered rollers 28 convey and support the photo polymer plate 12 in the heating chamber 26 without nipping of roller pairs.

In other words, expansion and shrinkage (mainly expansion) of the photo polymer plate 12 due to heating are unevenly suppressed if the roller pairs nip the photo polymer plate 12 in the heating chamber 26. Instead, the skewered rollers 28 deal with the photo polymer plate 12, and the photo polymer plate 12 will not deform with such wrinkles due to uneven influence of nipping.

Moreover, the thickness or the size of the supporting body of the photo polymer plate 12 hardly influences the heating temperature in the preheating section 26. This is because the air circulated in the heating chamber 26 additionally warms the photo polymer plate 12 to the far infrared ray heater 30.

In other words, the temperature of the surrounding air of the photo polymer plate 12 will not change regardless of the thickness or the size while the photo polymer plate 12 cools the surrounding air. This is because warm air is continuously supplied to the vicinity of the photo polymer plate 12. Due to this, the photo polymer plate 12 can be maintained at an appropriate heating temperature.

Next, the cooling section 84 is provided between the heating chamber 26 and the pre-water washing section 26 in the preheating section 14. The cooling section 84 blows the cooling air onto the surface of the photo polymer plate 12 before conveying the photo polymer plate 12 from the heating chamber 26 to the pre-water washing section 16.

Thereby, the photo polymer plate 12 heated in the heating chamber 26 is rapidly cooled after conveyed into the pre-water washing section 16. Despite the washing water adhered to the surface of the photo polymer plate 12 in the pre-water washing section 16, the cooling reliably prevents stains on the photo polymerization layer due to the washing water from occurring.

Therefore, ensuring the cooling time for the photo polymer plate 12 does not require elongating a conveying path while conveying the photo polymer plate 12 from the preheating section 14 to the pre-water washing section 16. Consequently, a compact structure is achieved between the preheating section 14 and the pre-water washing section 16.

As described above, according to the automatic developing device 10 adopted in this embodiment, the photo polymer plate 12 can be heated in an appropriate temperature range in the preheating section 14 regardless of the size or the thickness of the supporting body. The space for heating the photo polymer plate 12 is minimized as well. That is, the preheating section 14 is formed with a size enough for ensuring the heating time corresponding to the conveyance speed without changing the conveyance speed of the photo polymer plate 12, which can influence the processing steps after the preheating section 14.

The first embodiment heretofore explained shows an application of the present invention, and thus the configuration of the present invention is not limited thereby. For example, the far infrared ray heater 30 as the heating device in the first embodiment is not the only the heating device. Alternatives exist as long as they use radiational heating for the air in the heating chamber 26 and the photo polymer plate 12.

Moreover, in the first embodiment the two skewered rollers are provided on the upper side of the conveying path of the photo polymer plate 12 between the preheating section 14 and the pre-water washing section 16, and the rubber roller is provided between the two skewered rollers on the lower side of the conveying path. Rollers are not limited thereto. Alternatives exist as long as they convey the photo polymer plate 12 heated in the preheating section 14 with releasing the deformation stress due to cooling after heating in the preheating section 14. For example, a rubber roller may be under the conveying path of the photo polymer plate 12, and a skewered roller of a plurality of short rollers may be above and in the center of the width of the conveying path, opposing the rubber roller. The skewered roller is shorter than the rubber roller.

Moreover, although the circulation fan 80 is used as the air circulator and the cooling fan 88 is used as the cooling device in the first embodiment, the circulator and the cooling device are not limited thereto. Many other devices are applicable as long as they include a mechanism for circulating air so as to make the temperature in the heating chamber 26 uniform and for supplying the warm air appropriately to the surface of the photo polymer plate 12 when the photo polymer plate 12 is conveyed into the heating chamber 26. Many other devices are applicable as the cooling device as long as they are capable of cooling the photo polymer plate 12 heated to the predetermined temperature appropriately when the photo polymer plate 12 is delivered into the pre-water washing section 16.

For the steps of the pre-water washing section 16 to the finisher section 22 after the preheating section 14, structuring the automatic developing device to which the present invention is applied is not limited to one for the photo polymer plate 12. Modifying the automatic developing device is possible in accordance with a photosensitive planographic printing plate requiring the preheating operation.

Second Embodiment

Next, a second embodiment will be explained. Since the second embodiment has the same basic configuration as that of the first embodiment, the same numeral is given to the same member as in the first embodiment in the following description, and explanation for the same member is omitted.

Figure 4:
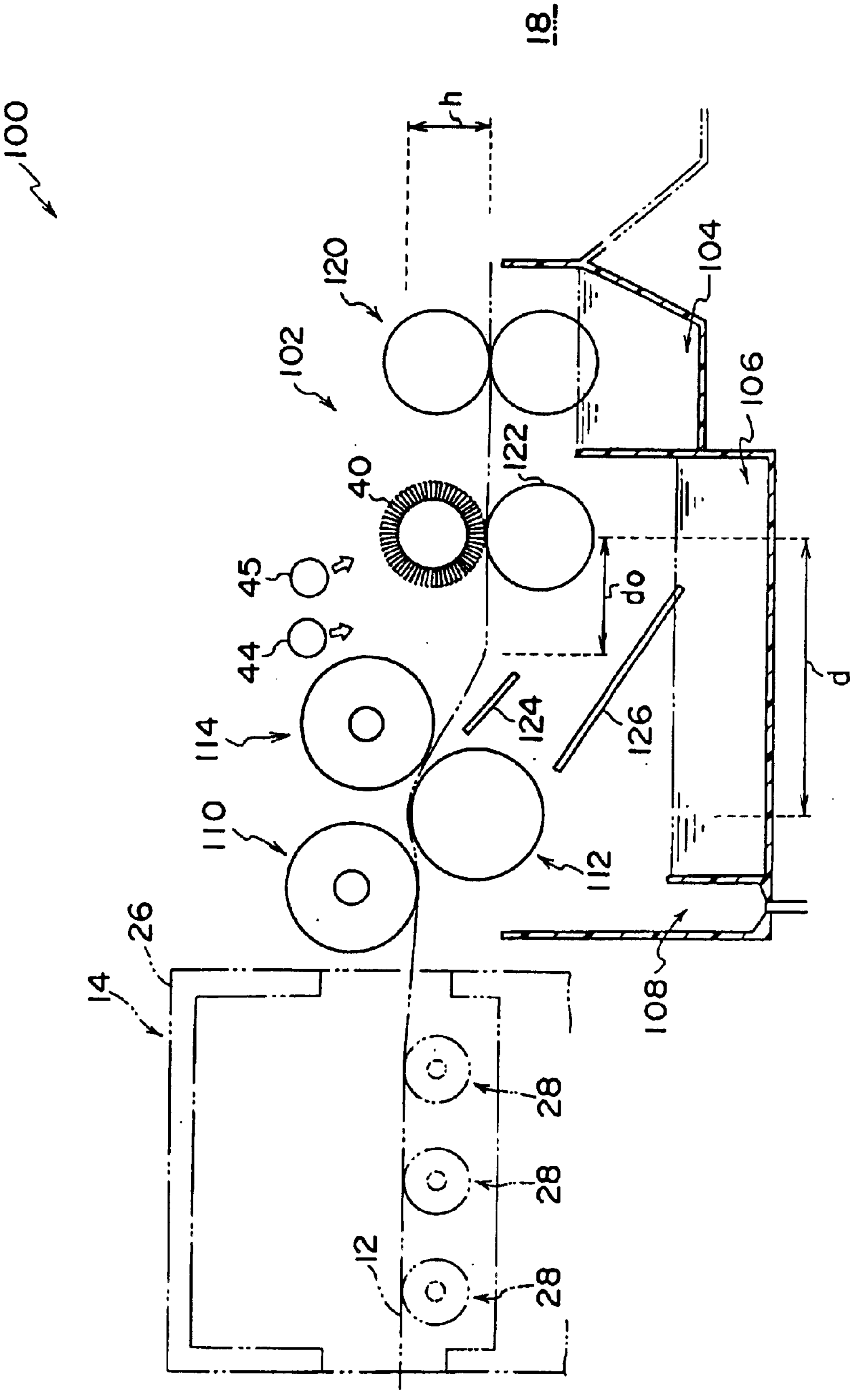
FIG. 4 is a schematic diagram showing the configuration of the essential part of an automatic developing device adopted in a second embodiment.

FIG. 4 shows the essential part of an automatic developing device 100 adopted in the second embodiment. The automatic developing device 100 is provided with a pre-water washing section 102 instead of the pre-water washing section 16 of the above-mentioned automatic developing device 10.

In the description below, upstream portions of the pre-water washing section 102 are explained based on the above-mentioned preheating section 14. However, as the automatic developing device 100 according to the second embodiment, it is not limited to the preheating section 14. Alternatives are applicable as long as they heat the photo polymer plate 12 to an appropriate temperature. Further variations are possible for performing predetermined processes of the photo polymer plate 12 after the developing section 18.

The pre-water washing section 102 comprises a post-water washing vessel 104 on the developing section 18 side, and a pre-water washing vessel 106 on the preheating section 14 side. The pre-water washing section 102 includes an overflow vessel 108 on the preheating section 14 side of the pre-water washing vessel 106 in the pre-water washing section 102.

In the pre-water washing section 102, water is supplied by a cascade method; supplying fresh washing water to the post-water washing vessel 104, and overflowing the washing water excessive in the post-water washing vessel 104 to the pre-water washing vessel 106. Moreover, the washing water excessive in the pre-water washing vessel 106 flows toward the overflow vessel 108 together with the overcoat layer component eliminated from the photo polymer plate 12 so as to be discharged.

Next, the pre-water washing section 102 of the automatic developing device 100 comprises developing rollers 110, 112, 114 on the preheating section 14 side. The conveying rollers 110, 112, 114 are disposed zigzag such that the conveying rollers 110, 114 faces the upper surface side of the photo polymer plate 12, and the conveying roller 112 faces the lower surface side of the photo polymer plate 12 between the conveying rollers 110, 114. Furthermore, the conveying roller 112 includes the upper end part disposed between the lower end parts of the conveying rollers 110, 114.

Thereby, the photo polymer plate 12 conveyed from the preheating section 14 passes through between the conveying rollers 110, 114 and the conveying roller 112. During this conveyance, since the conveying roller 112 is disposed between the conveying rollers 110, 114, the conveying roller 112 curves the photo polymer plate 12 between the conveying rollers 110, 114 so as to form an arc upward.

As the conveying roller 112, a rubber roller is used. Thus, the conveying rollers 110, 114 get the photo polymer plate 12 contacted reliably with the conveying roller 112 in order to apply the conveyance force when the photo polymer plate 12 passes through between the conveying rollers 110 to 114.

Figure 5:
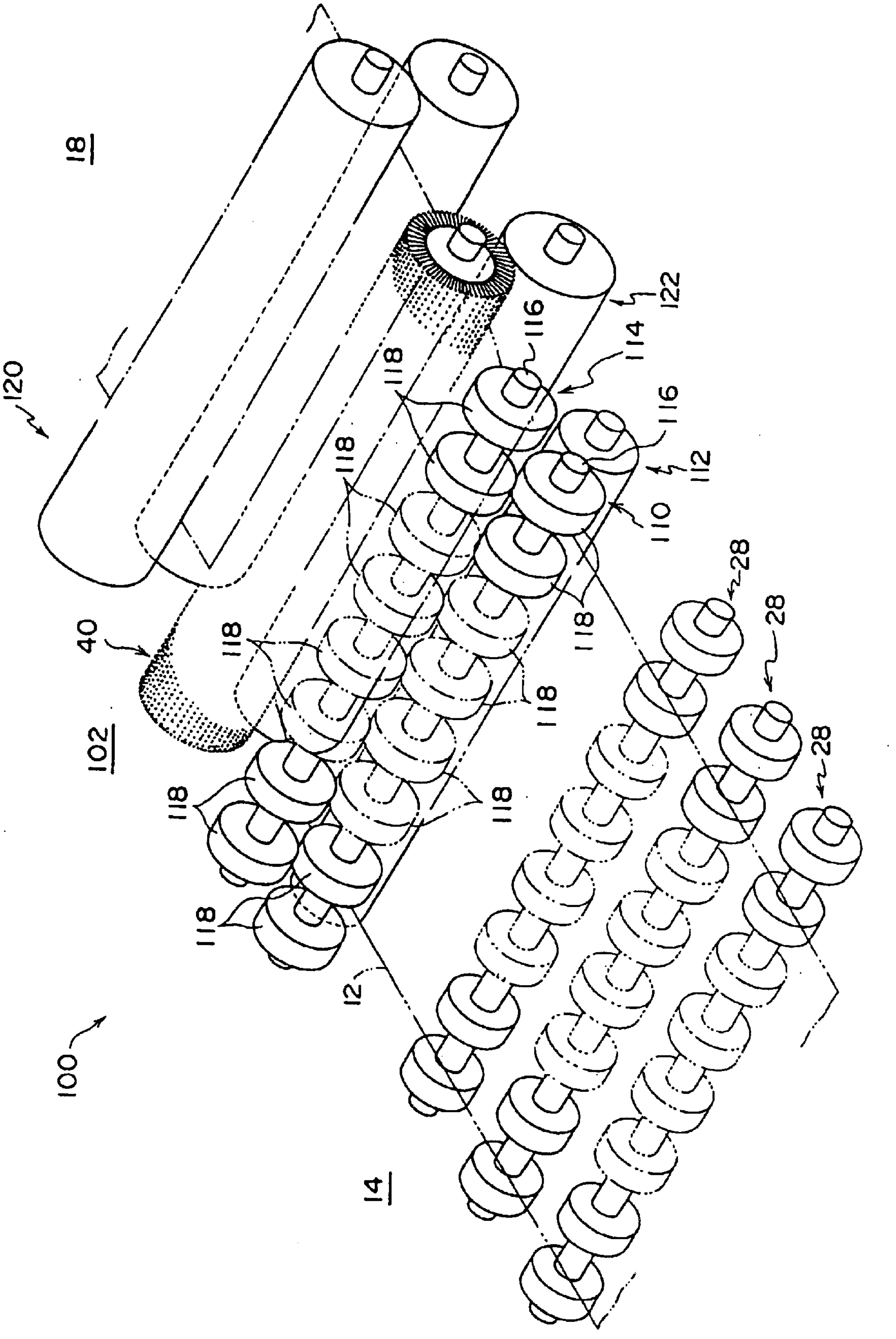
FIG. 5 is a schematic perspective view showing the essential part of a conveying path of a photo polymer plate between a preheating part and a pre-water washing part according to the second embodiment.

Moreover, in FIG. 5, the conveying rollers 110, 114 are skewered rollers like the conveying roller 28. Rollers 118 rotatably supported by the rotation shaft 116 are provided by a predetermined interval, movable and slightly slidable along the axis direction of the rotation shaft 116 by fitting E rings on both end parts.

Thereby, despite of contraction due to the temperature decline appearing on the photo polymer plate 12 heated by the preheating section 14, the rollers 118 of the conveying rollers 110, 114 move according to the contraction in the pre-water washing section 102. Owing to this moving, nipping and conveying of the conveying rollers 110, 114 and the conveying roller 112 do not cause the wrinkles. Furthermore, without nipping the entire surface in the direction orthogonal to the conveyance direction, the conveying rollers 110, 114 as a skewered roller convey the photo polymer plate 12 in the pre-water washing section 102. The wrinkles due to the nipping pressure on the photo polymer plate 12 conveyed from the preheating section 14 are prevented reliably from occurring.

As shown in FIG. 4 and FIG. 5, a conveying roller pair 120 is provided on the developing section 18 side in the pre-water washing section 102. A brush roller 40 and an idle roller 122 opposing to the brush roller 40 are provided between the conveying roller 114 and the conveying roller pair 120.

The conveying roller pair 120 has the lower end part of the lower side roller 120A soaked in the washing water in the post-water washing vessel 104. Thereby, the conveying roller pair 120 rotates to wash its surface when the photo polymer plate 12 does not pass through it. The conveyance failure such as the slippage of the photo polymer plate 12 due to the overcoat layer component adhered on the conveying roller pair 120 eluted from the photo polymer plate 12 is prevented from occurring.

In the pre-water washing section 102, the photo polymer plate 12 is conveyed toward between the brush roller 40 and the idle roller 122 while applying the conveyance force to the photo polymer plate 12 between the conveying rollers 110 to 114 in the pre-water washing section 102. Furthermore, the photo polymer plate 12 is conveyed substantially horizontally between the brush roller 40 and the idle roller 122, and the conveying roller pair 120.

In the pre-water washing section 102, the spray pipes 44, 45 are provided between the conveying roller 114 and the brush roller 40. The spray pipe 45 sprays the washing water toward the brush roller 40, and the spray pipe 44 sprays the washing water toward the photo polymer plate 12 being conveyed between the conveying roller 114 and the brush roller 40.

Also in the pre-water washing section 102, a predetermined level difference is provided in the conveying path between the preheating section 14 and the conveying rollers 110 to 114, and in the conveying path between the brush roller 40 and the conveying roller pair 120.

The conveying rollers 110 to 114 are disposed such that the conveying roller 112 projects between the conveying rollers 110, 114, with the lower side tangents of the conveying rollers 110, 114 inclined downward toward the downstream side. This is to convey the photo polymer plate 12 obliquely downward, which is conveyed from the preheating section 14 substantially horizontally. Thereby, the photo polymer plate 12 is introduced between the brush roller 40 and the idle roller 122 in the pre-water washing section 102.

The spray pipe 44 drops the washing water toward the surface (upper surface) of the photo polymer plate 12 being conveyed in the downwardly inclined state between the conveying roller 114 and the brush roller 40. Thereby, the photo polymer plate 12 reaches between the brush roller 40 and the idle roller 122 with the washing water stored on the upper surface so as to be brushed by the brush roller 40.

That is, in the pre-water washing section 102 of the automatic developing device 10, conveying the photo polymer plate 12 between the brush roller 40 and the idle roller 122 with the surface soaked in the washing water promotes elimination of the water soluble overcoat layer from the surface of the photo polymer plate 12.

The conveyance speed of the photo polymer plate 12 and the inclination angle of the photo polymer plate 12 between the conveying roller 114 and the brush roller 40 are main determinants of the time for brushing the surface of the photo polymer plate 12 by the brush roller 50. In other words, as shown in FIG. 4, the level difference h of the conveying path, the horizontal distance d between the first contacting position of the conveying roller 112 with the photo polymer plate 12 and the second contacting position of the brush roller 40 with the photo polymer plate 12 determines the inclination angle of the conveying path of the photo polymer plate 12.

Moreover, in the pre-water washing section 102, the photo polymer plate 12 conveyance speed is a main factor to set the position of dropping the washing water from the spray pipe 44. This is to subject the photo polymer plate 12 to soaking in the washing water for a predetermined time before brushing by the brush roller 40.

In the pre-water washing section 102, the washing water is stored between the photo polymer plate 12 upper surface and the brush roller 40 by conveying the photo polymer plate 12 in the inclined state with the upstream side with respect to the brush roller 40 disposed above. That is, in the pre-water washing section 102, the washing water is stored between the inclined photo polymer plate 12 and the brush roller 40 on the upstream side of the brush roller 40.

Thereby, the photo polymer plate 12 is brushed by the brush roller 40 after being soaked in the washing water so that the water soluble overcoat layer can be eliminated efficiently and reliably.

Here, in the second embodiment, as an example, when the conveyance speed v of the photo polymer plate 12 is 1,700 mm/min, the level difference h is set to be 10 mm or larger (h 10 mm) and the horizontal distance d is set to be 80 mm or longer (d 80 mm).

Moreover, in the pre-water washing section 102, the washing water is dropped rather to the horizontal distance $d_0$ position than the nipping point of the photo polymer plate 12 by the brush roller 40 and the idle roller 122. In the pre-water washing section 102 adopted in the second embodiment, the horizontal distance $d_0$ is set at 65 mm ($d_0$=65 mm) from the conveyance speed v=1,700 mm/min so as to have about 2.3 seconds for the time for soaking the photo polymer plate 12 in the washing water.

Also in the pre-water washing section 102, a guide plate 124 is provided below the conveying roller 114 as the supporting guide. The guide plate 124 is inclined downward toward the conveyance direction of the photo polymer plate 12. The guide plate 124 is arranged so as to avoid inadvertent contact of the tip end part or the middle part in the conveyance direction of the photo polymer plate 12 with the conveying roller 112. Moreover, the lower end of the guide plate 124 between the conveying roller 114 and the brush roller 40 reaches at a position slightly lower than the height of the conveying path of the photo polymer plate 12 to be delivered from between the brush roller 40 and the idle roller 122.

Thereby, in the pre-water washing section 102, while the photo polymer plate 12 is conveyed to the brush roller 40 and the idle roller 122 with the washing water stored on the upper surface, the rear end portion of the photo polymer plate 12 separates from the conveying roller 112, and the rear end portion comes in contact with the guide plate 124. Then, the guide plate 124 guides and supports the photo polymer plate 12. During this operation, the guide plate 124 reliably prevents adhesion on the conveying roller 112 of the washing water running down due to drastic slackening of the rear end of the photo polymer plate 12 by the weight of the washing water on the upper surface.

Consequently, due to adhesion to the rear surface of the photo polymer plate 12 of the washing water including the overcoat layer component adhered to the conveying roller 112, slippage of the photo polymer plate 12 with respect to the conveying roller 122 or pollution of the photo polymer plate 12 can be prevented during conveyance.

The guide plate 124 may have various configurations as long as slackening of the rear end of the photo polymer plate 12 and dropping of the washing water from the surface of the photo polymer plate 12 is reliably prevented.

In the pre-water washing section 102, a guide plate 126 is provided in the pre-water washing vessel 106 as the receiving plate. The guide plate 126 is disposed between the conveying roller 112 and the idle roller 122 with the idle roller 122 side inclined downward. Moreover, the guide plate 126 has a size larger than the width direction size of the photo polymer plate 12.

Thereby, the washing water supplied onto the photo polymer plate 12 drops from both end parts in the width direction of the photo polymer plate 12 or the rear end part of the photo polymer plate 12 onto the guide plate 126. The washing water further runs off the guide plate 126 and down into the pre-water washing vessel 106. This is to avoid direct contact of the washing water running down from the photo polymer plate 12 onto the liquid surface of the washing water stored in the pre-water washing vessel 106.

That is, since the overcoat layer component eliminated from the surface of the photo polymer plate 12 is contained in the washing water in the pre-water washing vessel 106, bubbling can easily occur. In particular, when the overcoat layer component in the washing water exceeds 2% by weight, bubbling can easily be formed. To suppress the excessive bubbling, the guide plate 126 is provided in the pre-water washing section 102 in the automatic developing device 100 to avoid direct dropping of the washing water on the photo polymer plate 12 onto the surface of the washing water in the pre-water washing vessel 106.

The guide plate 126 may have various configurations as long as the washing water running down from the photo polymer plate 12 is received.

In the automatic developing device 100, fresh water is supplied into the post-water washing vessel 104 according to the processing amount (processing area) of the photo polymer plate 12. Not only the washing water in the post-water washing vessel 104 but also the washing water in the pre-water washing vessel 106, is the overcoat layer component concentration controlled so as not to exceed 2% (2% by weight).

In the automatic developing device 100 arranged as described, the photo polymer plate 12 preheated by predetermined time and temperature in the preheating section 14 is conveyed to the pre-water washing section 102. The cooling part 84 may be provided between the preheating section 14 and the pre-water washing section 102 for promoting cooling of the photo polymer plate 12 to be conveyed to the pre-water washing section 102 in order to prevent the wrinkles or the irregular processing due to adherence and sudden cooling of the washing water on the surface of the photo polymer plate 12.

In the pre-water washing section 102, the photo polymer plate 12 delivered from the preheating section 14 is conveyed by the conveying rollers 110 to 114 disposed zigzag. Since the conveying rollers 110, 114 are provided as a skewered roller, the conveyance force is provided reliably to the photo polymer plate 12 without nipping the photo polymer plate 12 on the entire surface in the direction orthogonal to the conveyance direction between the conveying rollers 110 to 114. Thereby, the wrinkles due to nipping of the photo polymer plate 12 heated by the preheating section 14 on the entire surface in the direction orthogonal to the conveyance direction by the conveying roller pair is prevented from occurring.

Moreover, the photo polymer plate 12 is conveyed inclining obliquely downward between the conveying rollers 112, 114 in the pre-water washing section 102. Furthermore, in the pre-water washing section 102, the washing water is dropped from the spray pipe 44 toward the upper surface of the photo polymer plate 12 moved in the inclined state.

Since the photo polymer plate 12 is inclined downward toward the brush roller 40, the washing water is stored on the photo polymer plate 12 on the upstream side with respect to the brush roller 40. Moreover, the spray pipe 44 drops the washing water at a preset predetermined position.

Thereby, the washing water is stored on the photo polymer plate 12 on the upstream side with respect to the brush roller 40 so that the photo polymer 12 is brushed by the brush roller 40 after being soaked in the washing water for a predetermined time so as to reliably eliminate the water soluble overcoat layer.

The photo polymer plate 12 after being brushed is conveyed substantially horizontally from between the brush roller 40 and the idle roller 122 toward the conveying roller pair 120, and it is send out to the developing section 18 with the washing water squeezed by the conveying roller pair.

Accordingly, in the automatic developing device 100, the photo polymer plate 12 after finishing the preheating operation can be conveyed without forming the wrinkles, with the overcoat layer reliably eliminated from the surface of the photo polymer plate 12 so as to be delivered to the developing section 18.

In particular, since the washing water is dropped onto the surface of the photo polymer plate 12 while conveying the photo polymer plate 12 with the brush roller 40 side downward in the pre-water washing part 12 for storing the washing water on the photo polymer plate 12, the photo polymer plate 12 is brushed after having the surface thereof soaked in the washing water for swelling the water soluble overcoat layer. Thereby, elimination of the overcoat layer by the brush roller 40 is reliably performed.

Moreover, since the preheating section 14 side of the photo polymer plate 12 with the washing water supplied from the spray pipe 44 is inclined upward in the pre-water washing section 102, flowing out on the photo polymer plate 12 of the washing water supplied to the photo polymer plate 12 to the preheating section 14 side or partial change of the time having the washing water adhered is prevented. Thereby, deterioration of the finishing quality by irregularity on the surface of the photo polymer plate 12 by partial adhesion of the washing water to the photo polymer plate 12 in a high temperature state without passage of enough time after discharge of the photo polymer plate 12 from the preheating section 14 due to adhesion of the washing water on the conveying roller 114 is prevented.

The washing water supplied from the spray pipe 44 to the photo polymer plate 12 is dropped from the both end sides in the width direction of the photo polymer plate 12 or the rear end of the photo polymer plate 12 being conveyed into the pre-water washing vessel 106. During this, since the inclined guide plate 126 is provided in the pre-water washing vessel 106 so that the washing water dropping from the photo polymer plate 12 can be received by the guide plate 126, bubbling of the washing water due to direct contact of the washing water dropping from the photo polymer plate 12 with the liquid surface of the washing water in the pre-water waving vessel 126 is prevented.

Moreover, since the guide plate 126 is inclined with the preheating section 14 side upward, splashing to the preheating section 14 side of the washing water dropped from the photo polymer plate 12 to the guide plate 126 so as to be adhered to the photo polymer plate 12, is prevented. Thereby, the finishing defects such as irregularity on the surface of the photo polymer plate 12 due to adhesion of the scattered washing water on the surface of the photo polymer plate 12 are prevented.

Furthermore, the rear end of the photo polymer plate 12 may be slackened by passage between the conveying rollers 112, 114. In particular, significant slackening easily occurs by the weight of the washing water on the surface of the photo polymer plate 12. The washing water on the surface of the photo polymer plate 12 may falls off at one time from the rear end of the photo polymer plate 12 causing splashing or frothing the washing water.

In view of this, the pre-water washing section 102 is provided with the guide plate 124 from the vicinity of the conveying roller 112 along the inclined conveying path of the photo polymer plate 12. Thereby, the rear end of the photo polymer plate 12 separated from the conveying roller 112 comes in contact with the guide plate 124 so as to prevent the slackening. Therefore, running down of the washing water from the rear end of the photo polymer plate 12 at one time is prevented. Additionally, the rear end of the photo polymer plate 12 is conveyed into between the brush roller 40 and the idle roller 122 in the state preliminarily soaked in the washing water. Consequently, the overcoat layer is reliably eliminated to the rear end part of the photo polymer plate 12.

In the preheating section 102 of the automatic developing device 100 adopted accordingly in the second embodiment, irregular processing due to the stain of the adhered washing water caused by inadvertent adhesion of the washing water to the photo polymer plate 12 in a high temperature state after heated in the preheating section 14 is reliably prevented. Further, the overcoat layer of the photo polymer plate 12 is eliminated efficiently by soaking the same reliably in the washing water. Thereby, deterioration of the finishing quality of the photo polymer plate 12 in the pre-water washing stage is reliably prevented.

Figure 6A:
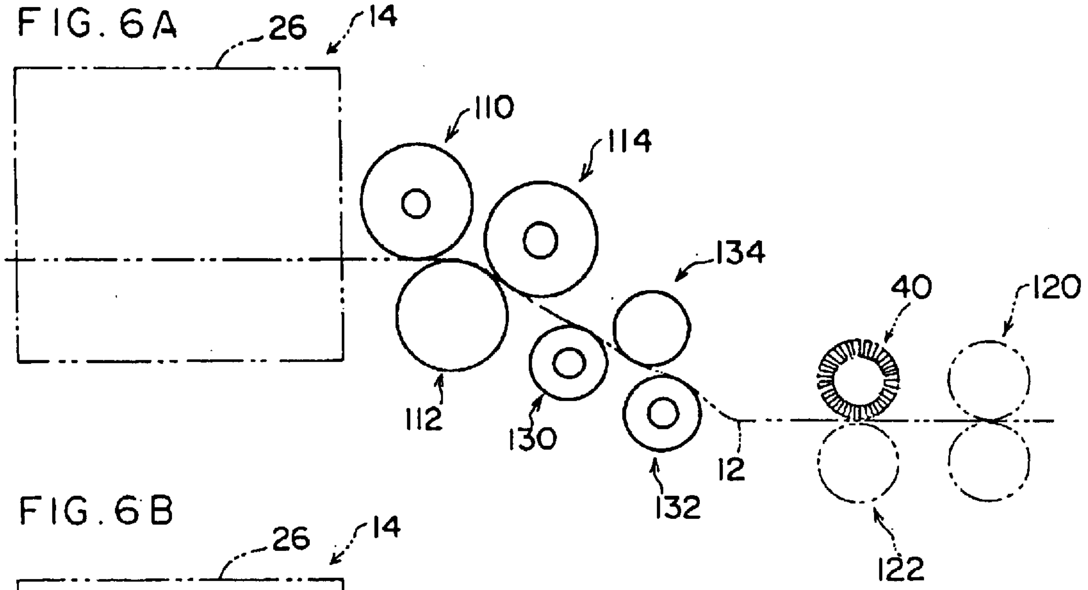
FIGS. 6A, 6B, 6C are schematic diagrams showing another configuration of the conveying path of the photo polymer plate between the preheating part and the pre-water washing part.

Although the skewered conveying rollers 110, 114 are disposed above and the rubber conveying roller 112 is disposed below zigzag in the conveying path of the photo polymer plate 12 in the upstream part of the pre-water washing section 102 in the embodiment heretofore explained, it is not limited thereto. For example, as shown in FIG. 6A, the zigzag conveying path may be formed with the skewered conveying rollers 130, 132 disposed on the lower side the conveying path of the photo polymer plate 12 and the conveying roller 134 using a rubber roller disposed on the upper side of the conveying path such that the photo polymer plate 12 delivered while being nipped by the conveying rollers 112, 114 before in contact with the washing water to be sprayed from the spray pipes 44, 45 is nipped and conveyed.

Figure 6B:
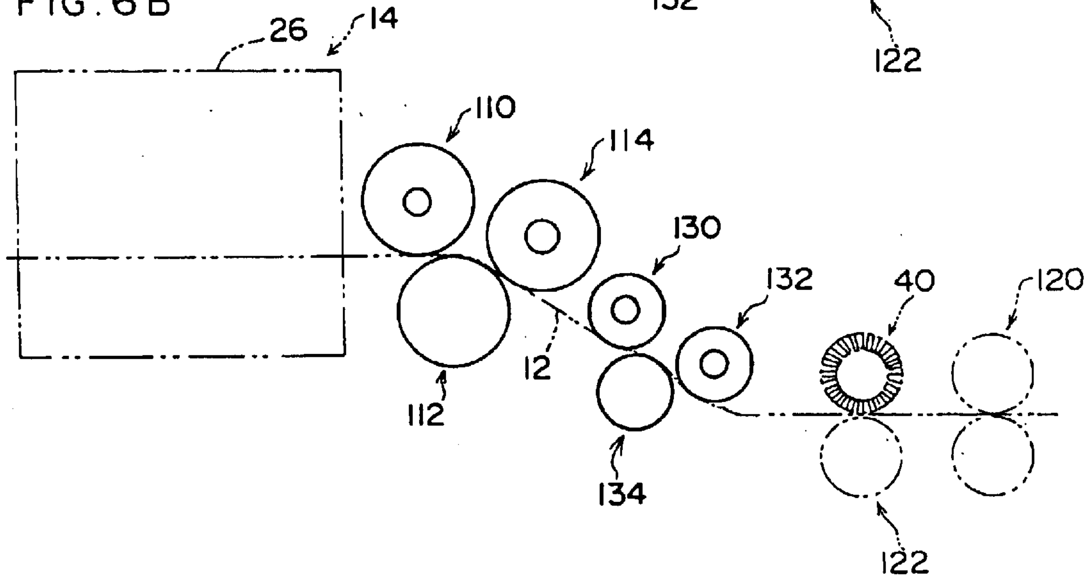
Figure 6C:
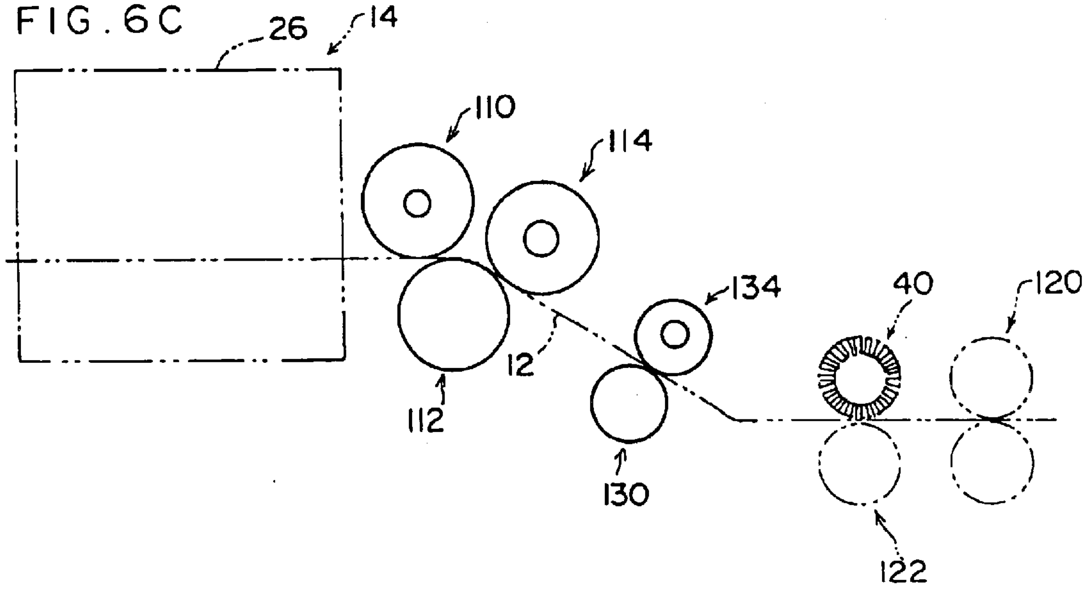

Moreover, as shown in FIG. 6B, the skewered conveying rollers 130, 132 maybe disposed on the upper side of the conveying path of the photo polymer plate 12, and the conveying roller 134 on the lower side. Furthermore, as shown in FIG. 6C, the skewered conveying roller 130 and the conveying roller 134 using a rubber roller on the downstream side of the conveying rollers 110, 112, 114 as a pair may be disposed as well.

Figure 7:
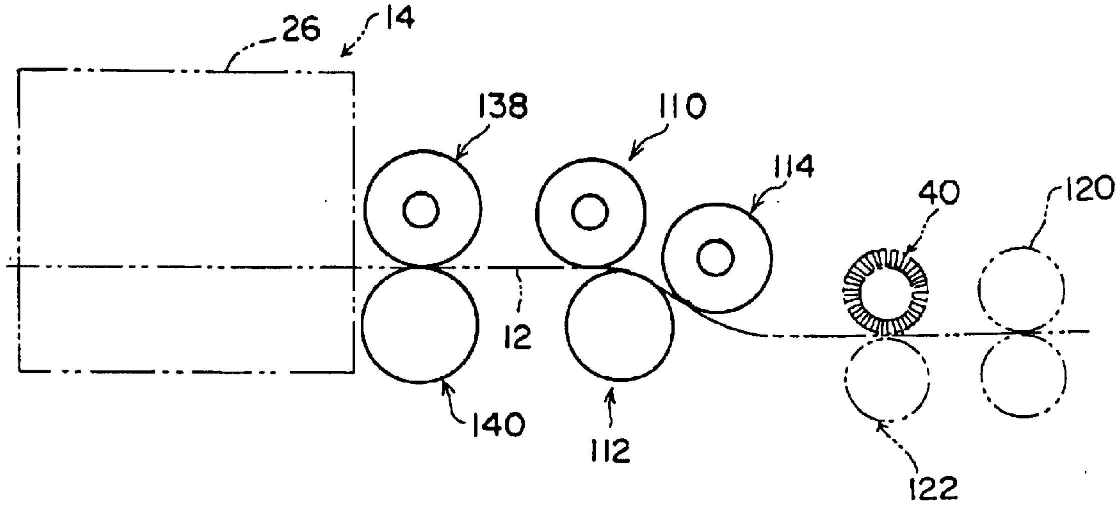
FIG. 7 is a schematic diagram showing another configuration of the conveying path of the photo polymer plate between the preheating part and the pre-water washing part.

Furthermore, as shown in FIG. 7, it is also possible to dispose the skewered conveying roller 138 and the conveying roller 140 using a rubber roller on the upstream side of the conveying roller 110 so that the photo polymer plate 12 can be conveyed between the conveying rollers 110, 112 while being nipped.

That is, other configurations maybe adopted as long as they have the rubber roller disposed on one side of the conveying path of the photo polymer plate 12, and provide the skewered conveying roller on the other side corresponding to the rubber roller.

Furthermore, it is an example of the present invention, and thus the configuration of the present invention is not limited thereby. Each of the present invention can be adopted to an automatic developing device with an optional configuration comprising a preheating part and a pre-water washing part for applying preheating and pre-water washing to the photosensitive planographic printing plate.

Third Embodiment

Figure 8:
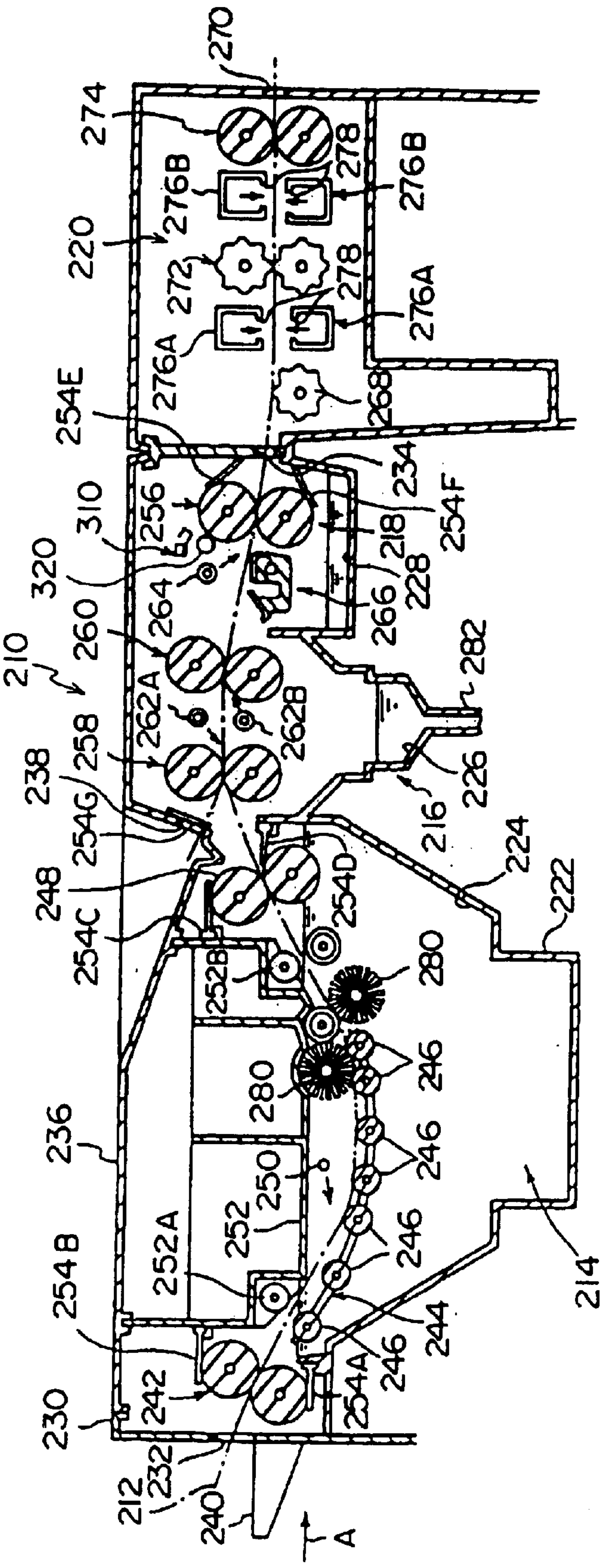
FIG. 8 is a schematic diagram showing the configuration of a PS plate processor adopted in a third embodiment.

Hereinafter, with reference to the drawings, a third embodiment of the present invention will be explained. FIG. 8 shows the schematic configuration of a photosensitive planographic printing plate processing device adopted as an example of the photosensitive material processing device (hereinafter referred to as a "PS plate processor 210"). The PS plate processor 210 is for performing a developing process for a photosensitive planographic printing plate (hereinafter referred to as a "PS plate 212") such as a photo polymer plate after image-wise exposure by an exposing device (not shown) The PS plate 212 comprises a thin rectangular flat plate such as an aluminum plate as the supporting body, and a photosensitive layer formed on the supporting body. The photo polymer plate is provided with a photosensitive layer by superimposing a photo adhesion layer, a photo polymerization layer, and an overcoat layer such that the polymerization reaction in the image part of the photo polymerization layer is promoted by the image-wise exposure by a laser beam.

According to the PS plate processor 210 to be explained below, the PS plate 212 of a large side with about a 1,100 mm width in the direction orthogonal to the conveyance direction can be processed.

The PS plate processor 210 is provided with a developing part 214 for processing the PS plate 212 with a developing liquid, a water washing part 216 for supplying the washing water to the PS plate 212 processed with the developing liquid for washing the same with the water, a desensitizing process section 218 for applying a gum liquid to the PS plate 212 after washing with the water for the desensitizing process, and a drying part 220 for drying the PS plate 212. That is, in the PS plate processor 210, the developing process, the water washing process, the desensitizing process and the drying step are disposed successively along the conveyance direction of the PS plate 212 (arrow A in FIG. 8).

In the PS plate processor 210, a processing tank 222 is provided. In the processing tank 222, a developing vessel 224 is formed at a position to be the developing part 214, and a water washing vessel 226 and a desensitizing vessel 228 are formed as a processing vessel at a position to be the water washing part 216 and the desensitizing process section 218.

In an outer plate panel 230 covering the processing tank 222, a slit-like insertion opening 232 is formed, and a discharge opening 234 is formed on the drying part 220 side in the processing tank 222.

In the PS plate processor 210, a cover 236 for covering the upper part of the processing tank 222 is provided. The cover 236 integrally covers the developing process, the water washing process and the desensitizing process provided in the processing tank 222. Moreover, a reentry insertion opening (sub insertion opening) 238 is provided in the cover 236 for inserting the PS plate 212 between the developing part 214 and the water washing part 216. The sub insertion opening 238 is for inserting the PS plate 212 for performing the process in the PS plate processor 210 except the process in the developing part 214.

An insertion base 240 is provided outside the insertion opening 232, and a rubber conveying roller pair 242 is provided on the PS plate 212 insertion side of the developing part 214. The PS plate 212 with the image printed is placed on the insertion base 240 so as to be inserted from the insertion opening 232 along the arrow A direction and sent between the conveying roller pair 242.

The conveying roller pair 242 is rotated by the driving force of a driving device (not shown) for taking in the inserted PS plate 212, and sending the same into the developing part 214 by about a 15° to 31° angle range with respect to the horizontal direction. In this embodiment, a one side type PS plate 212 with a photosensitive layer formed on one surface of the supporting body is used. The PS plate 212 is inserted from the insertion opening 232 into the PS plate processor 210 in the state with the photosensitive layer disposed upward.

The developing vessel 224 formed in the processing tank 222 has a substantially protruded shape with the bottom part center projecting downward for storing the developing liquid for performing the developing process for the PS plate 212. In the developing vessel 224, a guide plate 244 is disposed along the bottom part on the lower side along the conveyance direction of the PS plate 212.

The guide plate 244 is provided on the upstream part (insertion opening 232 side) of the developing vessel 224, with a plurality of rotatable rolls (small rollers) 246 mounted. The PS plate 212 sent into the developing part 214 by the conveying roller pair 242 is conveyed on the guide plate 244 while being guided by the rolls 246.

In the developing vessel 224, a conveying roller pair 248 with the outer circumference made of a rubber is disposed on the water washing part 216 side so that the PS plate 212 guided and conveyed in the developing vessel 224 in a substantially U shape is nipped by the conveying roller pair 248 so as to be taken out from the developing vessel 224. The PS plate 212 is soaked in the developing liquid while being conveyed accordingly in the developing vessel 224 so that the unnecessary part of the photosensitive layer exposed by the image-wise exposure is swelled by the developing liquid, and peeled off from the supporting body so as to eliminate the unnecessary photosensitive layer.

In the developing vessel 224, a spray pipe 250 is provided so that the developing liquid in the developing vessel 224 suctioned by a pump (not shown) is blown onto the photosensitive layer surface of the PS plate 212 by the spray pipe 250 for supplying the developing liquid to the surface of the PS plate 212 as well as for circulating the developing liquid in the developing vessel 224.

Moreover, in the developing vessel 224, a brush roller 280 is provided between the guide plate 244 and the conveying roller pair 248. The brush roller 280 brushes the surface of the PS plate 212 by rotating with the hairy material in contact with the surface of the PS plate 212 being conveyed while being soaked in the developing liquid so as to promote elimination of the unnecessary photosensitive layer from the surface of the PS plate 212.

In the developing part 214, a liquid surface lid 252 is disposed with the lower surface below the liquid surface of the developing liquid stored in the developing vessel 224. Moreover, shielding members 254A, 254B are provided on the insertion opening 232 side on the developing vessel 24 wall surface and the liquid surface lid 252, and shielding members 254C, 254D are mounted on the water washing part 224 side. In the processing tank 222, shielding members 254E, 254F contacting with the circumferential surface of the conveying roller pair 256 are mounted in the vicinity of the discharge opening 234, and a shielding member 254G is mounted on the sub insertion opening 238 of the cover 236.

The shielding members 254A to 254G are made of a silicone rubber, or the like. In the developing vessel 224, a large capacity liquid surface lid 252 is provided contacting with the liquid surface in the space in the sealed part provided by the shielding members 254A to 254G, the conveying roller pairs 242, 248, or the like, for reducing the amount of the air contained in the space as well as for preventing entrance of fresh air in the vicinity of the liquid surface of the developing liquid by the liquid surface lid 252, the shielding members 254A to 254G, or the like so that deterioration of the developing liquid by the carbon gas in the air and the moisture evaporation can be restrained. The liquid surface lid 252 is provided with skewered rollers 252A, 252B on the end part lower surface on the upstream side and the downstream side in the conveyance direction of the PS plate 212 so that damage of the surface (mainly the photosensitive surface) due to contact of the PS plate 212 being conveyed in the developing part 214 with the lower surface of the liquid surface lid 252 can be prevented.

The PS plate 212 taken out from the developing vessel 224 by the conveying roller pair 248 is sent into the water washing part 216 while squeezing off the developing liquid adhered on the surface by the conveying roller pair 248.

In the water washing part 216, the conveying path for conveying the PS plate 212 by the conveying roller pairs 258, 260 disposed above the water washing vessel 226 in the substantially horizontal state is formed so that the PS plate 212 is conveyed horizontally above the water washing vessel 226 by being nipped by the conveying roller pairs 258, 260.

In the water washing part 216, spray pipes 262A, 262B are provided as a pair on the upper side and the lower side with respect to the PS plate 212 conveying path between the conveying roller pairs 258, 260. The spray pipes 262A, 262B are disposed with the axis direction along the PS plate 212 width direction (direction orthogonal to the conveyance direction), with a plurality of ejection holes formed facing the PS plate 212 conveying path and along the axis direction of the spray pipes 262A, 262B.

In the water washing vessel 226, the washing water is stored as the processing liquid. Moreover, one end of a pipe 282 is opened on the bottom part of the water washing vessel 226. The pipe 282 is connected to the spray pipes 262A, 262B via a liquid supply pump (not shown). The spray pipes 262A, 262B jets out the washing water supplied by the drive of the water supply pump synchronously with the conveyance of the PS plate 212 toward the PS plate 212 from the ejection holes. The developing liquid adhered on the surface of the PS plate 212 is washed off by the washing water.

The developing liquid accordingly washed off by the washing water is dropped into the washing vessel 226 together with the washing water. The new liquid of the washing water is supplied to the water washing vessel 226 by a device (not shown) according to the PS plate 212 processing amount.

The washing water supplied to the PS plate 212 is squeezed off from the front and rear surfaces of the PS plate 212 together with the developing liquid adhered on the front and rear surfaces of the PS plate 212 by nipping and sending out the PS plate 212 by the conveying roller pair 60 so as to be collected in the water washing vessel 226. As to the jetting direction of the washing water from the spray pipes 262A, 262B, it is set for the spray pipe 262A to be the upstream side in the conveyance direction of the PS plate 212, and it is set for the spray pipe 262B to be the downstream side in the conveyance direction of the PS plate 212, but it is not limited thereto, and another direction can be used.

In the desensitizing process section 218, a conveying roller pair 256 is provided above the desensitizing process vessel 228. After being conveyed in the desensitizing process section 218 by the conveying roller pair 256, the PS plate 212 is sent out from the discharge opening 234.

A spray pipe 264 is provided on the upper side of the conveying path of the PS plate 212 in the desensitizing process section 218. The spray pipe 264 is disposed with the axis direction along the width direction of the PS plate 212, with a plurality of ejection holes formed facing the PS plate 212 conveying path along the axis direction of the spray pipe 264. Moreover, an ejection unit 266 with a slit continuous in the PS plate 212 width direction formed is provided below the PS plate 212 conveying path in the desensitizing process section 218.

In the desensitizing process vessel 228, a gum liquid used for protection of the plate surface of the PS plate 212 is stored. The gum liquid is supplied to the spray pipe 264 and the ejection unit 266 synchronously with the conveyance of the PS plate 212. The spray pipe 264 drops the gum liquid toward the PS plate 212 for applying the same spread on the surface of the PS plate 212. Moreover, the ejection unit 266 coats the gum liquid ejected from the slit on the entire surface of the rear surface side of the PS plate 212 at the time the PS plate 212 rear surface side passes in contact with the slit part.

In the PS plate 212, a protection film is formed by the gum liquid coated on the front and rear surfaces. The ejection direction of the gum liquid from the spray pipe 264 is not limited to the PS plate 212 conveyance direction downstream side, but it can be another direction. Moreover, although the ejection unit 266 is provided on the lower side of the conveying path of the PS plate 212 for coating the gum liquid, it is not limited thereto, but it is also possible to coat the gum liquid on the rear surface of the PS plate 212 by providing a spray pipe for ejecting the gum liquid from the spray pipe.

The PS plate 212 coated with the gum liquid in the desensitizing process section 218 is nipped by the conveying roller pair 256 so as to be discharged from the discharge opening 234 in the state with the gum liquid slightly remaining on the front and rear surfaces, and sent into the drying part 220.

In the drying part 220, a supporting roller 268 for supporting the PS plate 212 is provided in the vicinity of the discharge opening 234. A conveying roller pair 272 and a conveying roller pair 274 are provided in the central part of the PS plate conveying path 212 in the drying part 220 as well as in the vicinity of the discharge opening 270. The PS plate 212 is conveyed in the drying part 220 by the supporting roller 268 and the conveying roller pairs 272, 274.

Ducts 276A, 276B are provided between the supporting roller 268 and the conveying roller pair 272, and between the conveying roller pair 272 and the conveying roller pair 274 as a pair with the PS plate 212 conveying path interposed therebetween. The ducts 276A, 276B are disposed with the longitudinal direction along the PS plate 212 width direction, with slit holes 278 provided on the surface facing the PS plate 212 conveying path.

When the drying air generated by a drying air generating device (not shown) is supplied from one end side in the longitudinal direction, the ducts 276A, 276B eject the drying air from the slit holes 278 toward the PS plate 212 conveying path for blowing the same to the PS plate 212. Thereby, the gum liquid coated on the front and rear surfaces of the PS plate 212 are dried so as to form the protection film. The discharge opening 234 is provided with a shutter (not shown) for sectioning a processor part until the desensitizing process section 218 for processing the PS plate 212 with the processing liquid, and the drying part 220 so as to prevent entrance of the heated air in the drying part 220 into the desensitizing process section 218 by inadvertent opening of the discharge opening 234.

In the PS plate processor 210 accordingly provided, when the PS plate 212 with an image recorded by a printing device (not shown), or the like is placed on the insertion base 240 so as to be inserted into the insertion opening 232, the PS plate 212 is taken in by the conveying roller pair 242 so as to be sent into the developing part 214. In the PS plate processor 210, when the PS plate 212 passing through the insertion opening 232 is detected by a sensor (not shown), a timer is started. The timer is used for measuring the timing for ejecting the washing water from the spray pipes 62A, 62B of the water washing part 216, and the timing for ejecting the gum liquid in the desensitizing process section 218 together with the operation of the driving device for conveying the PS plate 212.

In the developing part 214, the PS plate 212 is taken in by the conveying roller pair 242 by an insertion angle in a range of about 15° to 31° with respect to the horizontal direction so as to be conveyed while being soaked in the developing liquid. Moreover, the PS plate 212 is sent out from the developing liquid by a discharge angle in a range of about 17° to 31°. By soaking the PS plate 212 in the developing liquid in the developing part 214, the unnecessary part of the photosensitive layer is swelled according to the image-wise exposure so that the swelled photosensitive layer is eliminated from the supporting body. By brushing the surface of the PS plate 212 with the brush roller 280 disposed in the developing vessel 224 at the time, elimination of the unnecessary photosensitive layer from the surface of the PS plate 212 can be promoted.

As the PS plate processor 210, one having a plurality of the brush rollers 280 facing the surface of the PS plate 212 for brushing, or one for processing the PS plate 212 without using the brush roller 280 can be used as well.

The PS plate 212 sent out from the developing liquid after the process with the developing liquid is taken out by the conveying roller pair 248 so as to be sent into the water washing part 216. At the time, the developing liquid adhered on the front and rear surfaces of the PS plate 212 is squeezed off from the PS plate 212 by the conveying roller pair 248.

In the water washing part 216, the washing water is jetted from the spray pipes 262A, 262B while conveying the PS plate 212 nipped by the conveying roller pair 258, 260 in the substantially horizontal state. Moreover, the conveying roller pair 260 disposed on the downstream side in the PS plate 212 conveyance direction sends out the PS plate 212 to the desensitizing process section 218 while squeezing off the washing water supplied to the front and rear surfaces of the PS plate 212 together with the remaining developing liquid without being squeezed off by the conveying roller pair 248.

Thereby, the PS plate 212 has the developing liquid remaining on the front and rear surfaces washed off at the time of passing through the water washing part 216.

The PS plate 212 sent into the desensitizing process section 218 passes between the spray pipe 264 and the ejection unit 266. By being nipped by the conveying roller pair 256, it is sent out from the desensitizing section 218 by the conveying roller pair 256.

At the time, in the desensitizing process section 218, the gum liquid is supplied from the spray pipe 264 and the ejection unit 266 to the PS plate 212 so as to coat the gum liquid on the front and rear surfaces of the PS plate 212. The conveying roller pair 256 nips and sends out the PS plate 212 so as to form the gum liquid thin film on the front and rear surfaces of the PS plate 212 as well as squeezes off the excessive gum liquid from the front and rear surfaces of the PS plate 212.

The PS plate 212 coated with the gum liquid is sent from the discharge opening 234 into the drying part 220 by the conveying roller pair 256. The shutter (not shown) provided in the discharge opening 234 is operated at the timing of starting the process of the PS plate 212 or at the timing of sending out the PS plate 212 from the desensitizing process section 218 so as to open the discharge opening 234 for preventing inadvertent entrance of the drying air in the drying part 220 into the desensitizing process section 218 so as to adhere the gum liquid on the conveying roller pair 256 as well as for preventing entrance of the air from the discharge opening 234 to the developing part 214 so as to deteriorate the developing liquid by the carbon gas in the air, or for preventing evaporation of the moisture in the developing liquid or washing water, or the moisture in the gum liquid and discharge from the discharge opening 234.

In the drying part 220, the drying air is blown from the ducts 276A, 276B while conveying the PS plate 212 by the supporting roller 268 and the conveying roller pairs 272, 274. Thereby, with a protection film formed thereon by the coated gum liquid, the PS plate 212 is discharged from the discharge opening 270.

Figure 9:
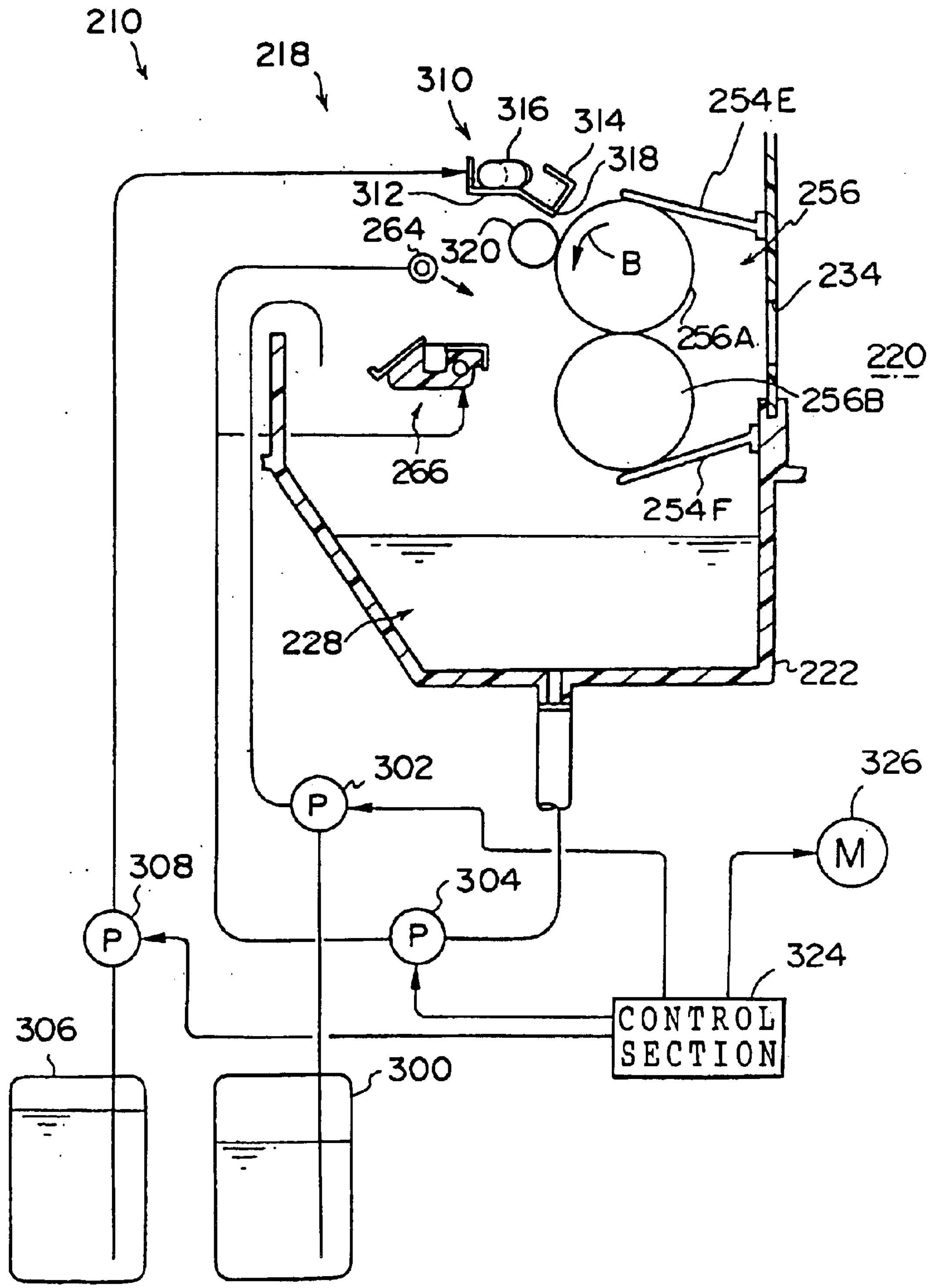
FIG. 9 is a schematic diagram showing the configuration of a desensitizing process part for washing a roller.

Next, as shown in FIG. 9, a replenishing liquid tank 300 is provided in the PS plate processor 210 for storing the replenishing liquid for the gum liquid as the processing liquid used in the desensitizing process section 218 so that the replenishing liquid in the replenishing liquid tank 300 is replenished to the desensitizing process vessel 228 by the operation of a replenishing liquid pump 302 by a predetermined timing.

The replenishing liquid supplied from the replenishing liquid tank 300 to the desensitizing process vessel 228 is stored as the gum liquid. Moreover, a liquid supply pump 304 to be operated synchronously with the conveyance of the PS plate 212 is provided in the desensitizing process section 218 so that the gum liquid in the desensitizing process vessel 228 is supplied to the spray pipe 264 and the ejection unit 266 by the operation of the liquid supply pump 304 so as to be coated on the front and rear surfaces of the PS plate 212. The excessive gum liquid is squeezed off from the front and rear surfaces of the PS plate 212 by the conveying roller pair 256 so as to be collected in the desensitizing process vessel 228.

Moreover, a replenishing water tank 306 is provided in the PS plate processor 210 so that the water in the replenishing water tank 306 is used as the diluting water for diluting the replenishing liquid for the developing liquid used in the developing part 214, or as the washing water in the water washing part 216.

Furthermore, in the desensitizing process section 218, the water in the replenishing water tank 306 is supplied to the desensitizing process vessel 228 by the operation of the water supply pump 308. In the PS plate processor 210, the water in the replenishing water tank 306 is used as the diluting water for the gum liquid such that it is supplied according to the moisture evaporation amount, or the like from the gum liquid stored in the desensitizing process vessel 228 for maintaining the component in the gum liquid in a predetermined concentration range (the appropriate concentration range of the gum liquid for protecting the plate surface of the PS plate 212). Moreover, the PS plate processor 210 is provided with a mechanism for replenishing the developing liquid to the developing vessel 224 and for supplying the washing water to the water washing vessel 226, but illustration and explanation are not provided in this embodiment concerning the diluting water for diluting the replenishing liquid for the developing liquid and the supply of the washing water.

By the adhesion of the gum liquid squeezed off from the PS plate 212, remaining on the conveying roller pair 256 provided in the desensitizing process section 218 may cause rotation failure, deteriorate the finish of the PS plate 212 by being transferred onto the surface of the PS plate 212 to be processed next by the adhered gum liquid, or cause the flaw on the surface of the PS plate 212.

In the PS plate processor 210, in order to prevent generation of the finish failure, or the like of the PS plate 212, the circumferential surface of the conveying roller pair 256 is washed by a predetermined timing for washing off the gum liquid so as to prevent adhesion of the component in the gum liquid onto the circumferential surface of the conveying roller pair 256.

Here, the washing operation of the conveying roller pair 256 in the desensitizing process section 218 of the PS plate processor 210 will be explained.

As shown in FIG. 8 and FIG. 9, the conveying roller pair 256 provided in the desensitizing process section 218 comprises an upper side roller 256A and a lower side roller 256B. In the desensitizing process section 218, an idle roller 320 is provided facing the upper side roller 256A of the conveying roller pair 256.

Figure 11:
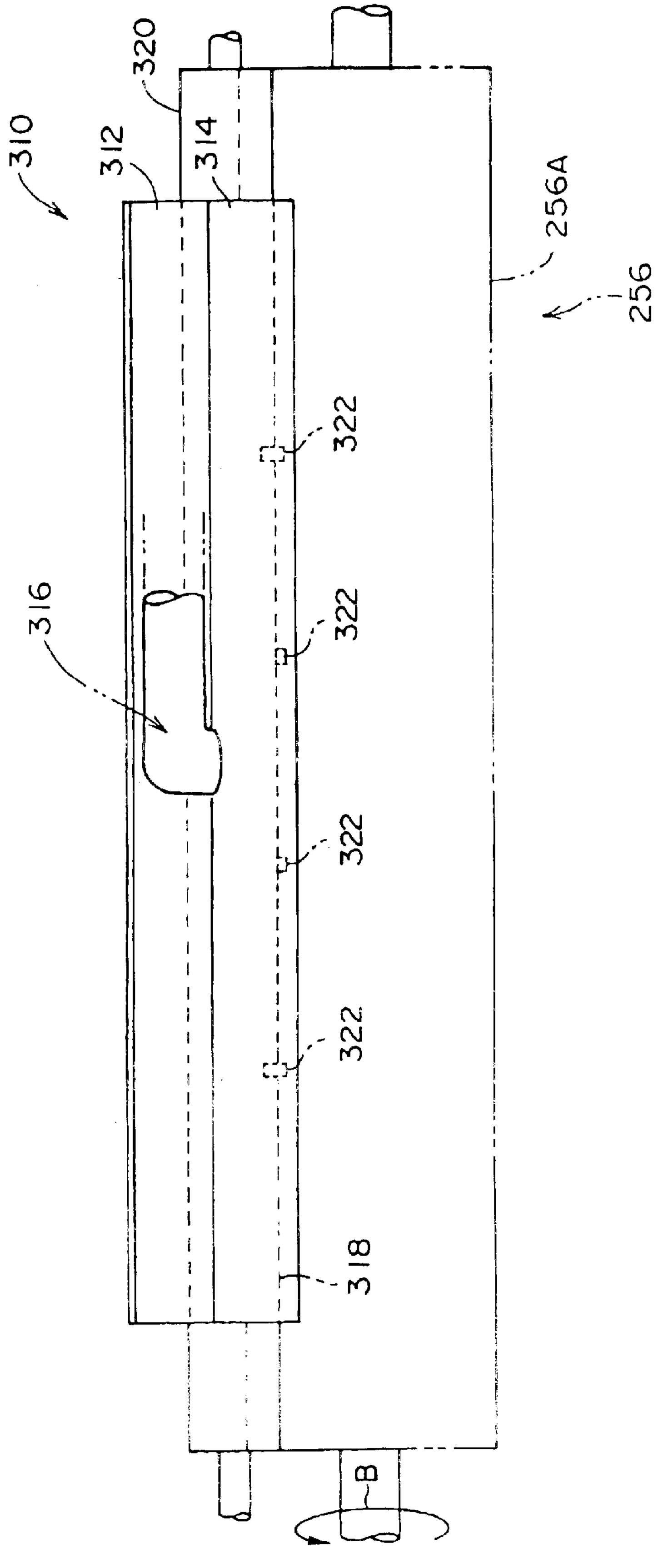
FIG. 11 is a schematic diagram showing the configuration of the arrangement of the roller, the idle roller, and the water supply bucket, viewed from above the conveying path for the PS plate.

As shown in FIG. 11, the idle roller 320 has the length along the axis direction substantially same as the length along the axis direction of the roller 256A, and the idle roller 320 is disposed with the axis parallel with the axis of the roller 256A.

Figure 10:
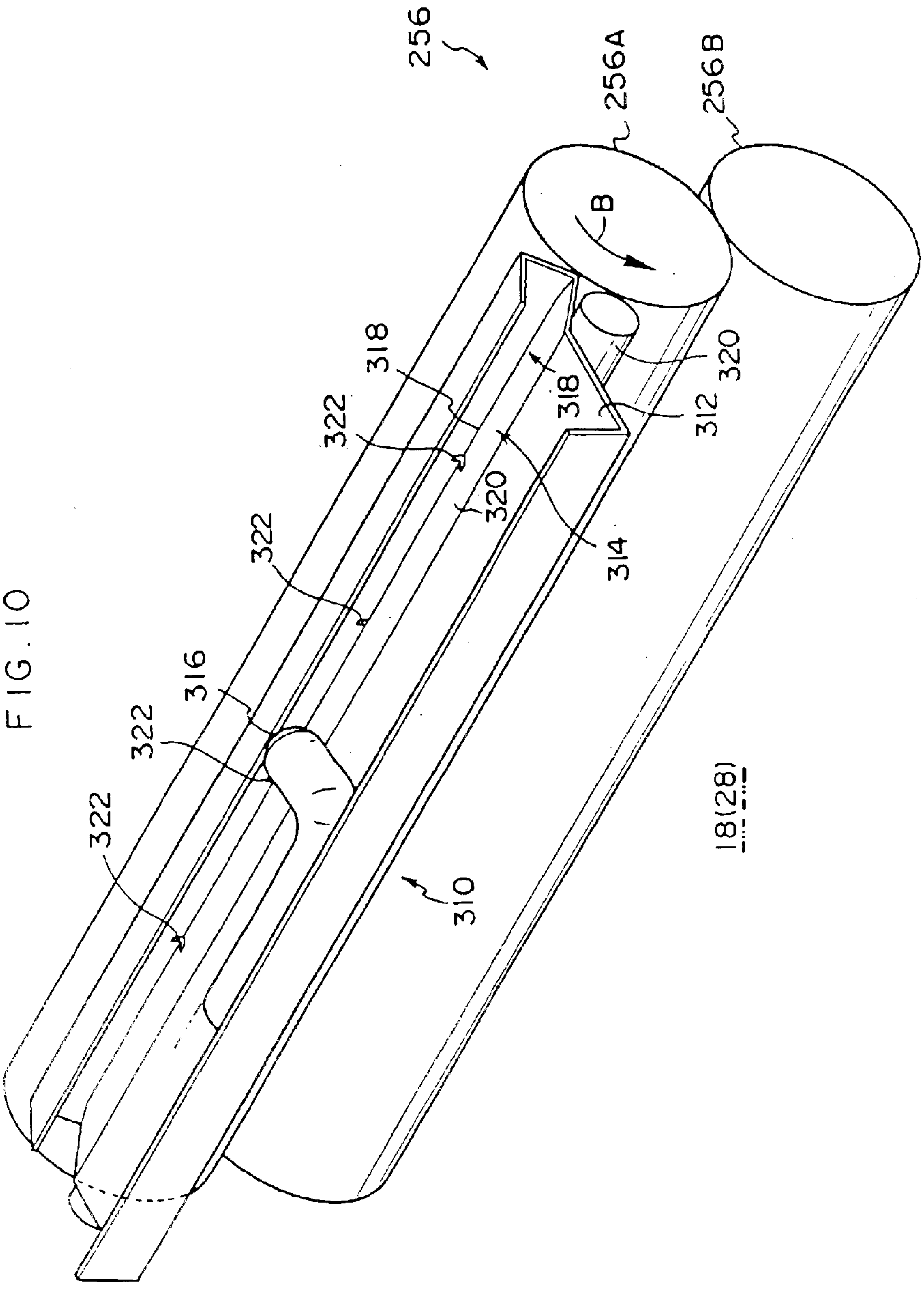
FIG. 10 is an essential part perspective view showing the schematic configuration of an idle roller and a water supply bucket disposed facing to roller.

Moreover, as shown in FIG. 9 and FIG. 10, the idle roller 320 is contacted with the circumferential surface of the roller 256A on the upstream side in the conveyance direction of the PS plate 212 so as to be rotated following the rotation of the roller 256A when the roller 256A is rotated (rotation in the arrow B direction).

The contact position of the idle roller 320 with the roller 256A is not limited to the upstream side in the conveyance direction of the PS plate 212 but it can also be the downstream side as long as it is on the lower side with respect to the top part of the roller 256A (end part on the upper side) and until the axis position height. Moreover, the idle roller 320 can be one contacted with the circumferential surface of the roller 256A by its self weight. Furthermore, it can be one contacted with the circumferential surface of the roller 256A by a predetermined urging force.

In contrast, as shown in FIG. 8 to FIG. 11, a water supply bucket 310 is provided in the desensitizing process section 218. As shown in detail in the FIG. 8 to FIG. 11, the water supply bucket 310 is formed by bending a flat plate with a predetermined width into a shape with a horizontal part 312, and a bucket part 314 elongating downward in a substantially V shape from the horizontal part 312.

The water supply bucket 310 is disposed with the longitudinal direction parallel with the axis of the idle roller 320, and it is mounted with the bottom part 318 of the lower end of the bucket part 314 disposed above the contact part of the idle roller 320 and the roller 256A.

The horizontal part 312 of the water supply bucket 310 is provided with a nozzle 316 communicating with the water supply pump 308, with the nozzle 316 opened to the bucket part 314. The nozzle 316 opening position is the central position along the axis direction of the idle roller 320 to be the middle part of the longitudinal direction of the water supply bucket 310.

Thereby, the water in the replenishing water tank 306 is supplied to the bucket part 314 of the water supply bucket 310 by the operation of the water supply pump 308. Moreover, the water is provided to the both end sides in the longitudinal direction along the bottom part 318 of the substantially V-shaped bucket part 314.

As shown in FIG. 10 and FIG. 11, in the bucket part 314, a plurality of through holes 322 are formed at a predetermined position in the vicinity of the bottom part 318 shaped in the substantially V shape. The through holes 322 are provided by a predetermined interval along the longitudinal direction of the bucket part 314.

Thereby, the water supplied from the nozzle 316 is dropped from the through holes 322 to the contact part of the roller 256A and the idle roller 320. Moreover, in the water supply bucket 310, the water reached at the end part of the bucket part 314 without falling off from the through holes 322 is dropped from the end part of the bucket part 314 to the contact part of the roller 256A and the idle roller 320.

It is preferable that the through holes 322 are formed at a position away from the bottom part 318 on the middle part side in the longitudinal direction of the bucket part 314, and across the bottom part 318 on the both end part sides in the longitudinal direction. Thereby, a substantially equal amount of the waters can be dropped from each of the plurality of the through holes 322.

In contrast, since the contact part between the roller 256A and the idle roller 320 is closed, the water dropped from the through holes 322 is spread along the axis direction of the roller 256A without dropping off between the roller 256A and the idle roller 320.

That is, since the water dropped on the contact part of the roller 256A and the idle roller 320 is spread along the axis direction of the roller 256A, the water can be supplied evenly along the axis direction of the roller 256A. At the time, since the idle roller 320 has the substantially same length as that of the roller 256A along the axis direction, the water reaches to the shaft end of the roller 256.

In contrast, as shown in FIG. 9, the PS plate processor 210 is provided with a control section 324 connected each to the replenishing liquid pump 302 provided in the desensitizing process section 218, the liquid supply pump 304 and the water supply pump 308. The operation of each of the replenishing liquid pump 302, the liquid supply pump 304 and the water supply pump 308 is controlled by the control section 324. Moreover, the control section 324 is connected to a driving source 326 for a motor, or the like for rotation drive of the conveying roller pair 256 so that the control section 324 controls the drive of the driving source 326 according to the process of the PS plate 212 by the PS plate processor 210.

In contrast, the control section 324 washes the conveying roller pair 256 by operating the driving source 326 together with the water supply pump 308 at the time of for example, stopping the operation of the PS plate processor 210, and washes off the gum liquid adhered on the circumferential surface of the rollers 256A, 256B of the conveying roller pair 256 by the process of the PS plate 212.

In the desensitizing process section 218 accordingly provided, for example, in order to wash off the gum liquid adhered on the circumferential surface of the conveying roller pair 256 at the time of stopping the operation of the drive after finishing the process for the day of the PS plate processor 210, the control section 324 operates the water supply pump 308. Thereby, the water in the replenishing water tank 306 is supplied to the washing bucket 310 as the washing water. At the same time, the control section 324 operates the driving source 326 for rotating the conveying roller pair 256. For the calculation of the washing timing of the conveying roller pair 256 and the amount of the water to be used for washing, the conventionally known timing and method can be used.

In the desensitizing process section 218, by the operation of the liquid supply pump 308, the water is supplied to the bucket part 314 of the washing bucket 310. The water flows to the both end sides along the bottom part 318 of the bucket part 314 so as to be dropped from the through holes 322 onto the contact part of the roller 256A of the conveying roller pair 256 and the idle roller 320. Moreover, the water reached at the both end parts of the bucket part 314 is dropped from the end parts of the bucket part 314 to the vicinity of the axis end part of the roller 256A in the contact part of the roller 256A and the idle roller 320.

Since dropping of the water accordingly dropped to the contact part of the roller 256A and the idle roller 320 is prevented by the idle roller 320 contacting with the circumferential surface of the roller 256A, the water is spread in the axis direction of the roller 256A along the contact part so that the washing water can be supplied reliably in the entire region in the axis direction of the roller 256A.

In the control section 324, the driving source 326 is driven by a predetermined timing so as to rotate the conveying roller pair 256 (rollers 256A, 256B). The idle roller 120 is rotated, following the rotation of the roller 256A.

Thereby, the region in contact with the water supplied between the roller 256A and the idle roller 320 is rotated and moved to the roller 256B side in the wet state, and furthermore, the surface of the roller 256B is wetted thereby by the contact with the roller 256B.

Moreover, a new region of the roller 256A is rotated to the contact part with the idle roller 320 so as to be soaked in the water remaining on the contact part with the idle roller 320. Thereby, the water can be supplied not only to the entire region on the circumferential surface of the roller 256A but also the entire region on the circumferential surface of the roller 256.

Therefore, the gum liquid adhered on the circumferential surface of the rollers 256A, 256B of the conveying roller pair 256 is thinned by the water supplied from the water supply bucket 310 to the idle roller 320 as well as it is squeezed off from the circumferential surface of the rollers 256A, 256B together with the water by the contact and rotation of the roller 256A and the roller 256B so as to be dropped into the desensitizing process vessel 228 and eliminated from the circumferential surface of the rollers 256A, 256B. That is, the gum liquid adhered on the circumferential surface of the rollers 256A, 256B is washed off from the circumferential surface of the rollers 256A, 256B by the water supplied from the water supply bucket 310 between the roller 256A and the idle roller 320.

As to the water supply timing at the time of accordingly washing the conveying roller pair 256 and the rotation timing of the conveying roller pair 256, various timings can be used.

Here, with reference to FIG. 12A and FIG. 12B, an example thereof will be explained.

Figure 12A:
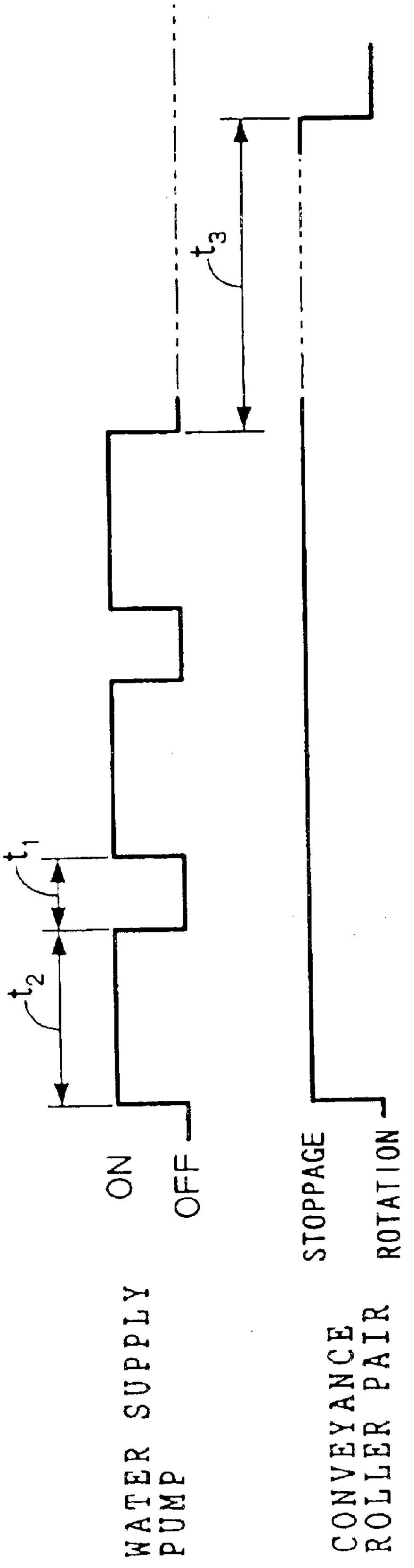
FIGS. 12A and 12B are timing charts each showing a preferable adoption example of the water supply timing and the driving timing of the conveying roller pair.

In the timing charge shown in FIG. 12A, a predetermined amount (for example, total 200 cc) of the water is supplied by intermittently operating the water supply pump 308 while rotating the conveying roller pair 256. That is, while rotating the roller 256A and the idle roller 320, the washing water is supplied between the roller 256A and the idle roller 320 per a predetermined amount.

At the time, by providing the time $t_1$ for stopping the water supply pump 308 (for example, about 2 sec to 3 sec), overflow of the water supplied between the roller 256A and the idle roller 320 so as to deteriorate the washing efficiency, can be prevented. That is, by providing the time $t_1$ for stopping the water supply after operating the water supply pump 308 by a predetermined time $t_2$, the circumferential surface of the rollers 256A, 256B can be washed using all the water supplied between the roller 256A and the idle roller 320.

Moreover, it is preferable to rotate the conveying roller pair 256 for a predetermined time $t_3$ (for example, 30 sec) after stoppage of the water supply pump 308 (water supply stoppage). Thereby, the gum liquid can be dropped from the rollers 256A, 256B together with the water supplied to the circumferential surface of the rollers 256A, 256B so that the so-called draining effect can be improved.

Figure 12B:
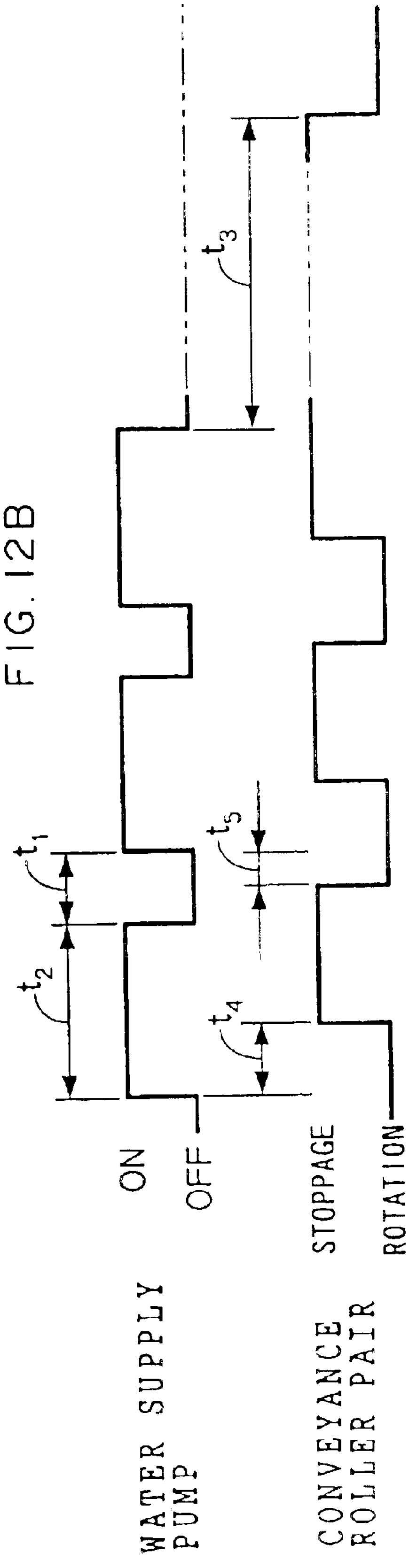

In contrast, as shown in FIG. 12B, the rotation of the conveying roller pair 256 is started, delayed by a predetermined time t4 (for example, about 2 sec to 3 sec) from the start of the water supply between the roller 256A and the idle roller 320 by operating the water supply pump 308.

Thereby, since the time for spreading the water supplied between the roller 256A and the idle roller 320 in the roller 256A axis direction can be provided, the washing water can be supplied reliably in the entire region along the axis direction of the rollers 256A, 256B.

Thereafter, the conveying roller pair 256 is rotated intermittently. The time $t_5$ from the halfway stoppage of the rotation of the conveying roller pair 256 to the start of the water supply by operating the water supply pump 308 can be set optionally as long as at least the rotation drive of the conveying roller pair 256 is stopped at the time of starting the water supply. For example, it can be $t_5=0$.

By accordingly setting the driving timing of the water supply pump 308 and the conveying roller pair 256 in consideration of the water supply amount per one time and the water supply time, and the total water supply amount, the conveying roller pair 256 can be washed efficiently with a small amount of the water. The times $t_1$ to $t_5$ can be set optionally according to the configuration of the desensitizing process section 218, or the like.

By reliably washing the conveying roller pair 256 accordingly, adhesion of the component in the gum liquid onto the rollers 256A, 256B can be prevented reliably. Moreover, by efficiently washing the rollers 256A, 256B, too much thinning of the gum liquid stored in the desensitizing process vessel 228 by a large amount of the washing water can be prevented.

Moreover, in the PS plate processor 210, generation of the finish failure of the PS plate 212 due to thinning of the gum liquid can be prevented as well as generation of the finish failure due to adhesion to the surface of the PS plate 212 of the component in the gum liquid adhered on the rollers 256A, 256B, stoppage of the rotation of the rollers 256A, 256B thereby, and further, damage of the surface of the PS plate 212 can reliably be prevented.

The configuration of the present invention is not limited by the third embodiment heretofore explained. For example, although the example adopted in the PS plate processor 210 using the PS plate 212 as the photosensitive material, and processing the PS plate 212 has been explained. The present invention can be adopted in a configuration for washing the rollers disposed outside the liquid also in the photosensitive planographic printing plate processing devices of various configurations used for the process of not only the PS plate 212 but also for the other photosensitive planographic printing plate, and the photosensitive material processing devices used for the process of the other photosensitive materials, such as a printing paper, a photography film, or the like.

Moreover, although the water is used as the washing water for the conveying roller pair 256 in this embodiment, it is not limited thereto, but it can also be a water soluble liquid containing a moist mildew preventing agent, or the like.

Furthermore, although the water is supplied by a predetermined interval along the axis direction of the roller 256A using the water supply bucket 310 in this embodiment, the water can be supplied directly from the nozzle 216 between the roller 256A and the idle roller 320 without using the water supply bucket 210, or the like. Moreover, not only the water supply bucket 310, but also an optional water supply method can be adopted.

Fourth Embodiment

Figure 13:
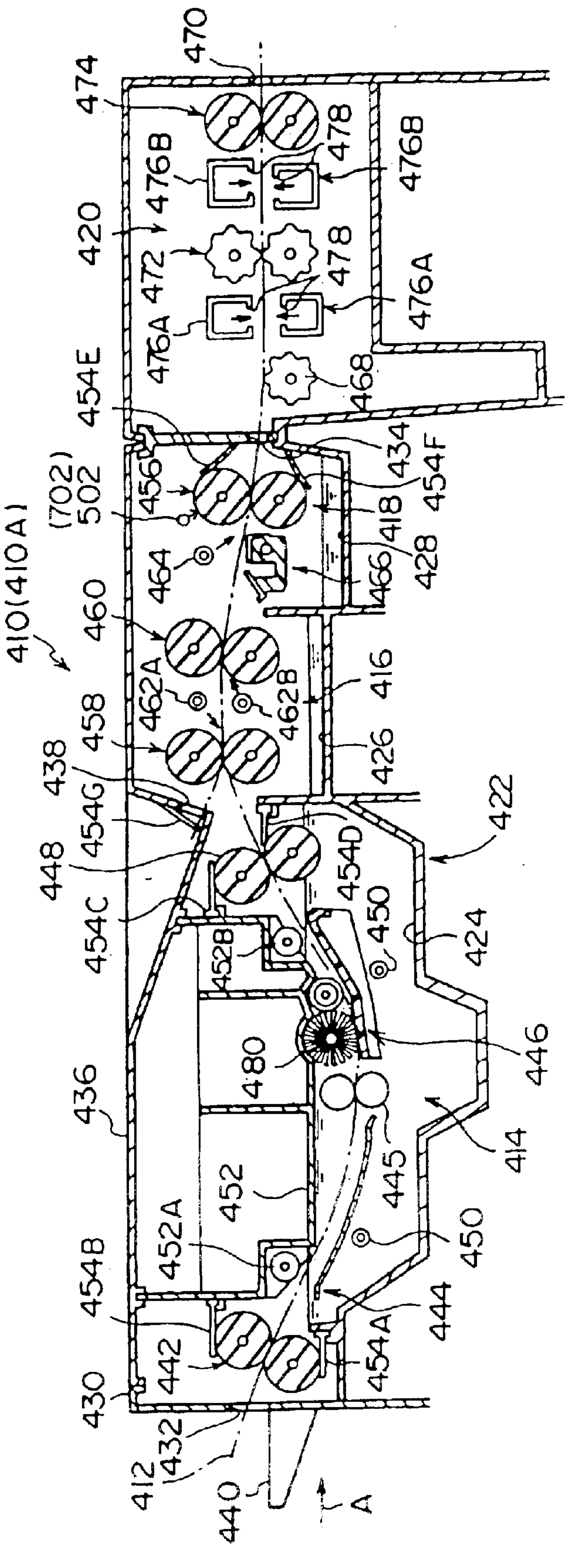
FIG. 13 is a schematic diagram showing the configuration of a PS plate processor according to the fourth embodiment.

Next, a fourth embodiment will be explained. FIG. 13 shows an example of a PS plate processor adopted in this embodiment as the photosensitive material processing device (hereinafter referred to as the "PS plate processor 410").

The PS plate processor 410 is for performing a developing process of a photosensitive planographic printing plate such as a photo polymer plate after image-wise exposure by an exposing device (not shown) as the photosensitive material (hereinafter referred to as the "PS plate 412"). The PS plate 412 comprises a thin rectangular flat plate such as an aluminum plate as the supporting body, and a photosensitive layer formed on the supporting body. The photo polymer plate is provided with a photosensitive layer by superimposing a photo adhesion layer, a photo polymerization layer, and an overcoat layer such that the polymerization reaction in the image part of the photo polymerization layer is promoted by the image-wise exposure by a laser beam.

The PS plate processor 410 is provided with a developing section 414 for processing the PS plate 412 with a developing liquid, a water washing section 416 for supplying the washing water to the PS plate 412 processed with the developing liquid for washing the same with the water, a desensitizing process section 418 for applying a gum liquid to the PS plate 412 after washing with the water for the desensitizing process, and a drying section 420 for drying the PS plate 412. That is, in the PS plate processor 410, the developing process, the water washing process, the desensitizing process and the drying step are disposed successively along the conveyance direction of the PS plate 412 (arrow A in FIG. 13).

In the PS plate processor 410, a processing tank 422 is provided. In the processing tank 422, a developing vessel 424 is formed at a position to be the developing section 414 as a processing vessel, and a water washing vessel 426 and a desensitizing vessel 428 are formed at a position to be the water washing section 416 and the desensitizing process section 418.

In an outer plate panel 430 covering the processing tank 422, a slit-like insertion opening 432 is formed, and a discharge opening 434 is formed on the drying section 420 side in the processing tank 422.

In the PS plate processor 410, a cover 436 for covering the upper part of the processing tank 422 is provided. The cover 436 integrally covers the developing process, the water washing process and the desensitizing process provided in the processing tank 422. Moreover, a reentry insertion opening (sub insertion opening) 438 is provided in the cover 436 for inserting the PS plate 412 between the developing section 414 and the water washing section 416. The sub insertion opening 438 is for inserting the PS plate 412 for performing the process in the PS plate processor 410 except the process in the developing section 414.

An insertion base 440 is provided outside the insertion opening 432, and a rubber conveying roller pair 442 is provided on the PS plate 412 insertion side of the developing section 414. The PS plate 412 with the image printed is placed on the insertion base 440 so as to be inserted from the insertion opening 432 along the arrow A direction and sent between the conveying roller pair 442.

The conveying roller pair 442 is rotated by the driving force of a driving device (not shown) for taking in the PS plate 412, and sending the same into the developing section 414 by about a 15° to 31° angle range with respect to the horizontal direction. In this embodiment, a one side type PS plate 412 with a photosensitive layer formed on one surface of the supporting body is used. The PS plate 412 is inserted from the insertion opening 432 into the PS plate processor 410 in the state with the photosensitive layer disposed upward.

The developing vessel 424 formed in the processing tank 422 has a substantially protruded shape with the bottom part center projecting downward for storing the developing liquid for performing the developing process for the PS plate 412 as the processing liquid. In the developing vessel 424, guide plates 444, 446 are disposed along the bottom part on the lower side along the conveyance direction of the PS plate 412.

The guide plate 444 is provided on the upstream part (insertion opening 432 side) of the developing vessel 424 for guiding the PS plate 412 introduced by the conveying roller pair 442 obliquely downward. Moreover, the guide plate 446 is provided on the downstream part of the developing vessel 424 for guiding the PS plate 412 obliquely upward along the bottom surface of the developing vessel 424.

Moreover, in the developing vessel 424, a conveying roller pair 445 is provided between the guide plate 444 and the guide plate 446. The conveying roller pair 445 provides the conveyance force to the PS plate 412 being guided by the guide plate 444 and sends out the same to the guide plate 446 while being rotated. Thereby, the PS plate 412 is soaked in the developing liquid while being guided and conveyed in a substantially U shape in the developing vessel 424.

In the developing vessel 424, a conveying roller pair 448 with the outer circumference made of a rubber is disposed on the water washing section 416 side so that the PS plate 412 is guided by the guide plate 446 toward the conveying roller pair 448 so as to be nipped by the conveying roller pair 448 and taken out from the developing vessel 424. The PS plate 412 is soaked in the developing liquid while being conveyed accordingly in the developing vessel 424 so that the unnecessary part of the photosensitive layer exposed by the image-wise exposure is swelled by the developing liquid, and peeled off from the supporting body so as to eliminate the unnecessary photosensitive layer according to the image exposed.

In the developing vessel 424, a spray pipe 450 is provided on the lower surface side of the guide plates 444, 446. Furthermore, a large number of liquid passage holes (not shown) are projected in each of the guide plates 444, 446.

To the spray pipe 450, the developing liquid in the developing vessel 424 suctioned by a pump (not shown) is supplied so that the developing liquid is jetted from the spray pipe 450. Thereby, the developing liquid in the developing vessel is agitated so as to enable the even process of the PS plate 412. At the time, by providing the developing liquid from the liquid passage holes formed in the guide plates 444, 446 to the conveying path side of the PS plate 412, the quick developing process of the PS plate 412 and prevention of the processing irregularity generation can be achieved.

Moreover, in the developing vessel 424, a brush roller 480 is provided facing the guide plate 446. The brush roller 480 brushes the surface of the PS plate 412 by rotating with the hairy material in contact with the surface of the PS plate 412 being conveyed on the guide plate 446 while being soaked in the developing liquid so as to promote elimination of the unnecessary photosensitive layer from the surface of the PS plate 412.

In the developing section 414, a liquid surface lid 452 is disposed with the lower surface below the liquid surface of the developing liquid stored in the developing vessel 424. Moreover, shielding members 454A, 454B are provided on the insertion opening 432 side on the developing vessel 424 wall surface and the liquid surface lid 452, and shielding members 454C, 454D are mounted on the water washing part 424 side. In the processing tank 422, shielding members 454E, 454F contacting with the circumferential surface of the conveying roller pair 456 are mounted in the vicinity of the discharge opening 434, and a shielding member 454G is mounted on the sub insertion opening 438 of the cover 436.

The shielding members 454A to 454G are made of a silicone rubber, or the like. In the developing vessel 424, a large capacity liquid surface lid 452 contacting with the liquid surface is provided in the space in the sealed part provided by the shielding members 454A to 454G, the conveying roller pairs 442, 448, or the like, for reducing the amount of the air contained in the space as well as for preventing entrance of fresh air in the vicinity of the liquid surface of the developing liquid by the liquid surface lid 452, the shielding members 454A to 454G, or the like so that deterioration of the developing liquid by the carbon gas in the air and the moisture evaporation can be restrained. The liquid surface lid 452 is provided with skewered rollers 452A, 452B on the end part lower surface on the upstream side and the downstream side in the conveyance direction of the PS plate 412 so that damage of the surface (mainly the photosensitive surface) due to contact of the PS plate 412 being conveyed in the developing section 414 with the lower surface of the liquid surface lid 452 can be prevented.

The PS plate 412 taken out from the developing vessel 424 by the conveying roller pair 448 is sent into the water washing section 416 while squeezing off the developing liquid adhered on the surface by the conveying roller pair 448.

In the water washing section 416, the conveying path for conveying the PS plate 412 by the conveying roller pairs 458, 460 disposed above the water washing vessel 426 in the substantially horizontal state is formed so that the PS plate 412 is conveyed horizontally above the water washing vessel 426 by being nipped by the conveying roller pairs 458, 460.

In the water washing section 416, spray pipes 462A, 462B are provided as a pair on the upper side and the lower side with respect to the PS plate 412 conveying path between the conveying roller pairs 458, 460. The spray pipes 462A, 462B are disposed with the axis direction along the PS plate 412 width direction (direction orthogonal to the conveyance direction), with a plurality of ejection holes formed facing the PS plate 412 conveying path and along the axis direction of the spray pipes 462A, 462B.

The water washing vessel 426 stores the washing water as the processing liquid. In the PS plate processor 410, the washing water is supplied to the spray pipes 462A, 462B synchronously with the conveyance of the PS plate 412 by a water supply pump (not shown). Thereby, the washing water is jetted from the spray pipes 462A, 462B to the PS plate 412 so as to wash off the developing liquid adhered on the surface of the PS plate 412.

The washing water supplied to the PS plate 412 is squeezed off from the front and rear surfaces of the BS plate 412 together with the developing liquid adhered on the front and rear surfaces of the PS plate 412 by nipping and sending out the PS plate 412 by the conveying roller pair 460 so as to be collected in the water washing vessel 426. As to the jetting direction of the washing water from the spray pipes 462A, 462B, it is set for the spray pipe 462A to be the upstream side in the conveyance direction of the PS plate 412, and it is set for the spray pipe 462B to be the downstream side in the conveyance direction of the PS plate 412, but it is not limited thereto, and another direction can be used. The new liquid of the washing water is supplied to the water washing vessel 426 by a device (not shown) according to the PS plate 412 processing amount.

In the desensitizing process section 418, a conveying roller pair 456 is provided above the desensitizing process vessel 428. After being conveyed in the desensitizing process section 418 by the conveying roller pair 456, the PS plate 412 is sent out from the discharge opening 434.

In the desensitizing process section 418, a spray pipe 464 is provided on the upper side of the conveying path of the PS plate 412, and an ejection unit 466 is provided on the lower side of the conveying path. The spray pipe 464 and the ejection unit 466 are disposed above and below with the conveying path of the PS plate 412 interposed therebetween, with the longitudinal direction (axis direction) along the width direction of the PS plate 412. A plurality of ejection holes are formed in the spray pipe 464 along the PS plate 412 width direction, and a slit hole is formed in the ejection unit 466 along the PS plate 412 width direction.

In the desensitizing process vessel 428, a gum liquid used for protection of the plate surface of the PS plate 412 is stored. The gum liquid is supplied to the spray pipe 464 and the ejection unit 466 synchronously with the conveyance of the PS plate 412. The spray pipe 464 drops the gum liquid toward the PS plate 412 for applying the same spread on the surface of the PS plate 412. Moreover, the ejection unit 466 ejects the gum liquid from the slit hole. While moving the PS plate 412 in contact with the gum liquid, the gum liquid is coated on the PS plate.

In the PS plate 412, a protection film is formed by the gum liquid coated on the front and rear surfaces. The ejection direction of the gum liquid from the spray pipe 464 is not limited to the PS plate 412 conveyance direction downstream side, but it can be another direction. Moreover, it is also possible to provide a straightening vane for directing the gum liquid jetted toward the straightening vane to the PS plate 412 surface for coating by flowing down while evenly diffusing the gum liquid by the straightening vane along the PS plate 412 width direction. Moreover, it is also possible to use a spray pipe, or the like instead of the ejection unit 466.

In the desensitizing process section 418, a washing spray 501 is provided above the conveying roller pair 456 so that the gum liquid can be washed off from the circumferential surface of the rollers comprising the conveying roller pair 456 by the washing water dropped from the washing spray 502 onto the circumferential surface of the conveying roller pair 456 by a preset predetermined timing so as to prevent damage of the PS plate 412 derived from adhesion of the gum liquid on the circumferential surface of the rollers.

The PS plate 412 coated with the gum liquid in the desensitizing process section 418 is nipped by the conveying roller pair 456 so as to be discharged from the discharge opening 434 in the state with the gum liquid slightly remaining on the front and rear surfaces, and sent into the drying section 420.

In the drying section 420, a supporting roller 468 for supporting the PS plate 412 is provided in the vicinity of the discharge opening 434. Moreover, a conveying roller pair 472 and a conveying roller pair 474 are provided in the central section of the PS plate conveying path 412 as well as in the vicinity of the discharge opening 470. The PS plate 412 is conveyed in the drying section 420 by the supporting roller 468 and the conveying roller pairs 472, 474.

Ducts 476A, 476B are provided between the supporting roller 468 and the conveying roller pair 472, and between the conveying roller pair 472 and the conveying roller pair 474 as a pair with the PS plate 412 conveying path interposed therebetween. The ducts 476A, 476B are disposed with the longitudinal direction along the PS plate 412 width direction, with slit holes 478 provided on the surface facing the PS plate 412 conveying path.

When the drying air generated by a drying air generating device (not shown) is supplied from one end side in the longitudinal direction, the ducts 476A, 476B eject the drying air from the slit holes 478 toward the PS plate 412 conveying path for blowing the same to the PS plate 412. Thereby, the gum liquid coated on the front and rear surfaces of the PS plate 412 are dried so as to form the protection film. The discharge opening 434 is provided with a shutter (not shown) for sectioning a processor section until the desensitizing process section 418 for processing the PS plate 412 with the processing liquid, and the drying section 420 so as to prevent entrance of the heated air in the drying section 420 into the desensitizing process section 418 by inadvertent opening of the discharge opening 434.

In the developing vessel 424, spray pipes 450, 451 are provided on the lower surface side of the guide plates 444, 446 so that the developing liquid in the developing vessel 424 can be agitated by the developing liquid jetted from the spray pipes 450, 451.

Figure 14:
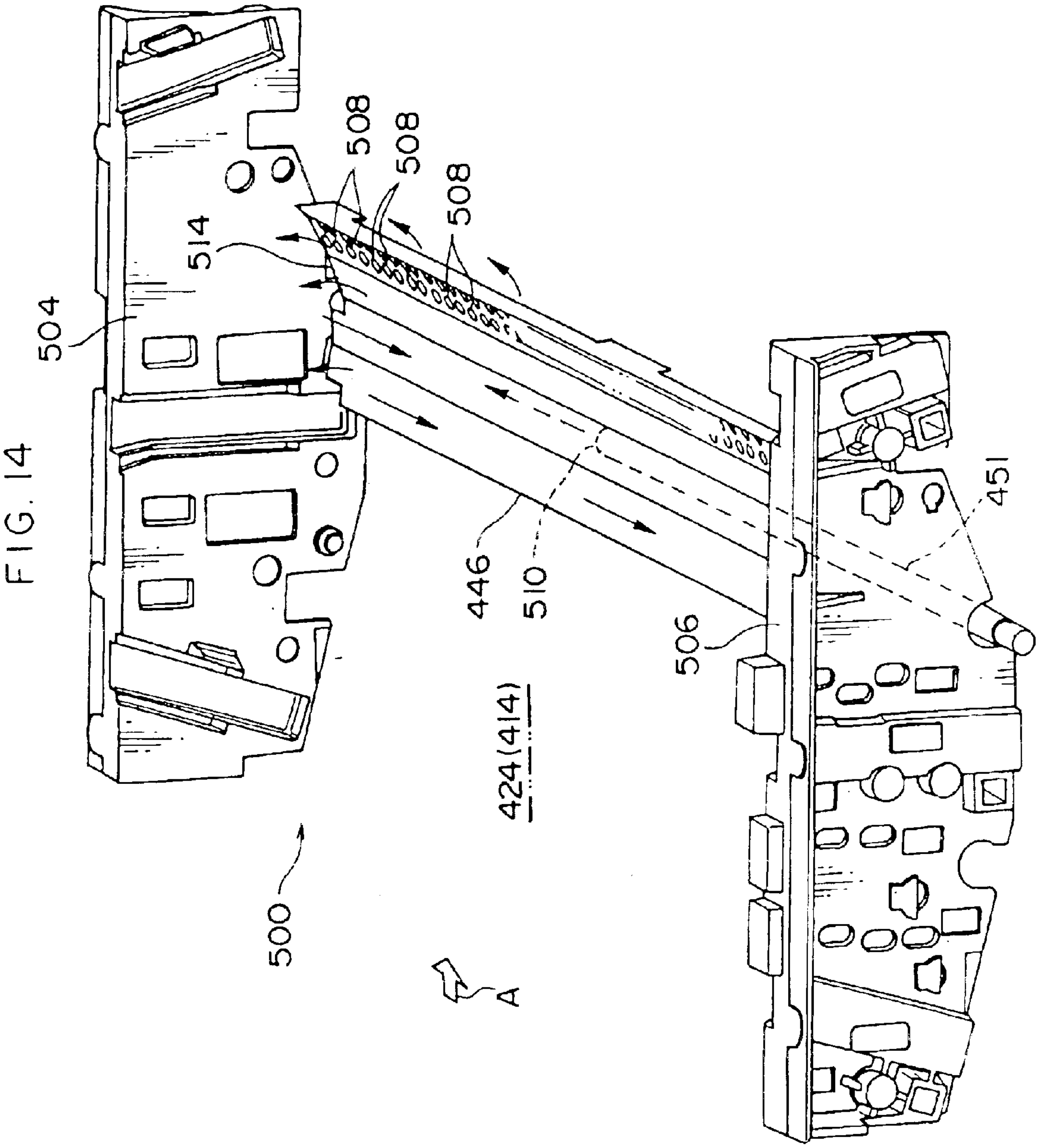
FIG. 14 is a schematic perspective view showing the essential part of the processing rack.
Figure 15:
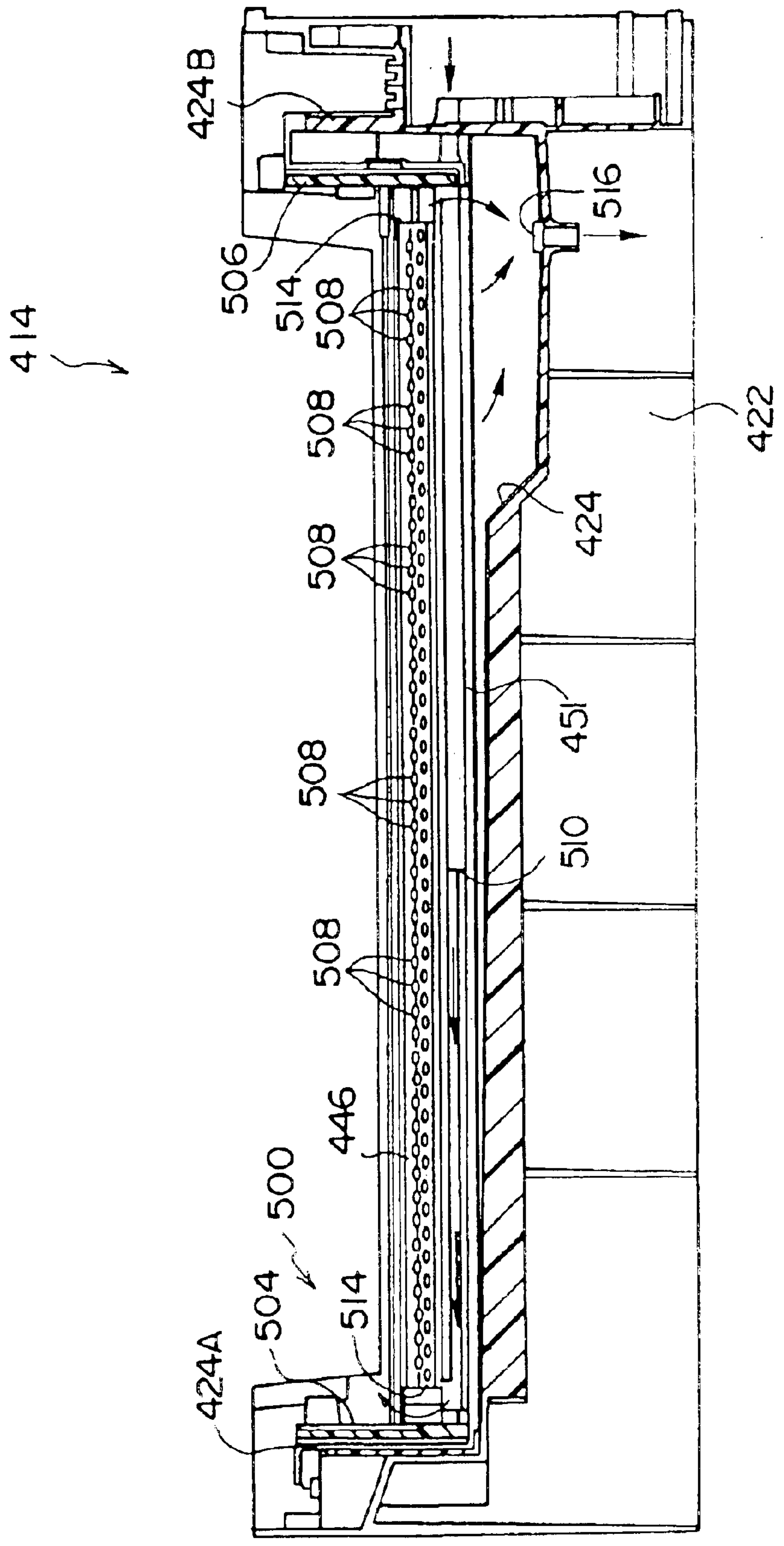
FIG. 15 is a schematic diagram showing the essential part of a developing vessel with the processing rack provided, viewed from the PS plate conveyance direction.

As shown in FIG. 14 and FIG. 15, a processing rack 500 is provided in the developing vessel 424. The processing rack 500 comprises a pair of side plates 504, 506. Moreover, as shown in FIG. 15, the processing rack 500 is mounted with each of the side plates 504, 506 facing the side walls 424A, 424B of the developing vessel.

The processing rack 500 is provided with the above-mentioned conveying roller pairs 442, 445, 448 and brush roller 480 (FIG. 13) comprising the PS plate 412 conveying path between the pair of the side plates 504, 506.

Moreover, as shown in FIG. 14 and FIG. 15, a guide plate 446 is disposed between the side plates 504, 506. A large number of communication holes 508 are formed in the guide plate 446. Thereby, passage of the processing liquid is enabled between the guide plate 446 conveying path side and the processing vessel 424 bottom part side (the upper surface side and the lower surface side of the guide plate 446).

Next, a spray pipe 451 is provided below the guide plate 446. As shown in FIG. 15, the spray pipe 451 is projected from one side wall 424B of the processing vessel 424 to the other side wall 424A along the PS plate 412 conveying path width direction such that the tip end reaches to the middle part in the width direction of the conveying path of the PS plate 412.

As shown in FIG. 13, a circulation pump 512 is provided in the developing section 414 of the PS plate processor 410 so that the developing liquid can be supplied to the spray pipe 450, 451 by the operation of the circulation pump 512.

As shown in FIG. 14 and FIG. 15, the spray pipe 451 has the tip end opening opened toward the other side wall 424A of the developing vessel 424 as a jetting opening 510. According to the supply of the developing liquid from the circulation pump 512, the spray pipe 451 jets the developing liquid from the jetting opening 510 toward the side wall 424A along the PS plate 412 width direction. In FIG. 14 and FIG. 15, the schematic flow of the developing liquid between the side plates 504, 506 is shown by the arrows.

The spray pipe 450 (see FIG. 13) provided on the upstream side in the conveyance direction of the PS plate 412 is disposed along the PS plate 412 width direction, with the both ends interlocked with the side walls 424A, 424B of the developing vessel 424. Moreover, a large number of jetting holes (not shown) are formed on the outer circumferential part in the spray pipe 450 so as to provide an ordinary configuration for jetting the developing liquid supplied from the circulation pump 512 along the bottom surface of the developing vessel 424 or the conveyance direction of the PS plate 412.

In contrast, as shown in FIG. 14 and FIG. 15, a notch part 514 is formed on the end parts on the side plates 504, 506 sides of the processing rack 500. Thereby, the developing liquid jetted from the jetting opening 510 of the spray pipe 451 is collided with the side plate 504 so as to be returned and flow out from the notch part 514 of the side plate 504 to the upper surface side of the guide plate 446. Moreover, it flows from the side wall 424A side of the developing vessel 424 to the side wall 424B side on the upper surface side of the guide plate 446.

That is, by jetting the developing liquid from the spray pipe 451, the developing liquid flow is created along the width direction of the PS plate 412 in the PS plate 412 conveying path on the upper surface side of the guide plate 446.

Moreover, as shown in FIG. 15, a suction opening 516 is provided on the side wall 424B side in the bottom part of the developing vessel 424. That is, the spray pipe 451 has a length from the side wall 424B of the developing vessel 424 to a position reaching ahead of the suction opening 516.

The developing liquid in the developing vessel 424 is sucked out from the suction opening 516 by the operation of the circulation pump 512. Thereby, the developing liquid on the side wall 424B side of the developing vessel 424 (the side plate 506 side of the processing rack 500) can flow into the suction opening 516.

In the PS plate processor 410 accordingly provided, when the PS plate 412 with an image recorded by a printing device (not shown), or the like is placed on the insertion base 440 so as to be inserted into the insertion opening 432, the PS plate 412 is taken in by the conveying roller pair 442 so as to be sent into the developing section 414. In the PS plate processor 410, when the PS plate 412 passing through the insertion opening 432 is detected by a sensor (not shown), a timer is started. The timer is used for measuring the timing for ejecting the washing water from the spray pipes 462A, 462B of the water washing section 416, and the timing for ejecting the gum liquid in the desensitizing process section 418 together with the operation of the driving device for conveying the PS plate 412.

In the developing section 414, the PS plate is sent into by the conveying roller pair 442 by an insertion angle in a range of about 15° to 31° with respect to the horizontal direction so as to be conveyed while being soaked in the developing liquid. Moreover, the PS plate 412 is sent out from the developing liquid by a discharge angle in a range of about 17° to 31°. By soaking the PS plate 412 in the developing liquid in the developing section 414, the unnecessary part of the photosensitive layer is swelled according to the image-wise exposure so that the swelled photosensitive layer is eliminated from the supporting body. By brushing the surface of the PS plate 412 with the brush roller 480 disposed in the developing vessel 424 at the time, elimination of the unnecessary photosensitive layer from the surface of the PS plate 412 can be promoted.

As the PS plate processor 410, one having a plurality of the brush rollers 480 facing the surface of the PS plate 412 for brushing, or one for processing the PS plate 412 without using the brush roller 480 can be used as well.

The PS plate 412 sent out from the developing liquid after the process with the developing liquid is taken out by the conveying roller pair 448 so as to be sent into the water washing section 416. At the time, the developing liquid adhered on the front and rear surfaces of the PS plate 412 is squeezed off from the PS plate 412 by the conveying roller pair 448.

In the water washing section 416, the washing water is jetted from the spray pipes 462A, 462B while conveying the PS plate 412 nipped by the conveying roller pair 458, 460 in the substantially horizontal state. Moreover, the conveying roller pair 460 disposed on the downstream side in the PS plate 412 conveyance direction sends out the PS plate 412 to the desensitizing process section 418 while squeezing off the washing water supplied to the front and rear surfaces of the PS plate 412 together with the remaining developing liquid without being squeezed off by the conveying roller pair 448.

Thereby, the PS plate 412 has the developing liquid remaining on the front and rear surfaces washed off at the time of passing through the water washing section 416.

The PS plate 412 sent into the desensitizing process section 418 passes between the spray pipe 464 and the ejection unit 466. By being nipped by the conveying roller pair 456, it is sent out from the desensitizing section 418 by the conveying roller pair 456.

At the time, in the desensitizing process section 418, the gum liquid is supplied to the spray pipe 464 and the ejection unit 466 so as to coat the gum liquid on the front and rear surfaces of the PS plate 412. The conveying roller pair 456 nips and sends out the PS plate 412 so as to form the gum liquid thin film on the front and rear surfaces of the PS plate 412 as well as squeezes off the excessive gum liquid from the front and rear surfaces of the PS plate 412.

The PS plate 412 coated with the gum liquid is sent from the discharge opening 434 into the drying section 420 by the conveying roller pair 456. The shutter (not shown) provided in the discharge opening 434 is operated at the timing of starting the process of the PS plate 412 or at the timing of sending out the PS plate 412 from the desensitizing process section 418 so as to open the discharge opening 434 for preventing inadvertent entrance of the drying air in the drying section 420 into the desensitizing process section 418 so as to adhere the gum liquid on the conveying roller pair 456 as well as for preventing entrance of the air from the discharge opening 434 to the developing section 414 so as to deteriorate the developing liquid by the carbon gas in the air, or for preventing evaporation of the moisture in the developing liquid or washing water, or the moisture in the gum liquid and discharge from the discharge opening 434.

In the drying section 420, the drying air is blown from the ducts 476A, 476B while conveying the PS plate 412 by the supporting roller 468 and the conveying roller pairs 472, 474. Thereby, with a protection film formed thereon by the coated gum liquid, the PS plate 412 is discharged from the discharge opening 470.

In the PS plate processor 410, the developing liquid in the developing vessel 424 is agitated by the operation of the circulation pump 512 by a predetermined timing. Moreover, in the PS plate processor 410, the circulation pump 512 is operated during the process of the PS plate 412. In the developing vessel 424, the developing liquid is jetted from the spray pipes 450, 451 into the developing vessel 424 by the operation of the circulation pump 512.

Here, the spray pipe 451 provided on the downstream side in the conveyance direction of the PS plate 412 in the developing vessel 424 has the jetting opening 510 disposed in the middle part in the width direction of the PS plate 412 such that the developing liquid can be jetted from the jetting opening 510 to the side plate 504 of the processing rack 500.

Thereby, the developing liquid is blown onto the side plate 504 from the jetting opening 510 of the spray pipe 451.

Next, an opening allowing the passage of the developing liquid is formed by the notch section 414 between the side plate 504 and the guide 446. Thereby, while being returned by the side plate 504, the developing liquid blown onto the side plate 504 passed through the opening part between the side plate 504 and the guide plate 446 so as to flow to the conveying path side of the PS plate 412.

In the developing vessel 424, the suction opening 516 is provided in the vicinity of the side plate 506 on the opposite side with respect to the side plate 504 so that the developing liquid in the vicinity of the side plate 506 is sucked by the operation of the circulation pump 512. At the time, since the opening part is provided by the notch part 514 between the side plate 506 and the guide plate 446, the developing liquid on the upper surface side of the guide plate 446 flows toward the suction opening 516.

Thereby, the flow of the developing liquid is formed between the side plate 504 and the side plate 506 on the upper surface side of the guide plate 446. The upper surface side of the guide plate 446 provides the PS plate 412 conveying path so that the developing liquid flows moderately in the width direction along the front and rear surfaces of the PS plate 412 with respect to the PS plate 412 being conveyed on the guide plate 446. Therefore, the developing liquid can be substituted smoothly in the vicinity of the front and rear surfaces of the PS plate 412.

By substituting the developing liquid in the vicinity of the front and rear surfaces of the PS plate 412 accordingly, the problem of generation of the temperature difference in the developing liquid for processing the PS plate 412 can be prevented, for example when the PS plate 412 at the substantially same temperature as the room temperature in which the PS plate processor 410 is disposed is inserted in the PS plate processor 410, the developing liquid temperature maintained at about 30° C. by the low temperature of the PS plate 412 is lowered so that the developing liquid with the temperature decline caused is eliminated from the vicinity of the surface of the PS plate 412 and the developing liquid without the temperature decline is newly supplied to the vicinity of the front and rear surfaced of the PS plate 412.

Moreover, in the PS plate processor 410, since the developing liquid jetting direction from the jetting opening 510 of the spray pipe 451 is provided opposite to the suction opening 516, the developing liquid jetted from the spray pipe 451 cannot directly flow into the suction opening 516 as well as the smooth developing liquid flow can be formed along the width direction of the PS plate 412 in the developing vessel 424. Thereby, while improving the agitation efficiency of the developing liquid, generation of the flow rate difference in the developing liquid passing on the front and rear surface of the PS plate 412 can be prevented.

Therefore, the developing process can be provided by a certain sensitivity to the PS plate 412 to be processed in the developing vessel 424 without generation of the sensitivity difference due to the developing liquid temperature difference or the sensitivity difference derived from the flow rate difference of the developing liquid flowing in the vicinity of the surface of the PS plate 412.

Furthermore, high finishing quality of the PS plate 412 is ensured in the PS plate processor 410. This is because the developing liquid is supplied by the downstream side spray pipe 451 where the developing process progress is more likely to differ from other members so as not to cause the developing process progress difference.

The configuration of the present invention is not limited by this embodiment heretofore explained. For example, although the present invention is adopted on the spray pipe 451 side in this embodiment, the present invention can be adopted also in the spray pipe 450 provide on the upstream side.

Moreover, although the spray pipe 451 is projected from the side wall 424B of the developing vessel 424 in this embodiment, it can be provided in any configuration as long as at least a jetting opening for jetting the developing liquid toward one side plate between the suction opening and one side plate of the processing rack by for example, providing an elbow opened toward the side plate 504 side in the bottom part of the developing vessel 424.

Furthermore, although the jetting opening 510 is provided on the lower side of the conveying path of the photosensitive material in this embodiment, it is also possible to provide the jetting opening 510 in either of the right and left sides of the conveying path of the photosensitive material to be conveyed in the up and down direction, with the suction opening 516 provided at the side closer to the side plate with respect to the jetting opening.

Moreover, although the jetting opening 510 is provided in one direction at the lower side of the conveying path of the photosensitive material in this embodiment, the jetting openings 411 can be provided on the both sides of the conveying path of the photosensitive material in a range that the processing liquid flows jetted from the jetting openings 411 do not collide with each other.

Furthermore, although the developing liquid jetted from the jetting opening 510 is collided with the side plate 504 having the vertical surface with respect to the jetting direction so as to be returned in this embodiment, it is also possible to provide a member with the conveying path side of the PS plate 412 of the side plate 504 formed in a recessed shape can be used for facilitating the smooth return of the jetted developing liquid.

Moreover, although an example of the developing vessel 424 of the PS plate processor 410 for processing the PS plate 412 as the photosensitive planographic printing plate is explained in this embodiment, the present invention can be adopted in a PS plate processor of an optional configuration. Furthermore, the present invention can be adopted not only in the PS plate processor, but also in the photosensitive material processing device for processing the other photosensitive materials, such as a printing paper, a photography film, or the like, or not only in the developing vessel but also in the other processing vessels such as a fixing vessel, a water washing vessel, or the like. That is, the present invention can be adopted for a processing liquid for a photosensitive material processing device in an optional configuration for agitating the processing liquid at the time of soaking and processing the photosensitive material.

Fifth Embodiment

Hereinafter, a fifth embodiment of the present invention will be explained. Since the basic configuration of the fifth embodiment is same as that of the above-mentioned fourth embodiment, the same numeral is provided for the same part as in the fourth embodiment in the following description, and further explanation is not given in the fifth embodiment to be explained below.

In the developing vessel 424 of the developing section 414, a pair of side plate members 600 is provided (in FIG. 13, one of them is provided and the other is not shown). The above-mentioned conveying roller pairs 442, 445, 448 and brush roller 480, or the like, are provided between the pair of the side plates 604 of the side plate members 600 as the conveying rollers.

Figure 17:
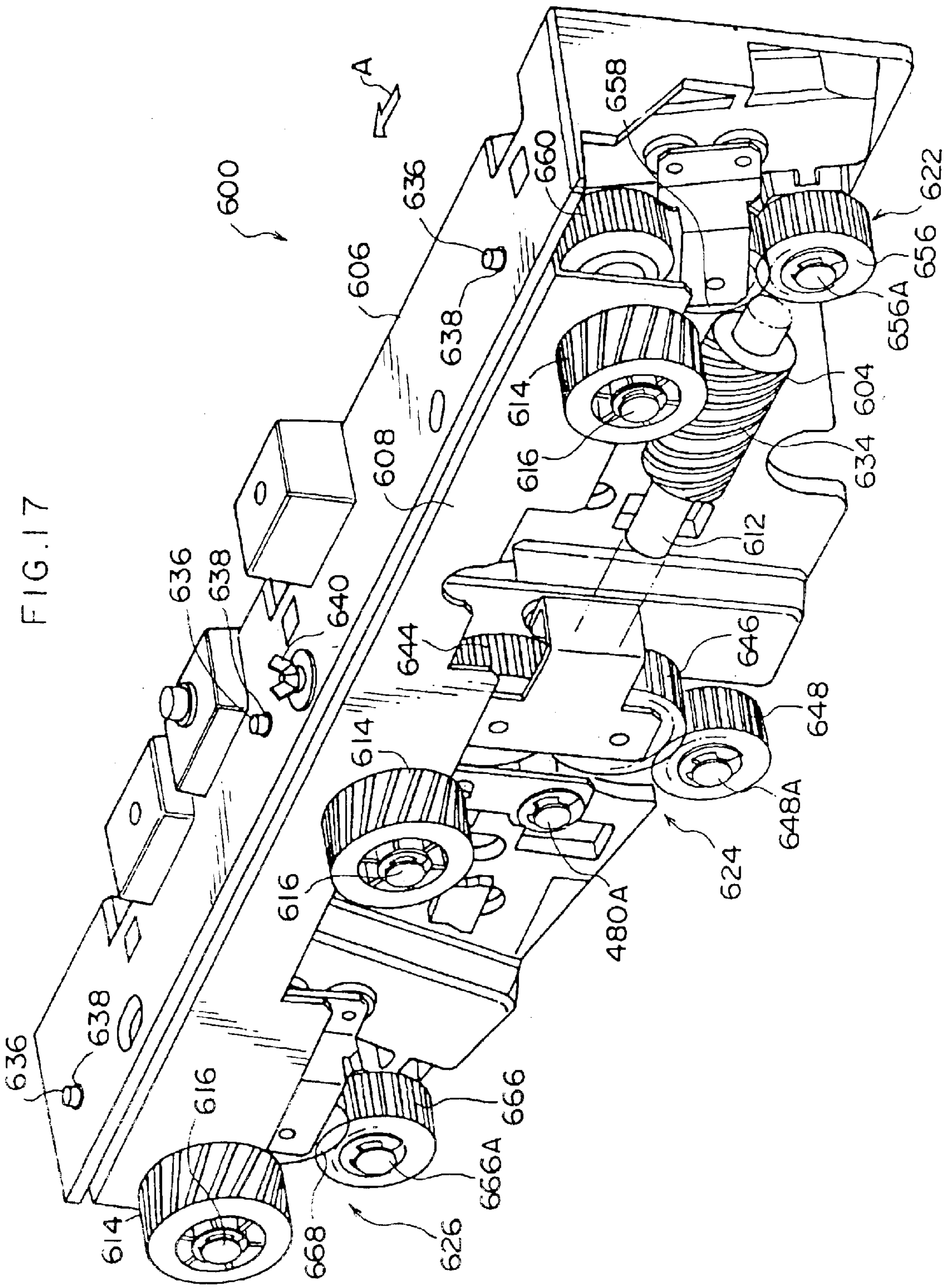
FIG. 17 is a schematic perspective view showing one of the side plates of the processing part, viewed from the direction opposite to the PS plate conveying path.
Figure 19:
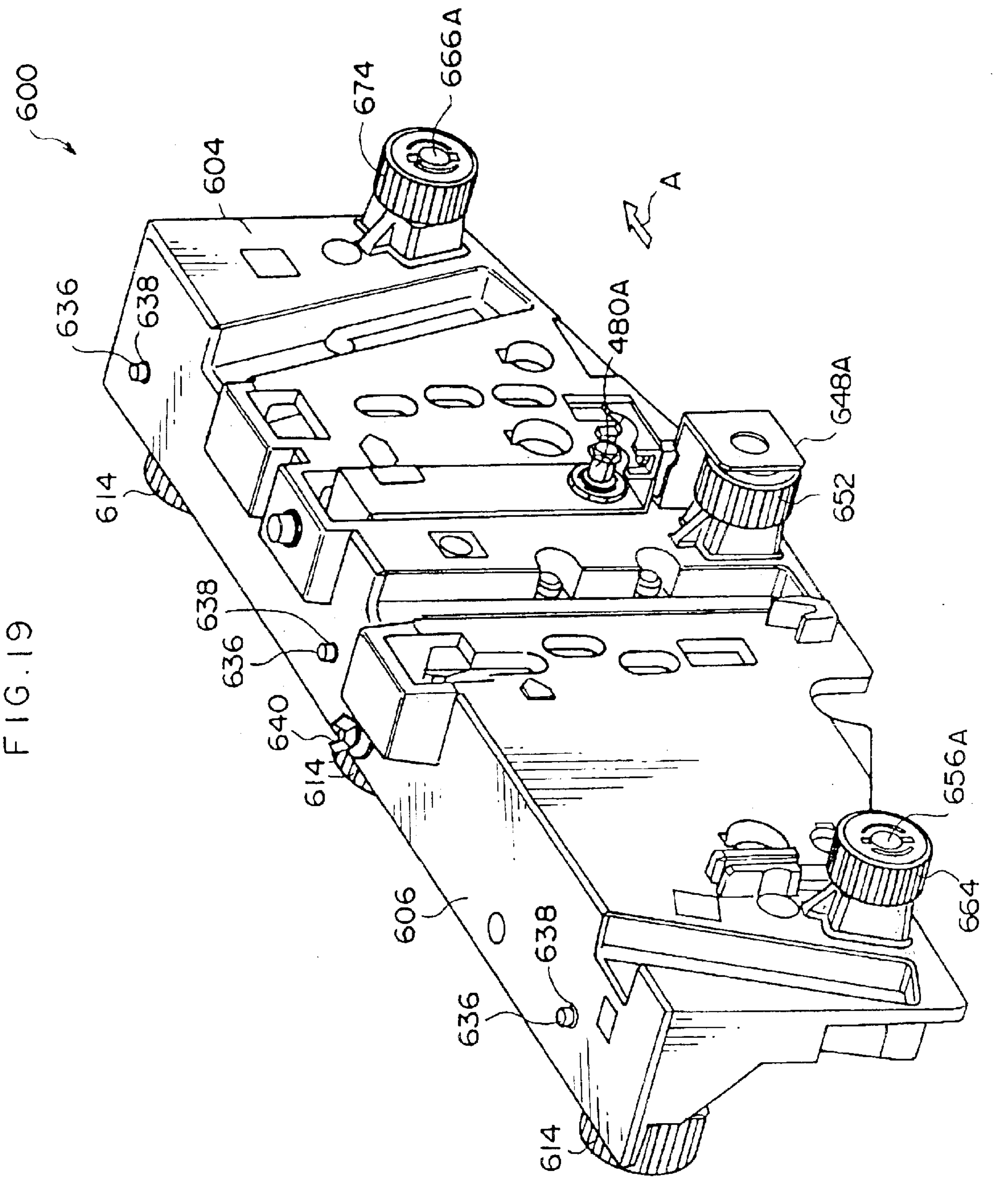
FIG. 19 is a schematic perspective view showing one of the side plates of the processing part, viewed from the PS plate conveying path side.

As shown in FIG. 17 and FIG. 19, the side plates 604 of the side plate member 600 are provided with gear units 622, 624, 626 as a driving force transmitting device. The gear unit 622 transmits the driving force to the conveying roller pair 442, and the gear unit 626 transmits the driving force to the conveying roller pair 445 and the brush roller 480. Moreover, the gear unit 626 transmits the driving force to the conveying roller pair 448.

Figure 18:
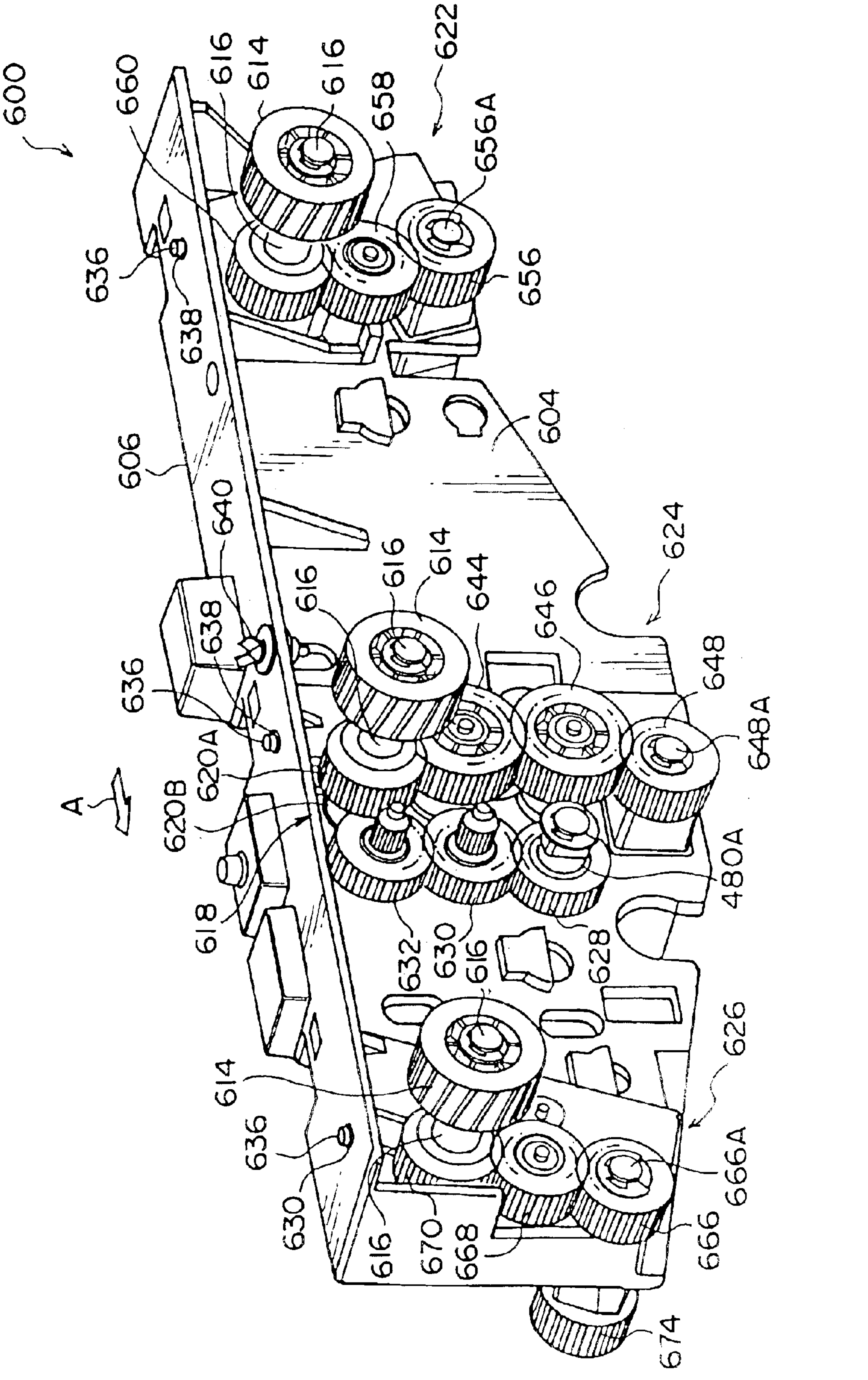
FIG. 18 is a schematic perspective view showing one of the side plates of the processing part, viewed from the direction opposite to the PS plate conveying path, and different from that of FIG. 15.

As shown in for example, FIG. 18, in the gear unit, the gear unit 624 comprises gears 628, 630, 632 as gears. The gear 628 is mounted on the rotation shaft 480A of the brush roller 480 (not shown in FIG. 18), projecting from the side plate 604. The gear 628 engages with the gear 630, and the gear 630 engages with the gear 632. Thereby, according to the rotation of the gear 632, the brush roller 480 is rotated.

Moreover, the gear unit 624 is provided with gears 644, 646, 648, with the gear 644 and the gear 648 engage with the gear 646. As shown in FIG. 19, the rotation shaft 648A of the gear 648 projects through the side plate 604 at the lower end part of the side plate 604 to the PS plate 412 conveying path side, with a gear 652 mounted on the projected end part.

The gear 652 engages with a gear provided in the lower side roller of the conveying roller pair 445 (not shown in FIG. 19). Moreover, the gears provided each in the rollers facing with each other in the conveying roller pair 445 are provided in an ordinary configuration of engaging with each other so as to be rotated integrally. According to the rotation of the gear 652, the rotation force is transmitted to the conveying roller pair 445.

Thereby, the conveying roller pair 445 is rotated by the rotation of the gear 644 in the gear unit 624.

As shown in FIG. 18, the gear unit 622 comprises gears 656, 658, 660. As shown in FIG. 19, the rotation shaft 656A of the gear 656 projects at the lower end part of the side plate 604 to the PS plate 412 conveying path side, with a gear 664 mounted on the rotation shaft 656A. The gear 664 engages with the gear provided in the conveying roller pair 442. Thereby, the conveying roller pair 442 is rotated together with the gear 660.

Moreover, as shown in FIG. 18, the gear unit 626 comprises gears 666, 668, 670. As shown in FIG. 19, the rotation shaft 666A of the gear 666 projects at the lower end part of the side plate 604 to the PS plate 412 conveying path side, with a gear 674 mounted on the rotation shaft 666A. The gear 674 engages with the gear provided in the conveying roller pair 448. Thereby, the conveying roller pair 448 is rotated together with the gear 670.

Figure 16:
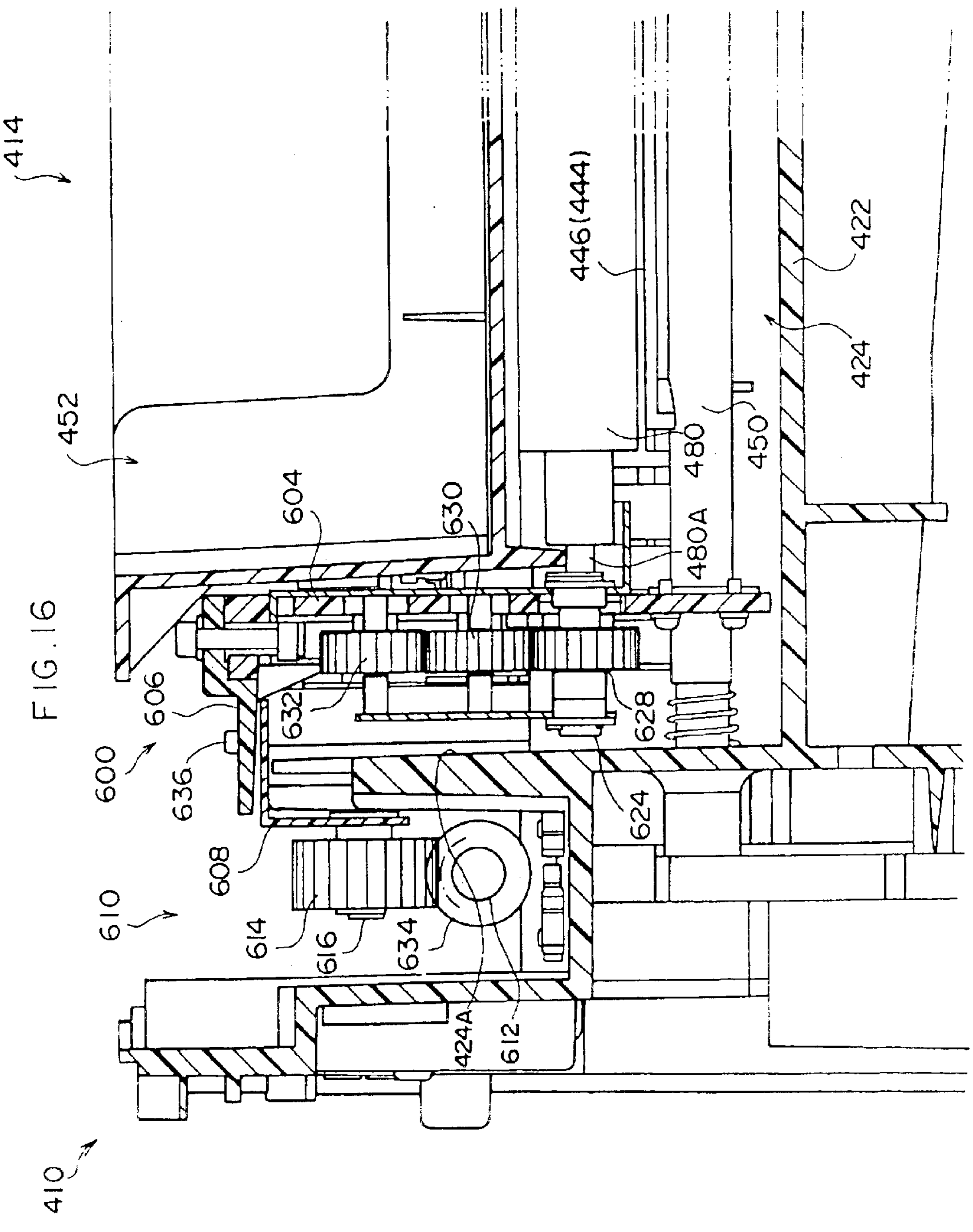
FIG. 16 is a schematic cross-sectional view along the direction orthogonal to the PS plate conveyance direction, showing the essential part of the developing vessel and the processing part according to the fifth embodiment.

Next, as shown in FIG. 16, a cover plate 606 is mounted on the upper end part of the side plate 604 of the side plate member 600. The cover plate 606 is projected from the upper end of the side plate 604 to the side wall 424A of the developing vessel 424 in the direction opposite to the PS plate 412 conveying path. Moreover, a shielding bracket 608 is mounted in the tip end part of the cover plate 606. The shielding bracket 608 is formed in a substantially L-shaped cross-section, with the tip end oriented downward facing the upper end part of the side wall 424A.

Thereby, the developing vessel 424 has the space between the side plate 604 of the side plate member 600 and the side wall 424A closed with the cover plate 606 and the shielding bracket 608 at the time the side plate member 600 is disposed. The above-mentioned liquid surface lid 452 is disposed between the pair of the side plates 604 of the side plate member 600 so as to cover the liquid surface of the developing liquid between the side plates 604.

That is, in the developing vessel 424, by covering the space between the pair of the side plates 604 with the liquid surface lid 452 as well as the space between the side plate 604 and the side wall 424A with the cover plate 606 and the bracket 608, entrance of the fresh air to the vicinity of the liquid surface of the developing liquid is restrained so as to restrain the processing performance change due to moisture evaporation from the developing liquid or the developing liquid deterioration by the carbon gas in the air, or the like.

Next, as shown in FIG. 16, a communication section 610 is provided at one end side in the width direction of the PS plate 412 (the paper surface left direction in FIG. 16) in the processing tank 422. The communication section 610 is provided along the paper surface front and rear direction of FIG. 16 reaching from the developing vessel 424 side to the drying section 420.

In the communication section 610, a drive shaft 612 to be rotated by a conveying roller (not shown) is provided. The drive shaft 612 has a length elongating across the drying section 420 to the developing section 414. In the PS plate processor 410, the driving force of a conveying roller (not shown) is transmitted from the drive shaft 612 to the supporting roller 468 and the conveying roller pair 472, 474 in the drying section 420, the conveying roller pair 456 in the desensitizing process section 418, the conveying roller pairs 458, 460 in the water washing section 416, and the conveying roller pairs 442, 445, 448 and the brush roller 480 in the developing section 414.

As shown in FIG. 17 and FIG. 18, the side plate member 600 is mounted in the developing vessel 424 such that the gear units 622, 624, 626 provided in the side plate 604 are on the communication section 610 side (see FIG. 16).

Next, as shown in FIG. 18 and FIG. 19, the side plate member 600 is provided with helical gears each corresponding to the gear units 622, 624, 626, that is, helical gears 614.

Each of the helical gears 614 is mounted on the rotation shaft 616 pivoted by the shielding bracket 608. As shown in FIG. 16, the helical gears 614 are disposed in the communication section 610. Moreover, as shown in FIG. 18, the gears 660, 618, 670 are mounted on the end part projecting to the side plate 604 side on the rotation shaft 616. Among them, the gear 618 is formed with a gear 620A and a small size gear 620B such that the gear 620A engages with the gear 644, and the gear 620B engages with the gear 632.

Thereby, in the side plate member 600, the rotation force is transmitted from the helical gears 614 to the conveying roller pairs 442, 445, 448 and the brush roller 480.

As shown in FIG. 16 and FIG. 17, in the drive shaft 612, a worm gear, that is, a worm gear 634 is mounted at a position facing each of the helical gears 614. Each of the worm gears 634 engages with the helical gears 614. Thereby, in the PS processor 410, the rotation of the drive shaft 612 is transmitted to the rotation shaft 616 while reducing the speed (for example, with about a 4 to 12 speed reduction ratio) so as to rotate the conveying roller pairs 442, 445, 448 and the brush roller 480 at a predetermined rotation speed.

Next, as shown in FIGS. 17 to 19, a plurality of pins 636 is formed projecting from the surface facing the cover plate 606 in the shielding bracket 608. Moreover, a pin hole 638 is formed in each cover plate 606 corresponding to each of the pins 636. The shielding bracket 608 is positioned with respect to the cover plate 606 by inserting each of the pins 636 into the pin holes 638.

In the cover plate 606, a wing nut 640 is mounted in the middle part along the longitudinal direction (PS plate 412 conveyance direction). The wing nut 640 is screwed in the shielding bracket 608, and thereby the shielding bracket 608 is mounted on the cover plate 606.

Figure 20:
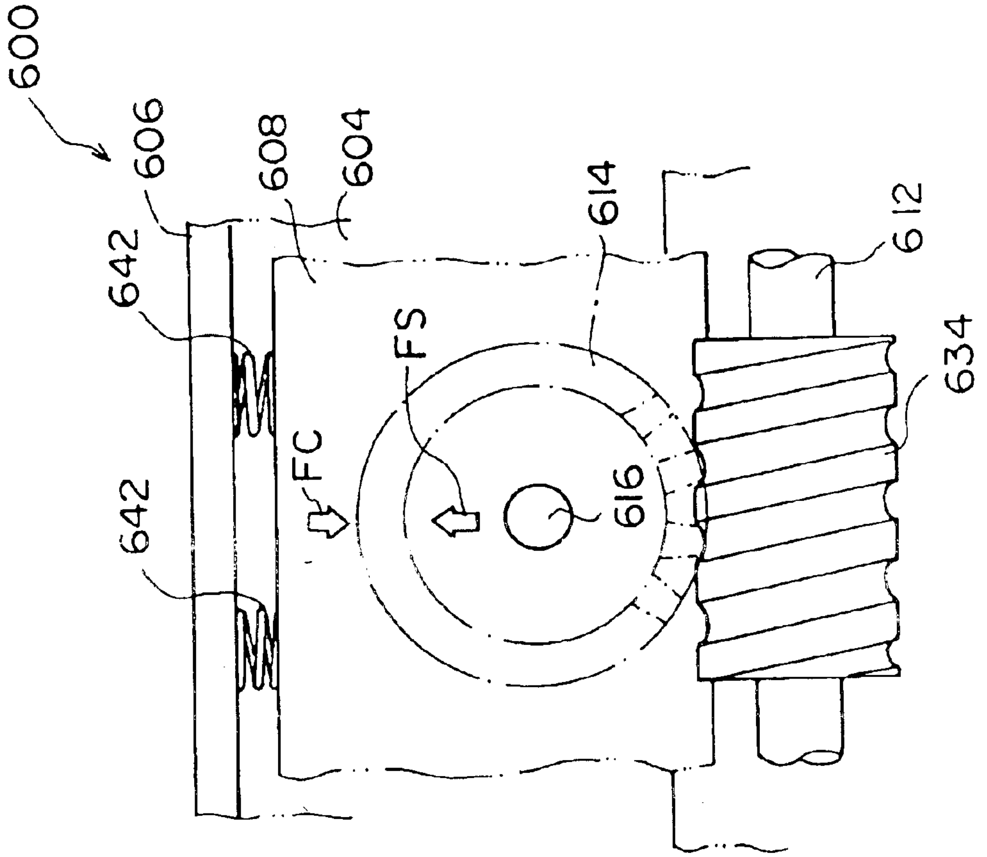
FIG. 20 is a schematic diagram showing a helical gear and a wall gear according to the fifth embodiment.

Next, as shown in FIG. 20, a predetermined gap is provided between the cover plate 606 and the shielding bracket 608, with a coil spring 642 disposed in the gap as an urging device. The coil spring 642 forces the shielding bracket 608 in the direction away from the cover plate 606 by a predetermined urging force. Moreover, the cover plate 606 and the shielding bracket 608 can approach with each other, resisting to the urging force of the coil spring 642.

Thereby, the helical gear 614 mounted on the shielding bracket 608 engages with the worm gear 634 by the urging force of the coil spring 642. Moreover, by moving upward the shielding bracket 608 resisting to the urging force of the coil spring 642 so as to approach the cover plate 606, the helical gear 614 is moved away from the worm gear 634 so that the helical gear 614 and the worm gear 634 can rotate relatively.

By moving the helical gear 614 away from the worm gear 634 in the side plate member 600, transmission of the driving force to the conveying roller pairs 442, 445, 448 and the brush roller 480 is released.

In the PS plate processor 410, the urging force of the coil spring 642 is set such that the helical gear 614 is lifted with the shielding bracket 608 resisting to the urging force of the coil spring 642 when the torque for rotating the helical gear 614 exceeds a predetermined value in transmitting the driving force from the worm gear 634 of the drive shaft 612 to the helical gear 614. Setting of the urging force can be adjusted also by an optional method of changing the distance between the cover plate 606 and the shielding bracket 608 by the wing nut 640, or the like.

In general, when transmitting the rotation force from the worm gear 634 to the helical gear 614 by engaging the worm gear 634 and the helical gear 614, the helical gear 614 is rotated with a torque larger than the torque (the load torque for the helical gear 614) necessary for rotating the helical gear 614. Consequently, the driving force is transmitted to the conveying roller pairs 442, 445, 448 and the brush roller 480.

When the torque of the helical gear 614 becomes large, the force of moving the helical gear 614 away from the worm gear 634 (separating force) $F_s$ becomes large.

In the PS plate processor 410, the urging force $F_c$ of the coil spring 642 is set such that the separating force $F_s$ of moving the helical gear 614 away from the worm gear 634 exceeds the urging force $F_c$ of the coil spring 642 when the torque T becomes a predetermined value or more.

Thereby, when the torque T exceeds the predetermined value, the helical gear 614 moves away from the worm gear 634 so that transmission of the driving force to the gear units 622, 624, 626 is blocked.

At the time, according to this embodiment, in the conveyance process of the PS plate 412 in an ordinary state, the helical gear 614 is not moved away from the worm gear 634 until the torque T necessary for the drive of the helical gear 614 reaches to $2'T_s$, more preferably to $3'T_s$ when the torque T necessary for driving the helical gear 614 is $T_s$.

Moreover, the urging force $F_c$ of the coil spring 642 is set such that the helical gear 614 is reliably moved away from the worm gear 634 until the torque value (for example, $30'T_s$) at the limit not to cause the breakage, or the like in each gear provided in the helical gear 614, and the gear units 622, 624, 626 reaches to about a ⅓ value ($10'T_s$).

That is, the urging force $F_c$ of the coil spring 642 is adjusted such that the helical gear 614 is moved away from the worm gear 634 with the torque necessary for rotating the helical gear 614 T (N/m) is $2'T_s$ T $30'T_s$, preferably $3'T_s$ T $10'T_s$. The $30'T_s$ value is merely an example of the limit torque value not to cause the breakage in the gear, or the like, and thus the torque T upper limit is not limited thereto.

In the PS plate processor 410 accordingly provided, when the PS plate 412 with an image recorded by a printing device (not shown), or the like is placed on the insertion base 440 so as to be inserted into the insertion opening 432, the PS plate 412 is taken in by the conveying roller pair 442 so as to be sent into the developing section 414. In the PS plate processor 410, when the PS plate 412 passing through the insertion opening 432 is detected by a sensor (not shown), a timer is started. The timer is used for measuring the timing for ejecting the washing water from the spray pipes 462A, 462B of the water washing section 416, and the timing for ejecting the gum liquid in the desensitizing process section 418 together with the operation of the driving device for conveying the PS plate 412.

In the developing section 414, the PS plate 412 is taken in by the conveying roller pair 442 by an insertion angle in a range of about 15° to 31° with respect to the horizontal direction so as to be conveyed while being soaked in the developing liquid. Moreover, the PS plate 412 is sent out from the developing liquid by a discharge angle in a range of about 17° to 31°. By soaking the PS plate 412 in the developing liquid in the developing section 414, the unnecessary part of the photosensitive layer is swelled according to the image-wise exposure so that the swelled photosensitive layer is eliminated from the supporting body. By brushing the surface of the PS plate 412 with the brush roller 480 disposed in the developing vessel 424 at the time, elimination of the unnecessary photosensitive layer from the surface of the PS plate 412 can be promoted.

As the PS plate processor 410, one having a plurality of the brush rollers 480 facing the surface of the PS plate 412 for brushing, or one for processing the PS plate 412 without using the brush roller 480 can be used as well.

The PS plate 412 sent out from the developing liquid after the process with the developing liquid is taken out by the conveying roller pair 448 so as to be sent into the water washing section 416. At the time, the developing liquid adhered on the front and rear surfaces of the PS plate 412 is squeezed off from the PS plate 412 by the conveying roller pair 448.

In the water washing section 416, the washing water is jetted from the spray pipes 462A, 462B while conveying the PS plate 412 nipped by the conveying roller pair 458, 460 in the substantially horizontal state. Moreover, the conveying roller pair 460 disposed on the downstream side in the PS plate 412 conveyance direction sends out the PS plate 412 to the desensitizing process section 418 while squeezing off the washing water supplied to the front and rear surfaces of the PS plate 412 together with the remaining developing liquid without being squeezed off by the conveying roller pair 448.

Thereby, the PS plate 412 has the developing liquid remaining on the front and rear surfaces washed off at the time of passing through the water washing section 416.

The PS plate 412 sent into the desensitizing process section 418 passes between the spray pipe 464 and the ejection unit 466. By being nipped by the conveying roller pair 456, it is sent out from the desensitizing section 418 by the conveying roller pair 456.

At the time, in the desensitizing process section 418, the gum liquid is supplied from the spray pipe 464 and the ejection unit 466 to the PS plate 412 so as to coat the gum liquid on the front and rear surfaces of the PS plate 412. The conveying roller pair 456 nips and sends out the PS plate 412 so as to form the gum liquid thin film on the front and rear surfaces of the PS plate 412 as well as squeezes off the excessive gum liquid from the front and rear surfaces of the PS plate 412.

The PS plate 412 coated with the gum liquid is sent from the discharge opening 434 into the drying section 420 by the conveying roller pair 456. The shutter (not shown) provided in the discharge opening 434 is operated at the timing of starting the process of the PS plate 412 or at the timing of sending out the PS plate 412 from the desensitizing process section 418 so as to open the discharge opening 434 for preventing inadvertent entrance of the drying air in the drying section 420 into the desensitizing process section 418 so as to adhere the gum liquid on the conveying roller pair 456 as well as for preventing entrance of the air from the discharge opening 434 to the developing section 414 so as to deteriorate the developing liquid by the carbon gas in the air, or for preventing evaporation of the moisture in the developing liquid or washing water, or the moisture in the gum liquid and discharge from the discharge opening 434.

In the drying section 420, the drying air is blown from the ducts 476A, 476B while conveying the PS plate 412 by the supporting roller 468 and the conveying roller pairs 472, 474. Thereby, with a protection film formed thereon by the coated gum liquid, the PS plate 412 is discharged from the discharge opening 470.

In the PS plate processor 410, when the conveyance failure of the PS plate 412 such as jamming occurs, the conveying roller for the PS plate 412 is locked. For example, in the side plate member 600 provided in the developing vessel 424, the PS plate 412 is conveyed by rotation drive of the conveying roller pairs 442, 445, 448 and the brush roller 480. At the time, when, for example, the conveying roller pair 445 is locked due to the conveyance failure generation such as jamming, the load on the gears 644, 646, 648, the gears 620A, 620B, and the helical gear 614 in the gear unit 624 is increased. That is, a large torque is applied on the gears.

The torque increase may give rise to the damage in the helical gears 614, 646, 648, the gears 620A, 620B, the helical gear 614, or the like.

Next, in the PS plate processor 410, the coil spring 642 is provided between the cover plate 606 of the side plate member 600 and the shielding bracket 608 such that when the separating force $F_s$ of pushing up the shielding bracket 608 by the helical gear 614 by the increase of the torque T applied on the helical gear 614 exceeds the urging force $F_c$ of the coil spring 642, the helical gear 614 is moved away from the worm gear 634.

That is, the separating force $F_s$ for moving the helical gear 614 away from the worm gear 634 is created between the helical gear 614 and the worm gear 634 according to the torque T for rotating the helical gear 614.

Since the separating force $F_s$ is in general, smaller than the urging force $F_c$ of the coil spring 642 ($F_s<F_c$), the engaging state of the helical gear 614 and the worm gear 634 is maintained so that the driving force of the drive shaft 612 is transmitted to the conveying roller pair 445, or the like.

If the torque T functioning on the helical gear 614 increases and the separating force $F_s$ exceeds the urging force $F_c$ of the coil spring 642 ($F_s>F_c$), the helical gear 614 is lifted up together with the shielding bracket 608 so that the helical gear 614 is moved away from the worm gear 634. Thereby, the transmission of the driving force not only to the conveying roller pair 445 but also to the helical gear 614 and the gear unit 624 is blocked so as to prevent damage of the helical gear 614, the gear unit 624, or the like.

In the PS plate processor 410, the urging force $F_c$ by the coil spring 642 is set such that the helical gear 614 and the worm gear 634 are reliably moved away by about a ⅓ value of 10'$T_s$ or less (T 10'$T_s$) of the limit torque value (for example, 30'$T_s$) not to break the gears including the helical gear 614 and the gear unit 624 with the premise that the torque T (N/m) necessary for rotating the helical gear 614 is the torque $T_s$.

Thereby, in the PS plate processor 410, even when jamming, or the like occurs, damage is avoided not only in the helical gear 614 but also in the gears of the gear unit 624, or the like.

Next, in the PS plate processor 410, the urging force $F_c$of the coil spring 642 is set such that the helical gear 614 is not moved away from the worm gear 634 with a less than 2'$T_s$ torque T (T<2'$T_s$), more preferably a less than 3'$T_s$ torque T (T<3'$T_s$).

Thereby, generation of the conveyance stoppage, the conveyance failure, or the like of the PS plate 412 due to inadvertent separation of the helical gear 614 and the worm gear 634 can be prevented.

That is, in the PS plate processor 410, since the urging force $F_c$ of the coil spring 642 is set such that the helical gear 614 is moved away from the worm gear 634 with the torque T functioning on the helical gear 614 (N/m) is 2'$T_s$ T 30'$T_s$, (wherein 30'$T_s$ is an example of the limit torque value not to cause breakage in the gear, or the like), preferably 3'$T_s$ T 10'$T_s$, damage of the helical gear 614, the gear unit 624, or the like can reliably be prevented while preventing inadvertent shielding of the driving force.

Thereby, in the PS plate processor 410, even when jamming, or the like occurs, damage of the members for transmitting the driving force to the conveying roller for the PS plate 412, or the like can reliably be prevented so that the recovery for resuming the process of the PS plate 412 can be facilitated.

Although the coil spring 642 is disposed between the cover plate 606 and the shielding bracket 608 for pivoting the helical gear 614 in the fifth embodiment heretofore explained, it is not limited thereto, and an optional configuration can be adopted as long as the helical gear 614 is moved away from the worm gear 634 by a torque T of a predetermined value or more by, for example, providing an urging device between the rotation shaft 616 and the shielding bracket 608, or the like.

Sixth Embodiment

Hereinafter, a sixth embodiment of the present invention will be explained. Since the basic configuration of the sixth embodiment is same as that of the above-mentioned fourth and fifth embodiments, the same numeral is provided for the same member as in those embodiments in the following description, and further explanation is not given in the sixth embodiment to be explained below.

Figure 21:
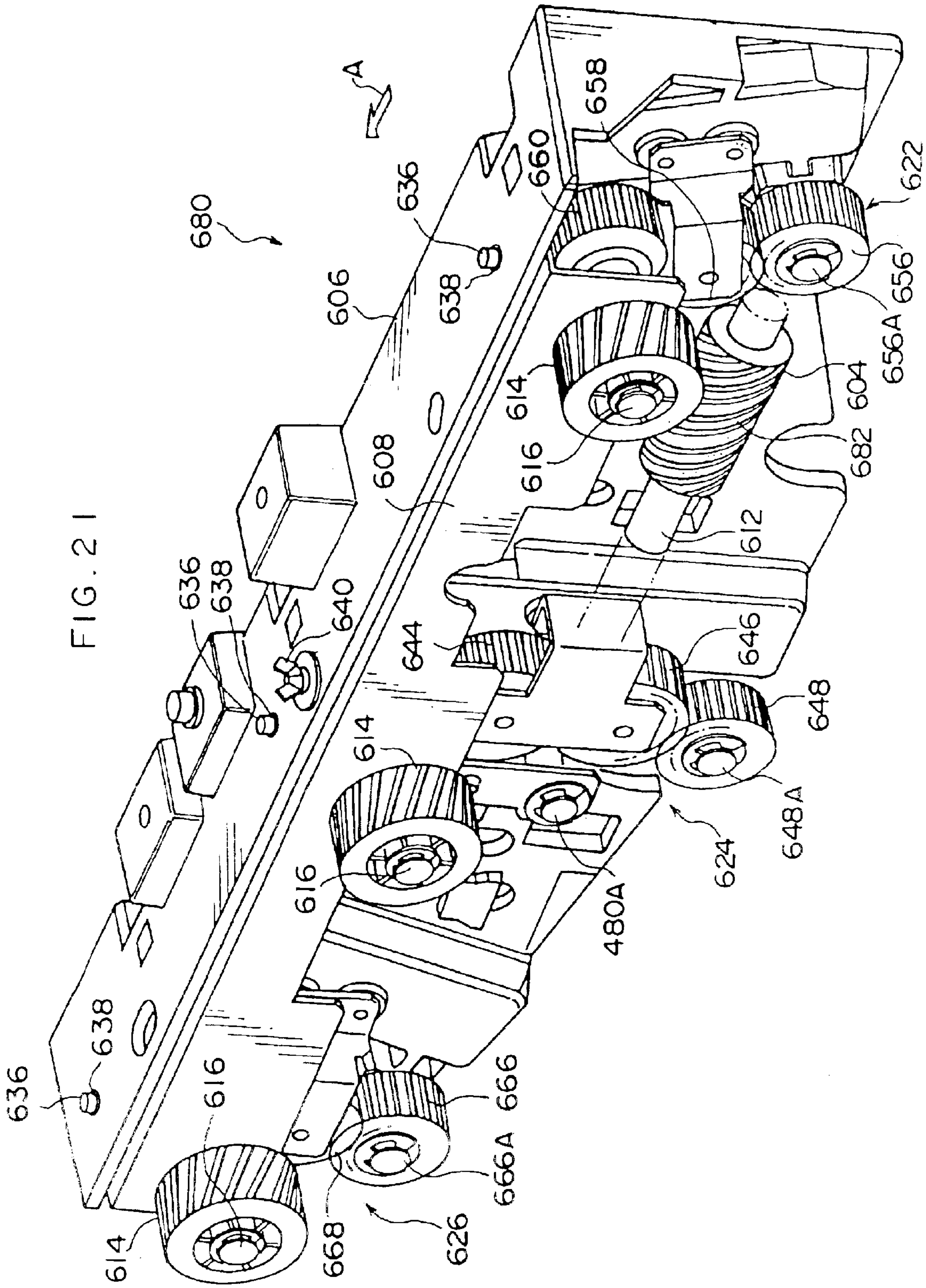
FIG. 21 is a schematic perspective view showing the side plate of the processing part according to a sixth embodiment.

FIG. 21 shows the essential part of a side plate section 680 according to the sixth embodiment. The side plate section 680 is used instead of the side plate member 600 in the fifth embodiment. Moreover, in the sixth embodiment, a worm gear 682 is used instead of the worm gear 634 provided in the drive shaft 612.

Accordingly, in the side plate member 680, the shielding bracket 608 is fixed on the cover plate 606 without providing the coil spring 642 between the cover plate 606 of the side plate 604 and the shielding bracket 608.

Figure 22A:
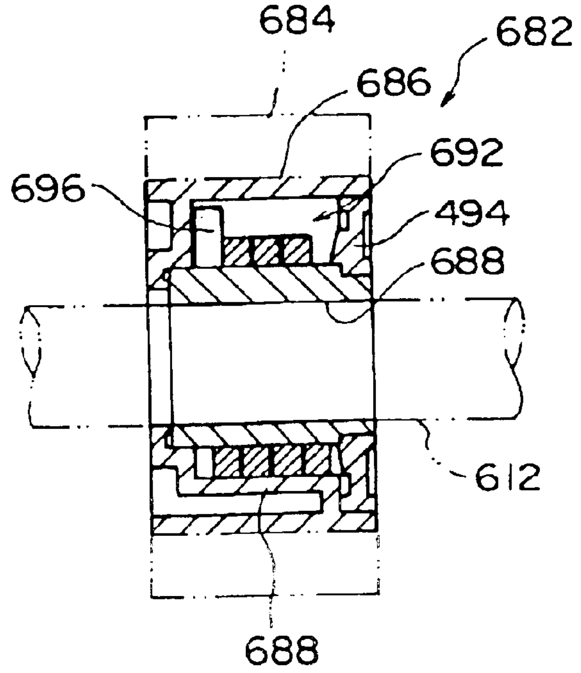
FIG. 22A is a schematic cross-sectional view along the axis direction of the wall gear according to the sixth embodiment.
Figure 22B:
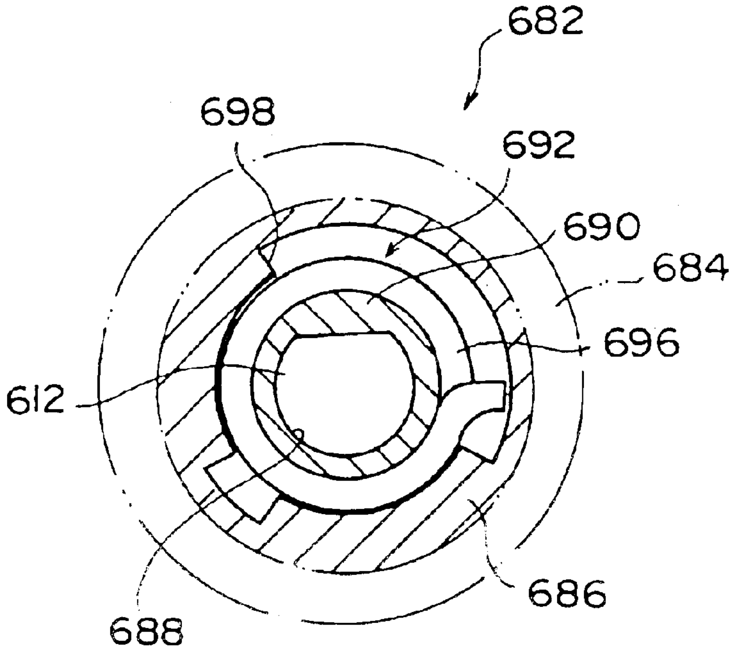
FIG. 22B is a schematic cross-sectional view along the direction orthogonal to the axis direction of the wall gear according to the sixth embodiment.

As shown in FIG. 22A and FIG. 22B, the worm gear 682 comprises an outer cylinder member 686 with a tooth part 684 formed on the circumferential part, and an inner cylinder member 690 with a shaft hole 688 for inserting the drive shaft 612 formed such that the inner cylinder member 690 is fitted into the outer cylinder member 686.

In the worm gear 682, a space part 692 is provided between the outer cylinder member 686 and the inner cylinder member 690, with the space part 692 closed by a cap 694 (see FIG. 22A).

The worm gear 682 is provided with a twist coil spring 696 in the space part 692 as an urging device. The twist coil spring 696 is engaged with a stopper part 698 wound around on the outer circumference of the inner cylinder member 690, with one end projected from the outer cylinder member 686 into the space part 692.

Thereby, the twist coil spring 696 can be rotated integrally with the outer cylinder member 686. Moreover, since the twist coil spring 696 is wound around on the inner cylinder member 690, it can be rotated integrally with the inner cylinder member 690 at the time it fastens the inner cylinder member 690 by the urging force.

That is, the worm gear 682 is engaged by the twist coil spring 696 in an ordinary state such that the outer cylinder member 686 and the inner cylinder member 690 are rotated integrally. The twist coil spring 696 adopted in this embodiment is formed with a wire material with a rectangular cross-sectional shape so that the contact area with respect to the inner cylinder member 690 is enlarged so as to enable certain engagement with the inner cylinder member 690.

Next, in the worm gear 682, the outer cylinder member 686 can be rotated relatively with respect to the inner cylinder member 690, resisting to the urging force of the twist coil spring 696.

That is, a one way clutch mechanism is formed in the worm gear 682 such that fastening of the inner cylinder 690 by the twist coil spring 696 is weakened so as to enable the relative rotation of the outer cylinder member 686 and the twist coil spring 696 with respect to the inner cylinder member 690 when the torque T functioning on the helical gear 614 exceeds the torque by the urging force by the twist coil spring 696 at the time of transmitting the driving force of the drive shaft 612 from the worm gear 682 to the helical gear 614.

Thereby, when the torque T (N/m) functioning on the helical gear 614 exceeds a predetermined value due to generation of jamming, or the like in the side plate member 680, the transmission of the driving force to the helical gear 614 is released by the relative rotation of the helical gear 614 and the drive shaft 612.

At the time, also in the sixth embodiment, the urging force of the twist coil spring 696 is set such that the transmission of the driving force to the helical gear 614 is released in a T (N/m) range of 2'$T_s$ T 30'$T_s$, preferably 3'$T_s$ T 10'$T_s$.

Thereby, also in the PS plate processor 410 using the side plate member 680, inadvertent release of the driving force transmission to the conveying roller pair 445, or the like can be prevented as well as generation of damage in the helical gear 614, the gear unit 624, or the like at the time of generating jamming, or the like can reliably be prevented.

Although the one way clutch mechanism is formed in the sixth embodiment using the twist coil spring 696 in the worm gear 682, one having the one way clutch mechanism formed between the helical gear 614 and the rotation shaft 616 can be used as well.

Moreover, although the PS plate processor 410 for processing the PS plate 412 as the photo sensitive material is adopted as an example of the photosensitive material processing device in this embodiment heretofore explained, the photosensitive material processing device with the present invention adopted is not limited thereto, and it can be adopted in a photosensitive material processing device with an optional configuration for processing various photosensitive materials, such as a printing paper, a photography film, or the like while conveying the same using a conveying roller.

Seventh Embodiment

Hereinafter, a seventh embodiment of the present invention will be explained. Since the basic configuration of the seventh embodiment is same as that of the above-mentioned fourth, fifth and sixth embodiments, the same numeral is provided for the same member as in those embodiments in the following description, and further explanation is not given in the seventh embodiment to be explained below.

Figure 23:
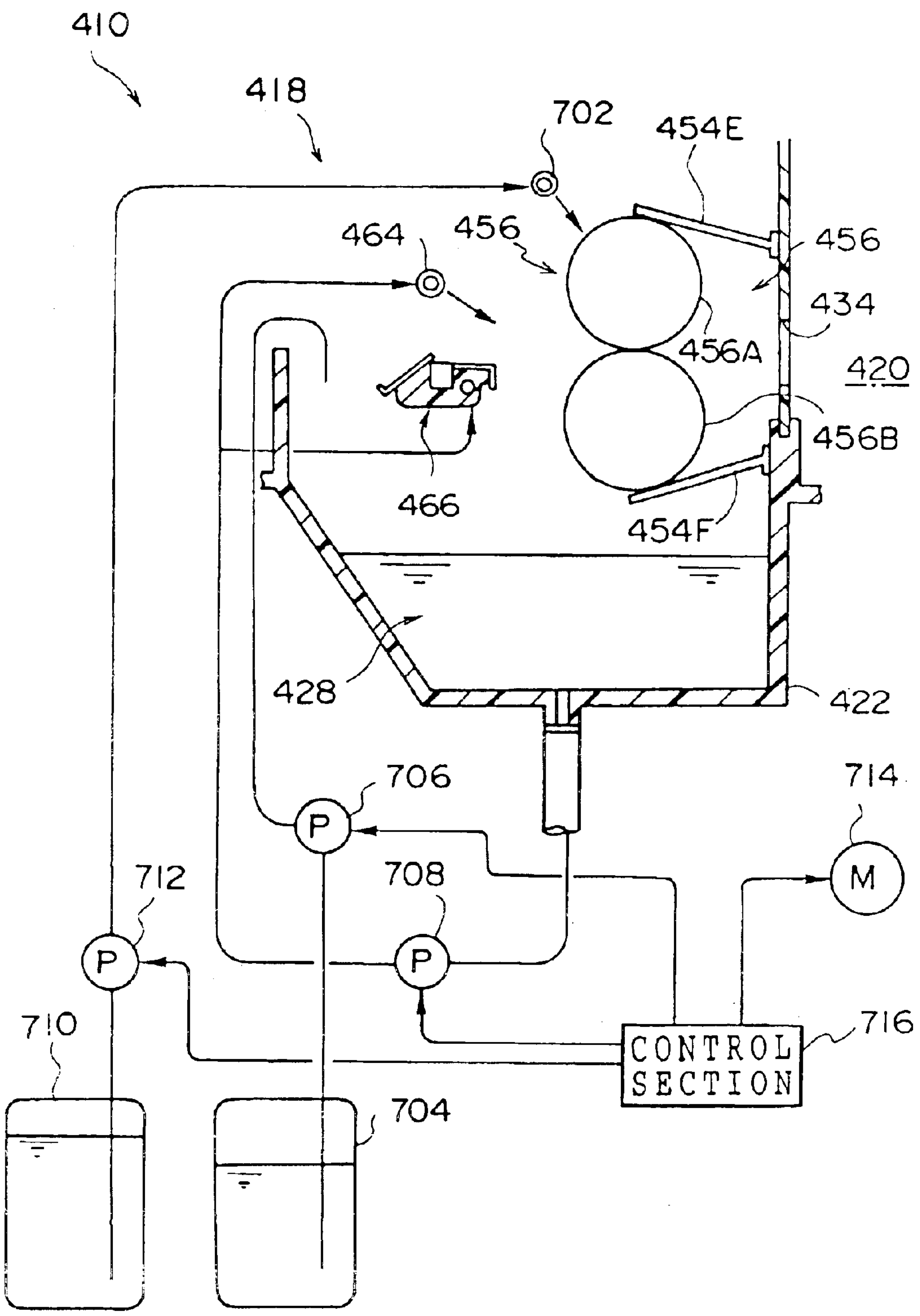
FIG. 23 is a schematic diagram showing the configuration of a desensitizing process part for washing the roller, according to a seventh embodiment.

As shown in FIG. 23, in the desensitizing process section 418, a replenishing liquid tank 704 is provided for storing a gum liquid for replenishment so that the gum liquid in the replenishing liquid tank 704 is replenished to the desensitizing process vessel 428 by operating a replenishing pump 706 by a preset predetermined timing.

Moreover, in the desensitizing process section 418, a liquid supply pump 708 to be operated synchronously with the conveyance of the PS plate 412 is provided so that the gum liquid in the desensitizing process vessel 428 is supplied to the spray pipe 464 and the ejection unit 466 by operating the liquid supply pump 708 so as to be coated on the front and rear surfaces of the PS plate 412. The excessive gum liquid is squeezed off from the front and rear surfaces of the PS plate 412 by the conveying roller pair 456 so as to be collected in the desensitizing process vessel 428.

The gum liquid stored in the desensitizing process vessel 428 contains a component, such as a gum Arabic so that when the conveying roller pair 456 with the gum liquid adhered is left for a long time in the state with the gum liquid adhered, the gum liquid component is precipitated on the circumferential surface of the rollers 456A, 456B comprising the conveying roller pair 456 so as to fix the roller 456A and the roller 456B. When the rollers 456A, 456B are rotated again, a large torque is applied on the gear, or the like for transmitting the driving force to the rollers 456A, 456B so that breakage of the gear, or the like may be caused. Moreover, the surface of the PS plate 412 can be damaged at the time the rollers 456A, 456B with the gum liquid component precipitated on the circumference are contacted with the PS plate 412 so as to deteriorate the finish quality of the PS plate 412.

Moreover, as shown in FIG. 13 and FIG. 23, in the desensitizing process section 418 of the PS plate processor 410, a washing spray 702 is provided as a washing device for the conveying roller pair 456.

The washing spray 702 is disposed, for example, with the axis direction along the axis direction of the conveying roller pair 456, with a plurality of ejection holes (not shown) formed. The ejection holes are provided along the axis direction of the washing spray 702. The washing spray 702 is mounted with the ejection holes facing the upper roller 456A of the conveying roller pair 456.

Furthermore, in the desensitizing process section 418, a water tank 710 for storing water for dilution and a washing pump 712 are provided so that the water in the water tank 710 can be supplied to the washing spray 702 by operating the washing pump 712.

By the supply of the water from the water tank 710, the washing spray 702 drops the water as the washing water to the circumferential surface of the roller 456A while diffusing the same. Thereby, the circumferential surface of the roller 456B together with the circumferential surface of the roller 456A can be washed with the washing water dropped from the washing spray 702.

As the washing device for washing off the gum liquid adhered on the circumferential surface of the conveying roller pair 456 is not limited to that using the washing spray 702, and it is also possible to for example, drop the washing water onto the conveying roller pair 456 while diffusing the washing water in the axis direction of conveying roller pair 456 by providing a water supply bucket along the axis direction of the conveying roller pair 456 and supplying the washing water to the water supply bucket. Furthermore, an optional configuration of evenly diffusing the washing water in the axis direction of the roller 456A by providing a backup roller contacting with the circumferential surface of the roller 456A, and dropping the washing water on the contact part of the roller 456A and the backup roller, or the like can be used.

The washing water supplied from the washing spray 702 to the conveying roller pair 456 is collected in the desensitizing process vessel 428 as the diluting water for diluting the gum liquid in the desensitizing process vessel 428 so as to prevent the concentration rise due to the moisture evaporation from the gum liquid stored in the desensitizing process vessel 428, or the like so that the component in the gum liquid can be maintained in a predetermined concentration range (a gum liquid concentration range appropriate for protecting the plate surface of the PS plate 412).

Although the water in the water tank 710 is used also as the diluting liquid for the developing liquid to be supplied to the developing vessel 424 and the washing water to be replenished in the water washing vessel 426, illustration and explanation are not given for the diluting water for diluting the replenishing liquid for the developing liquid and supply of the washing water in this embodiment.

Next, in the PS plate processor 410, a conveyance motor 714 is provided as a driving source for driving the conveying roller in the device including the conveying roller pair 456. The conveyance motor 714 is interlocked with each conveying roller including the conveying roller pair 456 via a driving force transmitting device formed with a gear or the like (not shown) Thereby, the PS plate 412 can be conveyed by driving the conveyance motor 714.

Further, in the PS plate processor 410, a control section 716 for controlling the operation of the conveyance motor 714 is provided together with the replenishing liquid pump 706, the liquid supply pump 708, the washing pump 712, or the like. In the control section 716, by rotating the conveying roller pair 456 (rollers 456A, 456B) by driving the conveyance motor 714 according to the operation of the washing pump 712, the washing efficiency of the rollers 456A, 456B can be improved.

Figure 24:
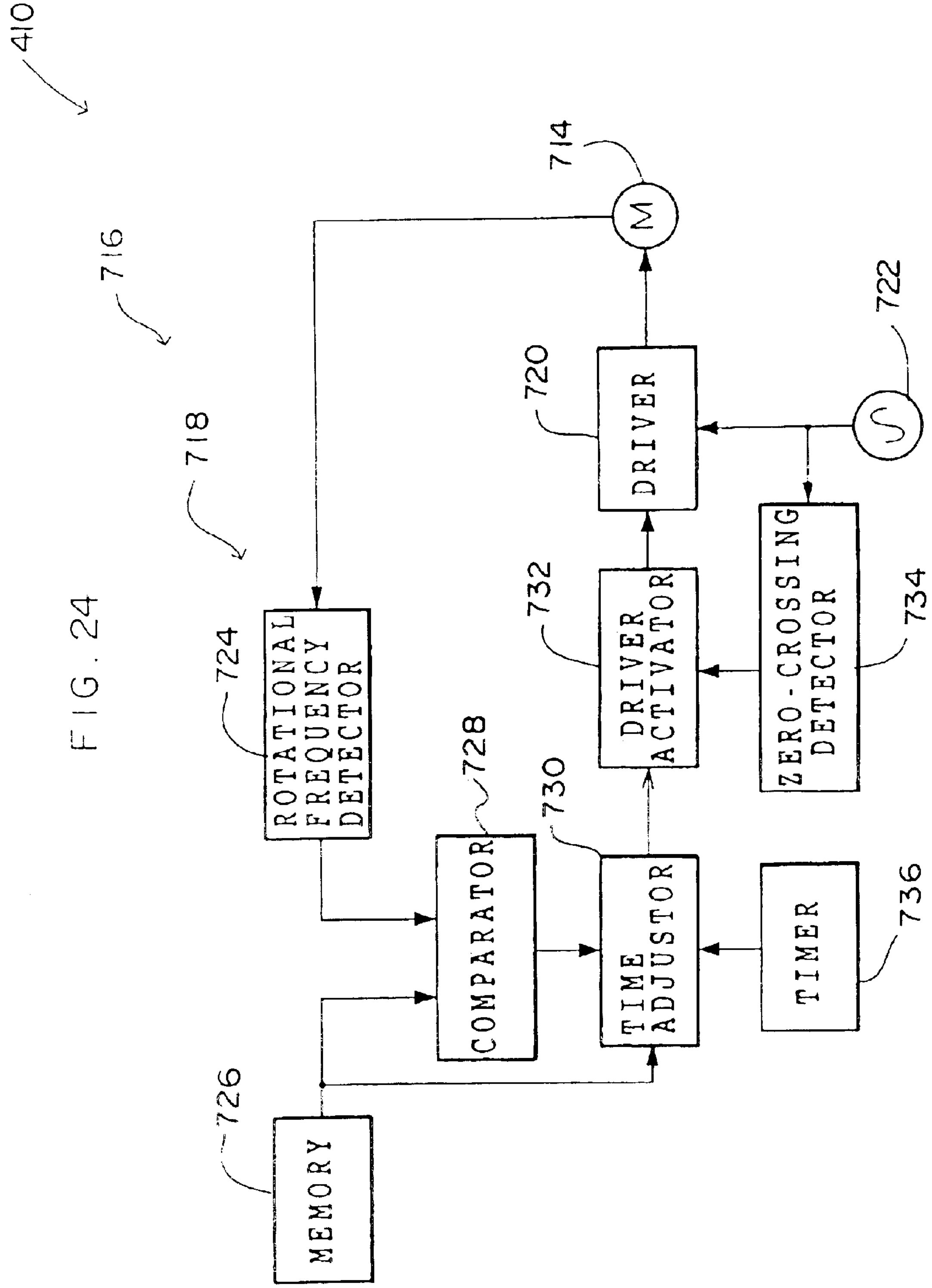
FIG. 24 is a plate diagram showing the schematic configuration of a driving controller for driving a conveyance motor.

As shown in FIG. 24, in the control section 716, a driving controller 718 is provided such that the operation of the conveyance motor 714 is controlled by the driving controller

718. The control section 716 has a general function for controlling the operation of the devices in the PS plate processor 410. Among them, the operation control of the conveyance motor 714 will be explained in this embodiment.

In the driving controller 718, a driver 720 is provided. The driver 720 supplies or plates the alternating current electric power supplied from an alternating current power source 722 to the conveyance motor 714.

In the PS plate processor 410, an alternating current motor to be rotated by the alternating current electric power is used as the conveyance motor 714. The conveyance motor 714 is driven by an output torque and a rotational frequency corresponding to the effective value of the inputted alternating current voltage.

The driving controller 718 controls the conveyance speed of the PS plate 412 in the PS plate processor 410 by controlling the effective value of the alternating current voltage to be supplied to the conveyance motor 714 as well as controls the output torque at the time of washing the conveying roller pair 456.

Therefore, the driving controller 718 is provided with a rotational frequency detector 724 for detecting the rotational frequency of the conveyance motor 714, a memory 726 for storing the reference rotational frequency of the conveyance motor 714 for the conveying the PS plate 412 by a preset conveyance speed, and a comparator 728 for comparing the rotational frequency detected by the rotational frequency detector 724 and the reference rotational frequency stored in the memory 726. Thereby, the driving controller 718 carries out the feedback control of the conveyance motor 714.

Figures 25A, 25B:
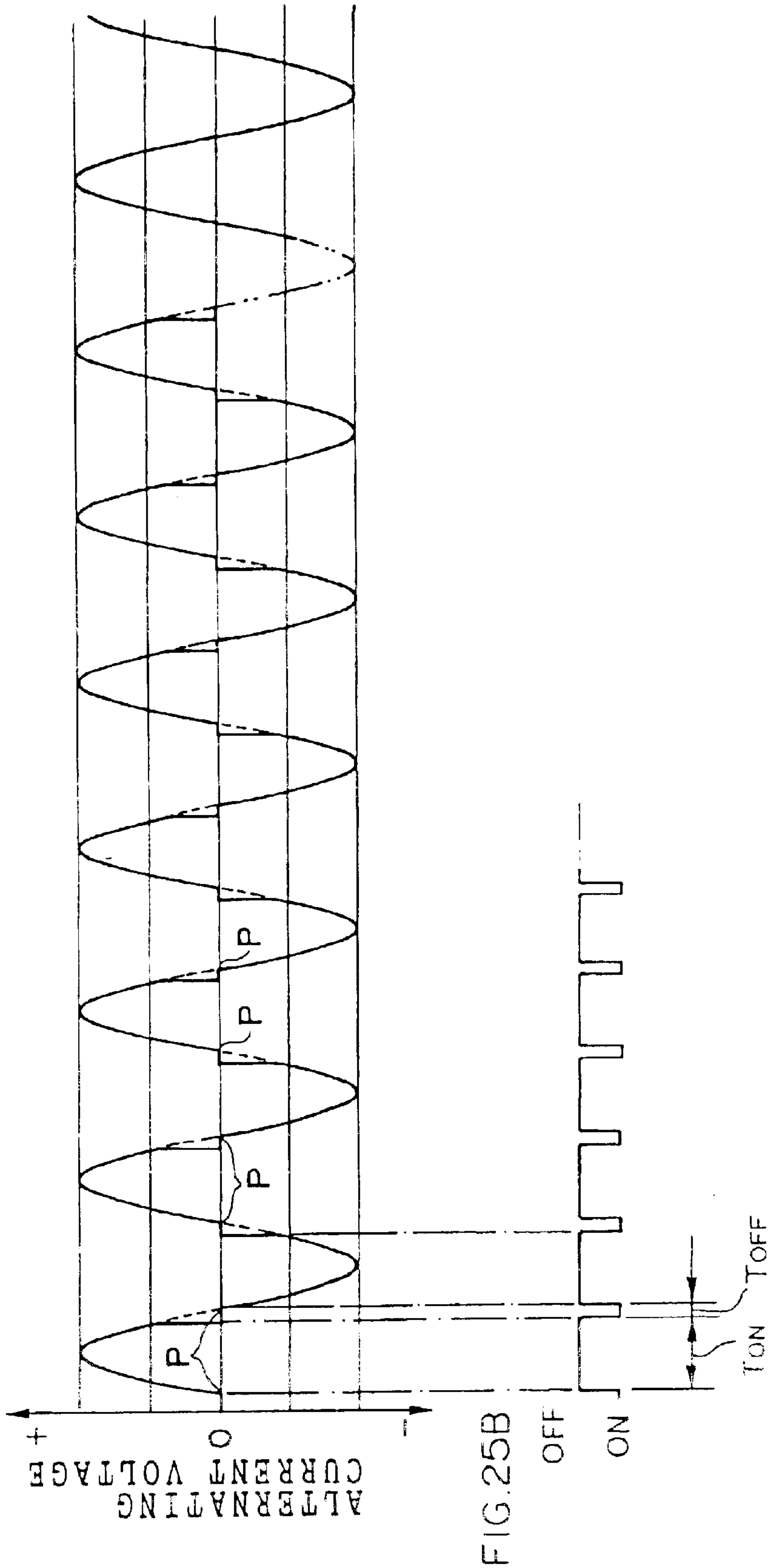
FIG. 25A is a linear diagram showing an example of the waveform of an alternating current voltage to be supplied to the conveyance motor.
FIG. 25B is a linear diagram showing an example of a signal for driving the conveyance motor.

Next, in the driving controller 718, the on time for supplying the electric power in a half cycle of the alternating current voltage at the time of operating the conveyance motor 714, and the off time for stopping the electric power supply are set so that the driver 720 is operated based on the setting result. That is, as shown in FIG. 25A and FIG. 25B, the driver 720 energizes the conveyance motor 714 during the on time $T_{ON}$ in the half cycle of the alternating current voltage, and stops the power supply during the off time $T_{OFF}$ at the time of operating the conveyance motor 714. FIG. 25B shows the on/off state of the driver 720, and FIG. 25A shows the change of the output voltage (momentary value) according to the on/off state of the driver 720 by a solid line.

As shown in FIG. 24, a time adjustor 730 is provided in the driving controller 718. The time adjustor 730 controls the on time $T_{ON}$ based on the comparison result of the comparator 728 such that the rotational frequency of the conveyance motor 714 is kept at a predetermined rotational frequency (for example, the reference rotational frequency).

That is, the time adjustor 730 shortens the on time $T_{ON}$ so as to lower the rotational frequency of the conveyance motor 714 when the rotational frequency of the conveyance motor 714 is higher than the reference rotational frequency, and prolongs the on time $T_{ON}$ so as to raise the rotational frequency of the conveyance motor 714 when the rotational frequency of the conveyance motor 714 is lower than the reference rotational frequency. Thereby, the conveyance speed can be controlled accurately using a low cost alternating current motor in the PS plate processor 410.

Moreover, in the driving controller 718, a driver activator 732 and a zero-crossing detector 734 are provided. The zero-crossing detector 734 detects the zero cross point P (see FIG. 25A) at which the polarity of the alternating current voltage inputted from the alternating current power source 722 is switched. Moreover, the driver activator 732 operates the driver 720 based on the detection result of the zero-crossing detector 734 and the on time $T_{ON}$ set by the time adjustor 730.

Next, a timer 736 is provided in the driving controller 718. Furthermore, the on time $T_{ON}$ for gradually raising the alternating current voltage effective value to be supplied to the conveyance motor 714 at the time of operating the conveyance motor 714 according to the roller washing operation is stored in the memory 726.

In the driving controller 718, the on time $T_{ON}$ stored in the memory 726 is read by a predetermined time interval at the time of washing the roller for setting at the on time $T_{ON}$ so as to gradually raise the alternating current voltage effective value to be supplied to the conveyance motor 714.

Thereby, the driving controller 718 gradually raises the output torque of the conveyance motor 714 at the time of washing the roller.

The gum liquid used for the PS plate processor 410 contains a component such as a gum Arabic. When the conveying roller pair 456 with the gum liquid adhered outside is left in the air, the component of the gum liquid is precipitated and fixed on the surface of the rollers 456A, 456B comprising the conveying roller pair 456. When the rollers 456A, 456B re-start rotating, a large torque acts on the gears for transmitting the driving force to the rollers 456A, 456B, and the gears may be damaged. Moreover, the finishing failures such as adherence of the gum liquid component precipitated on the circumference of the rollers 456A, 456B to the PS plate 412 to be newly processed, damage of the surface of the PS plate 412 may occur.

In the PS plate processor 410, in order to prevent the breakage of the gear, or the like, and the finish failure of the PS plate 412, the roller washing operation is performed for the conveying roller pair 456 at the time of starting the drive of the device. As to the washing operation for the conveying roller pair 456 provided in the desensitizing process section 418, it can be performed by the conventionally known optional timing and washing method (washing water supply method), and thus detailed explanation is not given in the sixth embodiment.

For example, in the PS plate processor 410, when the drive is started for processing the PS plate 412 from the state with the drive of the device stopped for a predetermined time or more, the washing pump 712 is operated for dropping the water in the water tank 710 from the washing spray 702 as washing water, onto the upper side roller 456A of the conveying roller pair 456. Simultaneously with the operation, in the PS plate processor 410, the conveyance motor 714 is driven so as to rotate the conveying roller pair 456.

Thereby, the washing water dropped from the washing spray 702 is diffused on the circumferential surface of the rollers 456A, 456B, and further, it is squeezed off from the circumferential surface of the rollers 456A, 456B for eliminating the gum liquid or the component in the gum liquid adhered on the circumferential surface of the rollers 456A, 456B so that generation of the finish quality decline due to adherence of the component of the gum liquid fixed on the circumferential surface of the rollers 456A, 456B on the surface of the PS plate 412 to be processed by the PS plate processor 410, or damage of the surface thereby can be prevented.

If the rollers 456A, 456B with the gum liquid adhered are left unrotating, the contact part between the rollers 456A, 456B may be attached with each other by the gum liquid. When the conveying roller pair 456 restart rotating, a large load acts on the gears for transmitting the driving force to the conveying roller pair 456. Subsequently, if a large torque acts suddenly, damage such as chip off of the gears may occur. Moreover, when a large rotation torque acts suddenly for peeling off the attached rollers 456A, 456B, the circumferential surface of the rollers 456A, 456B may be damaged.

The conveyance controller 718 controls the drive of the conveyance motor 744 so as to gradually raise the output torque of the conveyance motor 714 in order to prevent damage of the components for transmitting the driving force and damage of the rollers 456A, 456B.

Figure 26:
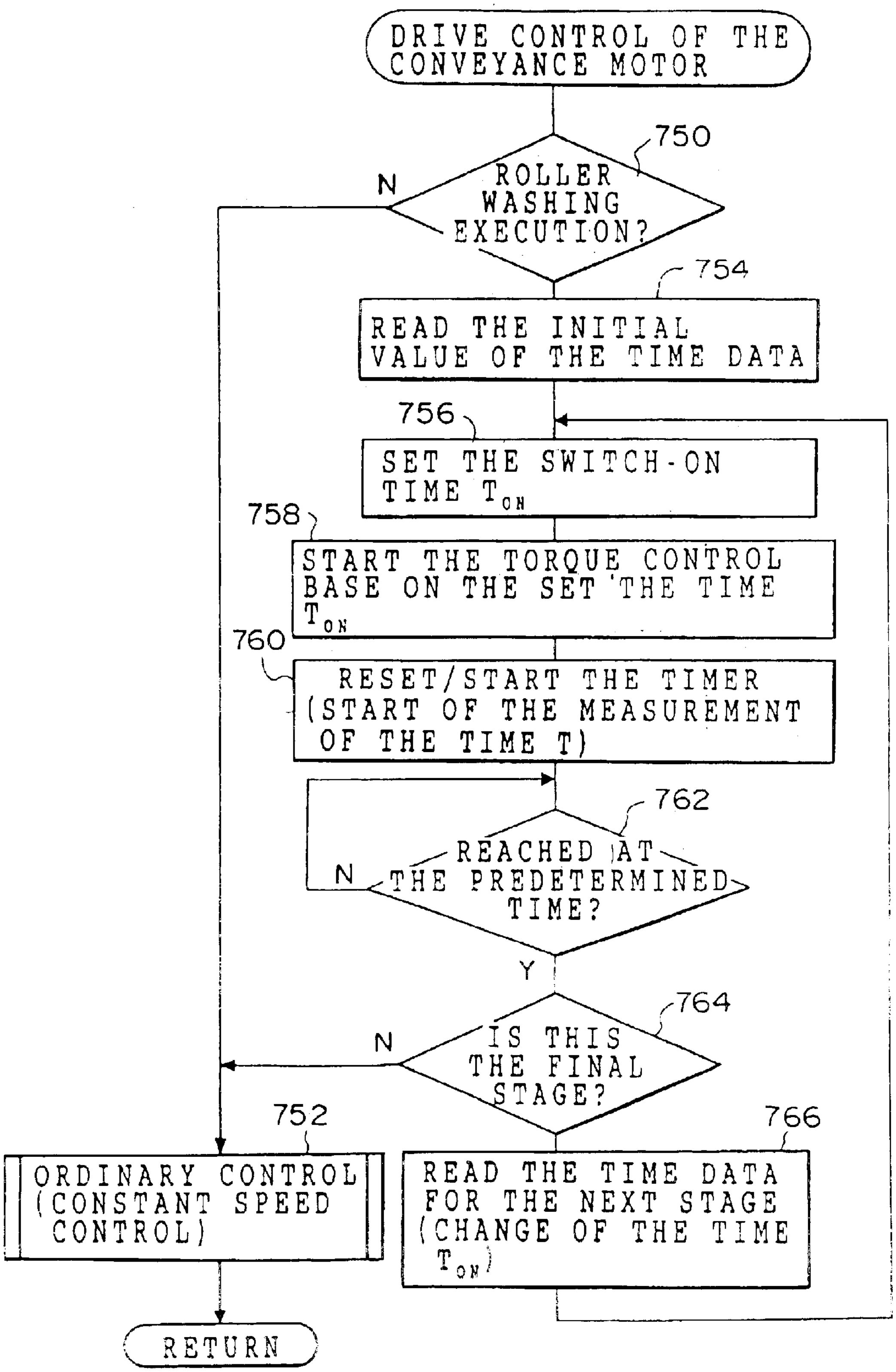
FIG. 26 is a flow chart showing the schematic configuration of the driving control of the conveyance motor.

With reference to the flow chart of FIG. 26, the drive control of the conveyance motor 714 by the driving controller 718 will be explained. In this embodiment, as an example, the time interval for changing the on time $T_{ON}$ (time Ts) is set at 0.5 sec. Moreover, time data with the electric power (alternating current voltage) supplied to the conveyance motor 714 to be raised by 10% of the voltage effective value set so as to be the reference rotational frequency per the time Ts are stored in the memory 726.

The flow chart is performed when a power source (not shown) of the PS plate processor 410 is turned on so as to start the drive. In the first step 800, whether or not the conveying roller pair 456 is washed is confirmed. At the time, if the stoppage time of the PS plate processor 410 is short or the drive start is finished, a negative determination is made in the step 750 so as to move to the step 752 for performing an ordinary control for conveying the PS plate 412 at a constant speed.

Here, when of washing the roller, a positive determination is made in the step 750 for performing the drive control of the conveyance motor 714 according to the roller washing operation. In the drive control at the time of washing the roller, the initial value (first value) of the time data stored in the memory 826 is read in the step 754, and the on time $T_{ON}$ in the half cycle of the alternating current voltage is set based on the time data in the following step 756.

Thereafter, in the step 758, the electric power is supplied or stopped to the conveyance motor 714 based on the on time $T_{ON}$ as well as the timer 736 is reset or started in the step 760 for starting measurement of the passage of the time.

Figure 27A:
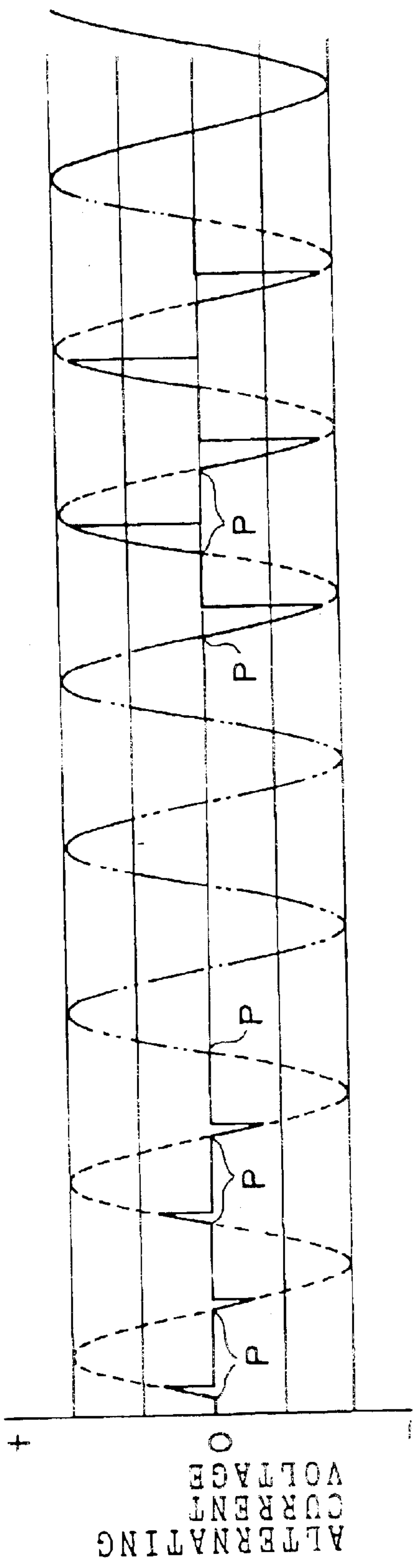
FIG. 27A is a linear diagram showing the schematic configuration of the voltage waveform to be supplied to the conveyance motor at the time of washing the roller.
Figure 27B:
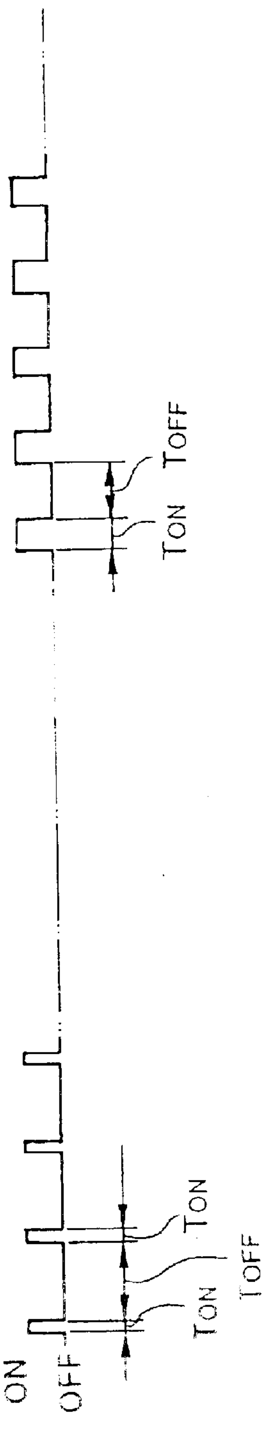
FIG. 27B is a linear diagram showing an example of a signal for driving the driver at the time of washing the roller.

Thereby, as shown in FIG. 27A and FIG. 27B, the electric power is supplied to the conveyance motor 714 with the electric conduction and blockage repeated according to the on time $T_{ON}$ in the half cycle of the alternating current voltage for starting the operation by the electric power. At the time, since the on time $T_{ON}$ is short so that the inputted alternating current voltage effective value is low, the rotation drive of the conveyance motor 714 is started by a small output torque.

Next, in the flow chart of FIG. 26, whether or not the measurement time T by the timer 736 reached the time Ts is confirmed in the following step 762. When the measurement time T reached the time Ts so as to make a positive judgment, it moves to the step 764 for confirming whether or not setting of the on time $T_{ON}$ is at the final stage. When it is at the final stage (positive determination in the step 764), it moves to the step 766 for reading the time data of the next stage. Based on the time data, the next on time $T_{ON}$ is set (step 756, 758) as well as the timer 736 is reset/started (step 760).

Accordingly, by gradually prolonging the on time $T_{ON}$ at the time of driving the conveyance motor 714 so that the effective value of the alternating current voltage to be supplied to the conveyance motor 714 reaches a predetermined voltage (voltage of the alternating current power source 722) at the final stage, a negative determination is made in the step 764 so as to move to the step 752 for starting the ordinary control.

Thereby, by prolonging the on time $T_{ON}$ stepwise, the effective value of the alternating current voltage to be supplied to the conveyance motor 714 is gradually raised.

When the effective value of the alternating current voltage to be supplied is low, the output torque of the conveyance motor 714 is small. Therefore, a large torque is not applied to the gear for transmitting the driving force to the conveying roller pair 456 immediately after starting the operation of the driving motor 714.

Thereby, since a large torque does not act on the gear even when the rollers 456A, 456B are fixed by the gum liquid, the gear is not damaged.

Next, by prolonging the on time $T_{ON}$ stepwise, the output torque of the conveyance motor 714 is gradually increased and enlarged. Thereby, the rotation torque applied on the rollers 456A, 456B is gradually enlarged so that when they are in the attached state by the gum liquid, the attachment of the gum liquid is gradually peeled off. At the time, since the on time $T_{ON}$ and the off time $T_{OFF}$ are set in the half cycle of the alternating current voltage, irregularity does not occur in the output torque even when of repeating the supply and stoppage of the electric power.

Since the attached state of the rollers 456A, 456B by the gum liquid is released accordingly in the conveying roller pair 456, breakage of the gear in the driving force transmission system, the circumferential surface of the rollers 456A, 456B is not damaged due to forcible peel off of the attachment by the gum liquid. Moreover, the gum liquid adhered on the circumferential surface of the rollers 456A, 456B after release of the attachment is washed off by the washing water supplied from the washing spray 702.

Accordingly, in the PS plate processor 410, even when the rollers 456A, 456B of the conveying roller pair 456 for squeezing off the excessive gum liquid from the PS plate 412 are in the attached state by the component in the gum liquid, the rollers 456A, 456B can be peeled off without damaging the gear for transmitting the driving force to the conveying roller pair 456 so that the rotation of the rollers 456A, 456B can be resumed.

When of repeating the continuous rotation of the conveying roller pair 456 for a predetermined time interval (for example, from several tens of seconds to several minutes) at the time of washing the roller, the effective value of the alternating current voltage can be raised stepwise each time, and furthermore, the effective value of the alternating current voltage may be controlled only for the first time or the several times in the continuous rotation of the conveying roller pair.

Furthermore, although the on time $T_{ON}$ in the half cycle of the alternating current voltage is set in the sixth embodiment heretofore explained, it is not limited thereto, and for example, it is also possible to performe the so-called cycle control of setting the off cycle of the alternating current voltage for supplying the electric power to the conveyance motor 714, and the off cycle for stopping the supply, and controlling the effective value of the alternating current voltage supplied to the conveyance motor 714 based on the ratio of the on cycle and the off cycle.

Moreover, although an alternating current motor is used as the conveyance motor 714 is used in this embodiment as the driving device, a direct current motor can be adopted in stead of the alternating current motor as long as the output torque can be controlled. In this case, an optional control method, for example, a method of supplying a pulse waveform voltage to the direct current motor, and controlling the duty ratio, or the like can be used.

Furthermore, although an example of the PS plate processor 410 for processing the printing plate (PS plate) such as a photo polymer plate is explained as the photosensitive material processing device in this embodiment, the present invention can be adopted in a photosensitive material processing device using a processing liquid with the risk of generating attachment of the rollers comprising the conveying roller pair due to adherence of the conveying rollers. Thereby, generation of the damage, or the like in the components of the driving force transmitting device, such as the gear for transmitting the driving force to the conveying roller pair can reliably be prevented at the time of rotating the conveying roller pair attached by the processing liquid.

Eighth Embodiment

Hereinafter, an eighth embodiment of the present invention will be explained. Since the basic configuration of the eighth embodiment is same as that of the above-mentioned fourth to seventh embodiments, the same numeral is provided for the same member as in those embodiments in the following description, and further explanation is not given in the eighth embodiment to be explained below.

The processing tank 422 used in the PS plate processor 410 can be adopted in a PS plate processor capable of processing the conventional commonly used PS plate (conventional) of the one side type and the both side type each of the positive type and the negative type, the thermal plate of the one side type each of the positive type and the negative type, and the photo polymer plate of the one side type of the negative type by changing the kind, the number, the arrangement, or the like of the members comprising the conveying path of the PS plate 412.

Figure 28:
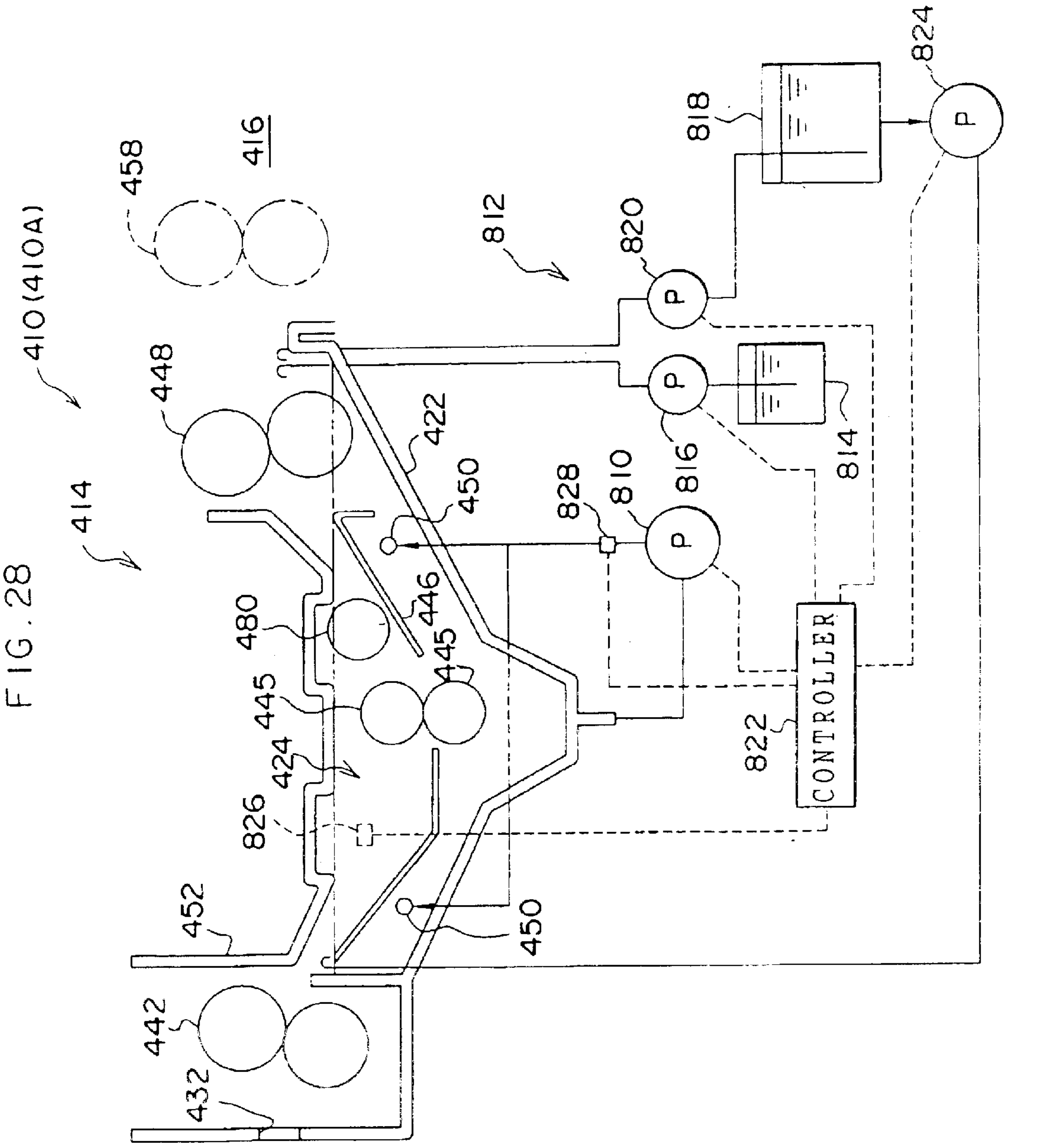
FIG. 28 is a schematic diagram showing the configuration of the developing vessel for the PS plate processor shown in FIG. 13.

Here, an example of the developing section 414 will be explained. FIG. 28 shows the schematic configuration in the developing vessel 424 of the PS plate processor 410 shown in FIG. 13 (hereinafter referred to as the "PS plate processor 410A" when of specifying). In the PS plate processor 410, the one side type commonly used PS plate 412, and the thermal plate can be processed.

Next, in the PS plate processor 410 shown in FIG. 29 (hereinafter referred to as the "PS plate processor 410B" when of specifying), a roll roller 482 is provided facing the brush roller 480 in the developing vessel 424 instead of the guide plate 46. Moreover, in the PS plate processor 410B, the brush roller 484 facing the lower side surface of the PS plate 412, and the roll roller 482 facing the brush roller 484 are provided.

Thereby, the PS plate processor 410B can process the both side type PS plate 412.

In the PS plate processor 410 shown in FIG. 30 (hereinafter referred to as the "PS plate processor 410C" when of specifying), the guide plate 486 smoothly curved in a substantially U shape is disposed from the insertion side of the developing vessel 424 to the discharge side. Moreover, in the PS plate processor 410C, in addition to the brush roller 480 at the downstream part of the developing vessel 424, a brush roller 488 at the upstream part of the developing vessel 424 is disposed.

Thereby, in the PS plate processor 410C, the PS plate 412 is soaked in the developing liquid while being guided on the guide plate 486. Moreover, in the PS plate processor 410C, the surface of the PS plate 412 is brushed by the brush rollers 480, 488 so that the process of for example, a one side type photo polymer plate can be enabled.

Accordingly, the process of the PS plates 412 of different kinds is enabled in the process tank 422 by changing the members comprising the conveying path of the PS plate 412, or the like in the processing vessel corresponding to the developing vessel 424.

That is, the PS plate processor 410A shown in FIG. 28 can be used for the process of the one side type thermal plate or the commonly used PS plate 412. The PS plate processor 410B shown in FIG. 29 can be used for the process of the both side type PS plate 412. Moreover, the PS plate processor 410C shown in FIG. 30 can be used mainly for the process of the one side type photo polymer plate.

Figure 29:
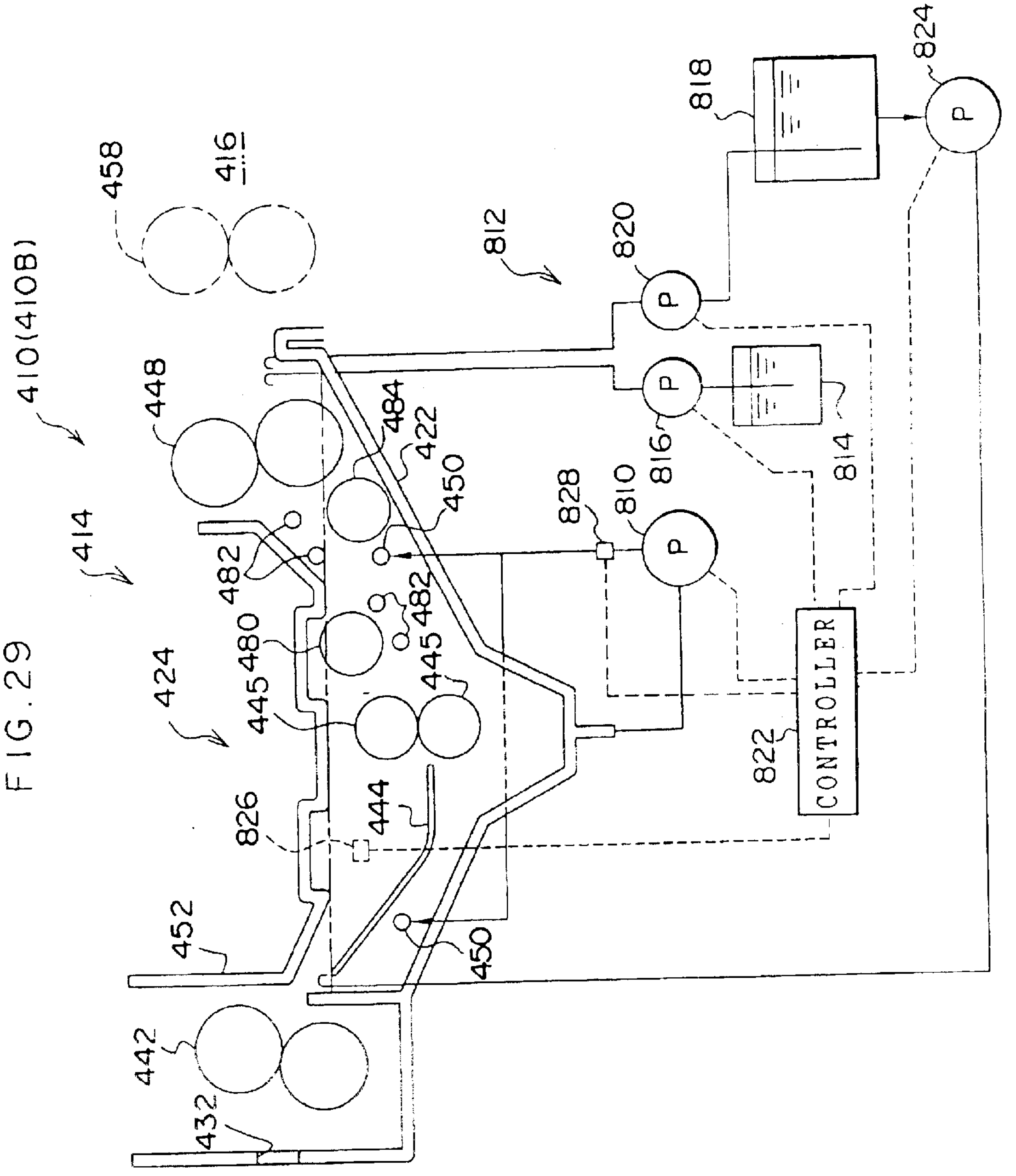
FIG. 29 is a schematic diagram showing the configuration of the developing vessel of a configuration different from that of FIG. 28, using the same processing tank.
Figure 30:
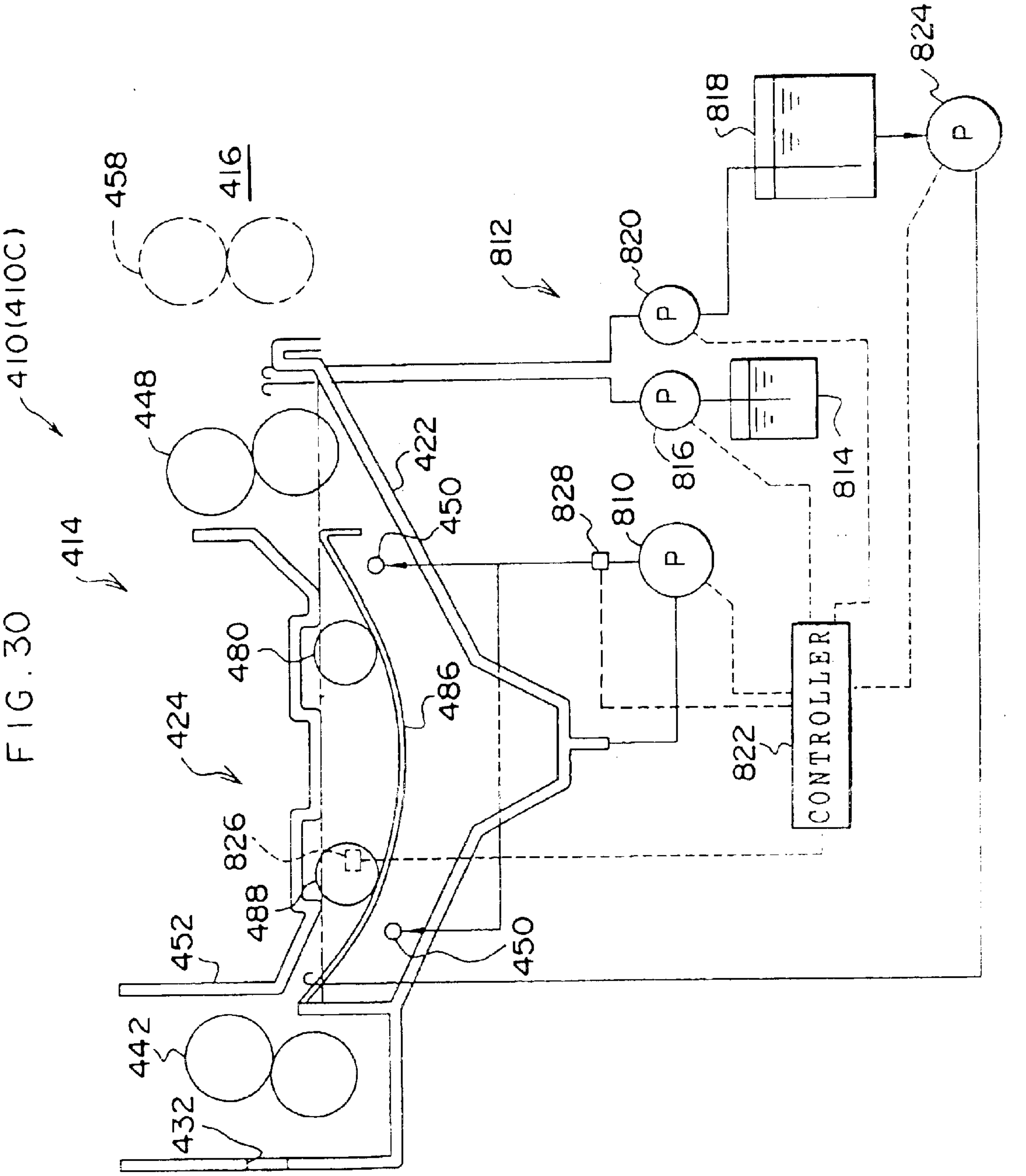
FIG. 30 is a schematic diagram showing the configuration of the developing vessel of a configuration different from those of FIG. 28 and FIG. 29, using the same processing tank.

As shown in FIGS. 28 to 30, in these PS plate processors 410, a circulation pump 810 is provided so that the developing liquid in the developing vessel 424 is supplied to the spray pipe 450 by the operation of the circulation pump 810. Thereby, the developing liquid is jetted from the spray pipe 450 so as to agitate the developing liquid in the developing vessel 424 so that generation of the finish failure, such as the developing irregularity is prevented by supplying the fresh developing liquid to the surface of the PS plate 412 during the process of the PS plate 412. As the circulation pump 810, a magnet pump, or the like is used.

Next, in the PS plate processor 410, a replenishing liquid replenishing mechanism 812 is provided for preventing the deterioration of the developing liquid in the developing vessel 424. The replenishing liquid replenishing mechanism 812 comprises an original liquid tank 814 for storing the original liquid for the replenishment, a replenishing pump 816 for supplying the original liquid in the original liquid tank 814 to the developing vessel 424, a water tank 818 for storing the water for diluting the original liquid for the replenishment to be supplied to the developing vessel 424 by a predetermined ratio, and a diluting pump 820 for supplying the water in the water tank 818 to the developing vessel 424.

Moreover, in the PS plate processor 410, a control section 822 is provided, and it is connected to the replenishing pump 816, and the diluting pump 820 together with the circulation pump 810. The control section 822 supplies the original liquid for the replenishment, and the water for diluting the original liquid by a preset diluting ratio to the developing vessel 424 by operating the replenishing pump 816 and the diluting pump 820 by a preset predetermined timing. Thereby, the replenishing liquid is replenished to the developing vessel 424.

At the time, in the PS plate processor 410, a bellows pump is used as the replenishing pump 816, and the diluting pump 820 so that the original liquid for the replenishment and the diluting water can be supplied with the amount accurately controlled.

As to the replenishment timing for the replenishing liquid, a commonly known optional timing can be adopted, and thus detailed explanation is not given in this embodiment. Moreover, the water tank 818 may be provided outside the PS plate processor 410. Furthermore, the tap water is supplied to the water tank 818 according to the reduction of the water. As to the replenishment of the tap water to the water tank 818, conventionally known various configuration can be adopted.

Next, after using the developing liquid in the developing vessel 424 for a preset period, the PS plate processor 410 abandons the developing liquid and prepares the new developing liquid (preparation liquid).

In the PS plate processor 410, in addition to the diluting pump 820, a water supply pump 824 is provided so that the water in the water tank 818 can be supplied to the developing vessel 424 by operating the water supply pump 824 at the time of preparing the preparation liquid.

As the water supply pump 824, a magnet pump is used so that a large amount of water can be supplied to the developing vessel 424 in a short time so as to enable the quick preparation of the preparation liquid.

Moreover, in the PS plate processor 410, a liquid level sensor 826 is provided in the developing vessel 424 as a liquid level detecting device. The liquid level sensor 826 is provided corresponding to the liquid level of the developing liquid at the time of supplying a preset predetermined amount of the developing liquid to the developing vessel 424.

Thereby, the control section 822 can determine whether or not a predetermined amount of the developing liquid is supplied into the developing vessel 424 based on the detection result of the liquid level sensor 826. As the liquid level sensor 826, various conventionally known sensors, such as a float method can be used.

In preparation of the preparation liquid in the developing vessel 424, the control section 822 provided in the PS plate processor 410 supplied a preset certain amount of the diluting water into the developing vessel 424 by operating the water supply pump 824 while confirming the detection result of the liquid level sensor 826 after supplying the original liquid of the developing liquid into the developing vessel 424.

Next, in the PS plate processor 410, even when the developing vessel 424 of the same volume is provided in the same processing tank 422, the amount of the developing liquid differs depending on the configuration of the members comprising the conveying path of the PS plate 412 in the developing vessel 424, or the like. Moreover, in the PS plate processor 410, the diluting ratio for the original liquid may differ depending on the kind of the PS plate 412 to be processed.

That is, in the PS plate processor 410, the amount of the original liquid and the diluting water differs at the time of preparing the preparation liquid depending on whether the PS plate 412 to be processed is the commonly used PS plate, the thermal plate, or the photo polymer plate, and further depending on whether it is the one side type or the both side type.

For example, the volume of the developing vessel 424 (amount of the storable developing liquid) is 20 l (litters) in the PS plate processors 410A, and 410C, whereas it is 19 l (letters) in the PS plate processor 410B.

Next, the original liquid used for preparation of the preparation liquid is sealed in a bottle by a certain amount so that when of preparing the preparation liquid in the developing vessel 424, it is necessary to introduce the diluting water into the developing vessel 424 so as to dilute the original liquid by a predetermined ratio according to the kind of the PS plate 412 after introducing the bottle of the original liquid in the developing vessel 424.

Moreover, in the PS plate processor 410, the original liquid for the replenishment stored in the original liquid tank 814 can be used for example, as a part of the original liquid for the preparation.

Therefore, in the control section 822, the preparation liquid can be prepared according to the kind of the PS plate 412 by replenishing the original liquid for the replenishment and the diluting water, or either of the original liquid and the diluting water according to the capacity of the developing vessel 424 and the diluting ratio using the replenishing liquid replenishing mechanism 122 after introducing a certain amount of the original liquid and the diluting water in the developing vessel 424.

That is, a certain amount of the basic liquid is prepared with the original liquid and diluting water to be supplied by the water supply pump 824 as the preparation liquid by a certain ratio regardless of the kind of the PS plate 412, and thereafter the adjusting replenishment is performed by the replenishing liquid replenishing mechanism 812 according to the kind of the PS plate 412 so as to prepare the preparation liquid according to the kind of the PS plate 412.

Therefore, in the control section 822, the basic liquid amount is set as well as the adjusting replenishment pattern according to the kind of the PS plate 412 is stored. Moreover, in the liquid level sensor 826 provided in the developing vessel 424, the detecting position is set so as to detect the liquid level according to the amount of the basic liquid.

Moreover, as shown in FIGS. 28 to 30, an electric conductivity sensor 828 for detecting the electric conductivity of the developing liquid is provided in the PS plate processor 410. The electric conductivity sensor 828 is provided on the ejection side of the circulation pump 810 so as to detect the electric conductivity of the developing liquid supplied from the circulation pump 810 to the spray pipe 50.

The developing liquid has the electric conductivity changeable according to the diluting ratio. The control section 822 detects the electric conductivity of the developing liquid by the electric conductivity sensor 828 for confirming whether or not the developing liquid in the developing vessel 424 maintains a predetermined processing performance. Moreover, in the control section 822, a certain processing performance (developing performance) is maintained for example by replenishing the replenishing liquid based on the detected electric conductivity by the electric conductivity sensor 828. For the administration of the developing liquid using the electric conductivity sensor 828, the conventionally known method can be adopted, and thus detailed explanation is not given in this embodiment.

Next, the control section 822 confirms whether or not the electric conductivity according to the kind of the PS plate 412 is obtained by supplying a predetermined amount of the original liquid for the replenishment and the diluting water by the diluting ratio according to the kind of the PS plate 412, and detecting the electric conductivity by the electric conductivity sensor 828 at the time of performing the adjusting replenishment of the preparation liquid using the replenishing liquid replenishing mechanism 812.

Here, with reference to FIG. 31, the schematic procedure of preparing the preparation liquid in the PS plate processor 410 will be explained. In this embodiment, as an example, the total basic liquid amount will be 17.5 l (litters) using 2 l (litters) of the original liquid sealed in a bottle. That is, when the developing liquid amount in the developing vessel 424 becomes 17.5 l (litters), the liquid level sensor 826 detects the liquid level of the developing liquid so that the 15.5 l (litters) of the water is introduced using the water supply pump 824 so as to have 17.5 l (litters) of the basic liquid. Then, after circulating and agitating the basic liquid, whether or not the original liquid and the water are introduced by a predetermined ratio is confirmed by measuring the electric conductivity by the electric conductivity sensor 828.

Moreover, as shown in FIG. 32, the adjusting replenishment pattern according to the kind of the PS plate 412 is set and stored in the control section 822. For example, when of processing the positive type one side type PS plate 412 in the PS plate processor 410A, the pattern P1 is selected so that 0.15 l (litter) of the diluting water and 2.0 l (litters) of the replenishing liquid with a 1:12 diluting ratio (replenishing liquid made of 12 units of the diluting water with respect to 1 unit of the original liquid for the replenishment) are replenished.

Figure 31:
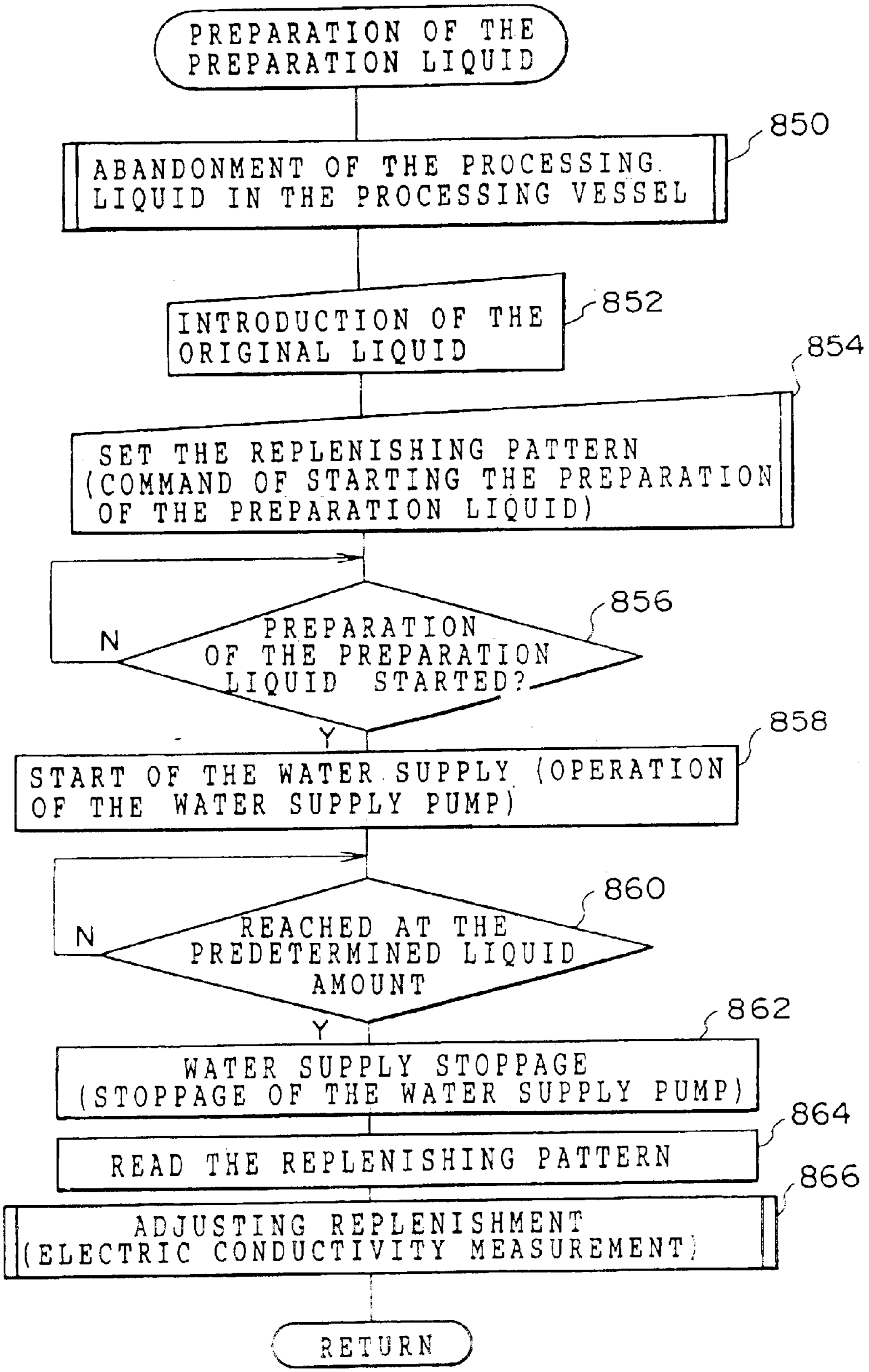
FIG. 31 is a flow chart showing the schematic configuration of the preparation process for the preparation liquid.

As shown in the flow chart of FIG. 31, for the preparation of the preparation liquid, first, the waste liquid process of discharging the used developing liquid in the developing vessel 424 is performed (step 200). When the developing vessel 424 is emptied thereby, in the next step 202, 2 l (litters) of the original liquid for a bottle is introduced manually into the developing vessel 424.

Thereafter, by the switch operation of an operation panel (not shown), the replenishing pattern at the time of the adjusting replenishment is set (step 854), and start of performing the preparation of the preparation liquid is commanded.

In the step 856, whether or not the start of the preparation of the preparation liquid is commanded is confirmed. If the start of the preparation is commanded and a positive determination is made, it moves to the step 858 so as to start the operation of the water supply pump 824. Simultaneously therewith, in the step 860, using the liquid level sensor 826, whether or not the liquid level in the developing vessel 424 reaches at a predetermined level, that is, whether or not the liquid amount of the basic liquid reaches at a predetermined amount (17.5 l) by introducing 15.5 l (litters) of the water into the developing vessel 424 by the water supply pump 824 is confirmed.

Since the water supply pump 824 with a high ejection ability, such as a magnet pump is used at the time of introducing the basic liquid, even a large amount of water can be supplied in a short time.

Here, when the liquid level sensor 826 detects the liquid surface of the developing liquid (basic liquid), a positive determination is made in the step 860 so that it moves to the step 862 for stopping the water supply pump 824 and introduction of the basic liquid is finished.

Next, in the step 864, the replenishing pattern set for performing the adjusting replenishment is read.

Thereafter, in the step 866, the adjusting replenishment is performed by operating the replenishing pump 816 or the diluting pump 820 in the replenishing liquid replenishing mechanism 812 based on the read replenishing pattern.

For example, when of processing a positive type one side type PS plate 412, the replenishing pattern P2 is selected and set in the PS plate processor 410A and introduction of the basic liquid is finished, then the diluting pump 820 is operated so as to supply 0.5 l (litter) of the water into the developing vessel 424, and then the replenishing pump 816 and the diluting pump 820 are operated so as to replenish 2 l (litters) of the replenishing liquid with a 1:12 diluting ratio.

Thereby, 20 l (litters) of the preparation liquid can be prepared accurately in the developing vessel 424 of a 20 l (litters) capacity.

Moreover, when of processing a positive type both side type PS plate 412 in the PS plate processor 410B, the replenishing pattern P1 is selected and set and introduction of the basic liquid is finished, then the diluting pump 820 is operated so as to supply 0.5 l (litters) of the water into the developing vessel 424, and then the replenishing pump 816 and the diluting pump 820 are operated so as to replenish 1 l (litter) of the replenishing liquid with a 1:12 diluting ratio.

Thereby, 19 l (litters) of the preparation liquid can be placed accurately in the developing vessel 424 of a 19 l (litters) capacity.

Furthermore, when of processing a one side type photo polymer plate in the PS plate processor 410C as the PS plate 412, the replenishing pattern P7 is selected and set, then the diluting pump 120 is operated so as to supply 2.5 l (litters) of the water or 0.5 l (litters) of the water, and 2.0 l (litters) of the replenishing liquid with a 1:100 diluting ratio in the developing vessel 424.

Thereby, 20 l (litters) of the preparation liquid can be placed in the developing vessel 424 of the PS plate processor 410C of a 20 l (litters) capacity.

Next, in the adjusting replenishment, after placing 20 l (litters) or 19 l (litters) of the preparation liquid in the developing vessel 424, the preparation liquid is circulated and agitated. Thereafter, using the electric conductivity sensor 828, whether the preparation liquid has the targeted electric conductivity according to the kind of the PS plate 412 is measured.

As a result, when the measurement result is off the targeted electric conductivity, based on the displacement, adjustment is made for obtaining the targeted electric conductivity by operating the replenishing pump 816 so for supplying the original liquid for the replenishment, or operating the diluting pump 820 for supplying the diluting water. It is also possible to perform the adjusting replenishment while detecting the electric conductivity of the preparation liquid being prepared in the developing vessel 424 using the electric conductivity sensor 828 after the introduction of the basic liquid.

That is, in the control section 822, at the time of supplying the original liquid for the replenishment and the diluting liquid to the developing vessel 424, the circulation pump 810 is operated for agitating the original liquid and the diluting water supplied to the developing vessel 424. At the time, in the control section 822, the electric conductivity is measured by the electric conductivity sensor 828.

Thereby, in the control section 822, whether or not the original liquid and the diluting water are sufficiently agitated is confirmed. The electric conductivity of the developing liquid is determined by the diluting ratio of the original liquid, and the electric conductivity is determined by the replenishing pattern.

Therefore, in the control section 822, whether or not the electric conductivity detected by the electric conductivity sensor 828 is at the electric conductivity determined by the replenishing pattern is confirmed. Thereby, the preparation mistake of the preparation liquid is prevented as well as the process of the PS plate 412 by the preparation liquid prepared in a wrong manner can be prevented reliably.

Accordingly, in the PS plate processor 410 using the processing tank 422, by selecting the replenishing pattern set according to the kind of the PS plate 412 to be processed, an appropriate amount of the preparation liquid can be prepared accurately. Moreover, since the water supply pump 824 provided independently from the diluting pump 820 is used, the preparation liquid can be prepared quickly at the time of supplying a large amount of the water into the developing vessel 424.

Moreover, bubbling can be caused by introducing a large amount of the water in a short time in the developing vessel 424 with the original liquid introduced. While the water supply pump 824 is used until it reaches the liquid surface level detected by the liquid level sensor 826, the replenishing pump 816 and the diluting pump 820 with a relatively small ejection ability are used for the adjusting replenishment in the PS processor 410. Due to these pumps 816 and 820, the bubbling is suppressed when the adjusting replenishment, and prevented from growing large enough to overflow from the developing vessel 424 when preparing the basic liquid.

The configuration of the present invention is not limited by this embodiment heretofore explained. This embodiment can be adopted in each of the photosensitive material processing devices in the same basic configuration with different capacity and diluting ratio.

As heretofore explained, according to the present invention, the photosensitive planographic printing plate can be heated in an appropriate temperature range regardless of the size of the photosensitive planographic printing plate or the thickness of the supporting body. Moreover, the excellent effect of restraining the space for preheating the photosensitive planographic printing plate at minimum necessary level so as to provide the device in a compact configuration can be obtained.

Furthermore, according to the present invention, by conveying the photosensitive planographic printing plate in an inclined state, the washing water can be stored between the roller on the inclination downstream side and the photosensitive planographic printing plate so that a further certain washing process of the photosensitive planographic printing plate can be enabled.

Moreover, according to the present invention, since a backup roller to be contacted along the axis direction of the circumferential surface of the roller is provided so that the washing water is supplied between the roller and the backup roller, the washing water can be supplied reliably to the entire region along the axis direction of the roller. Furthermore, the excellent effect of efficiently washing the roller by reliably supplying the washing water to the entire region along the axis of the roller by rotation drive of the roller by a predetermined timing according to the water supply can be obtained.

Moreover, according to the present invention, since the processing liquid in the vicinity of the surface of the photosensitive material can be substituted without generating the flow rate difference of the processing liquid in the vicinity of the surface of the photosensitive material, the excellent effect of processing the photosensitive material without generating the sensitivity difference derived from then temperature difference, the flow rate difference, or the like of the processing liquid can be obtained.

Furthermore, according to the present invention, by separating the rotation shaft from the drive shaft when a preset torque or more is applied on the helical gear, the excellent effect of reliably preventing damage of the helical gear or the driving force transmitting device even when the torque applied on the helical gear is increased due to locking of the conveying roller by generation of jamming, or the like, can be obtained.

Moreover, according to the present invention, since the voltage supplied to the driving source for driving the roller pair is raised gradually at the time of starting the rotation of the roller pair with the processing liquid adhered, the torque applied on the gear for transmitting the driving force to the roller pair, or the like can be increased moderately, and thus the excellent effect of preventing damage of the gear, or the like due to adhesion of the rollers with each other can be obtained.

Furthermore, according to the present invention, since the roller pair can be rotated with the torque moderately increased, the rollers attached with each other can be peeled off gradually.

Moreover, according to the present invention, since the adjusting replenishment is performed based on the processing vessel capacity and the diluting ratio in addition to a predetermined amount of the basic liquid prepared by diluting the original liquid by the diluting water, the excellent effect of preparing the processing liquid (preparation liquid) with different capacity and diluting ratio easily and accurately can be obtained.

What is claimed is:

1. A photosensitive material processing device for processing a photosensitive material with a processing liquid while conveying by a roller pair, comprising:

a driving device for the rotation drive of the roller pair by the drive of a driving source by supplying electric power of a predetermined voltage; and a drive controlling device for gradually raising the voltage of the electric power supplied to the driving source at the time of starting the rotation drive of the roller pairs, wherein the roller pair is positioned to nip the photosensitive material.

2. A photosensitive material processing device according to claim 1, further comprising:

a zero cross detecting device for detecting the zero cross point of the alternating current voltage inputted as the driving electric power, and a setting device for setting the electric power supply time of each half cycle of the alternating current voltage at the time of starting the drive of the driving source when using an alternating current motor driven by the alternating current electric power as the driving source, wherein the drive controlling device drives the driving source by repeating the supply and the stop of the alternating current electric power based on the setting result of the setting device and the detection result of the zero cross detecting device.

3. A photosensitive material processor comprising:

at least one pair of rollers for conveying a photosensitive material to be processed with a processing liquid;

a driving device for driving electrically and rotating said at least one pair of rollers; and a controller which is capable of controlling the driving device so as to cause a gradual increase of output torque when said at least one pair of rollers has been started to rotate by the driving device, wherein said at least one pair of rollers is positioned to nip the photosensitive material.

4. The photosensitive material processor of claim 3, wherein the driving device includes a driving source which generates drive for driving and rotating said at least one pair of rollers in accordance with a supply of electric power.

5. The photosensitive material processor of claim 4, wherein the driving source includes an alternating current motor to be driven by an alternating current, and the photosensitive material processor further comprises a zero-cross detector for detecting the zero-cross point of an alternating current voltage which is input as the electric power, and a setting device for setting an electric power supply time for each half cycle of the alternating current voltage at a time of starting the driving source, and the controller drives the driving source by changing a state repeatedly between a supply and a stop of an alternating current electric power based on a setting result of the setting device and a detection result of the zero-cross detector.

6. A photosensitive material processing device for processing a photosensitive material with a processing liquid while conveying by a roller pair, comprising:

a driving device for the rotation drive of the roller pair by the drive of a driving source by supplying electric power of a predetermined voltage;

a drive controlling device for gradually raising the voltage of the electric power supplied to the driving source at the time of starting the rotation drive of the roller pair;

a zero cross detecting device for detecting the zero cross point of the alternating current voltage inputted as the driving electric power; and a setting device for setting the electric power supply time of each half cycle of the alternating current voltage at the time of starting the drive of the driving source when using an alternating current motor driven by the alternating current electric power as the driving source, wherein the drive controlling device drives the driving source by repeating the supply and the stop of the alternating current electric power based on the setting result of the setting device and the detection result of the zero cross detecting device.

7. A photosensitive material processor comprising:

at least one pair of rollers for conveying a photosensitive material to be processed with a processing liquid;

a driving device for driving electrically and rotating said at least one pair of rollers;

a controller which is capable of controlling the driving device so as to cause a gradual increase of output torque when said at least one pair of rollers has been started to rotate by the driving device, wherein the driving device includes a driving source which generates drive for driving and rotating said at least one pair of rollers in accordance with a supply of electric power, and wherein the driving source includes an alternating current motor to be driven by an alternating current, and the photosensitive material processor further comprises a zero-cross detector for detecting the zero-cross point of an alternating current voltage which is input as the electric power, and a setting device for setting an electric power supply time for each half cycle of the alternating current voltage at a time of starting the driving source, and the controller drives the driving source by changing a state repeatedly between a supply and a stop of an alternating current electric power based on a setting result of the setting device and a detection result of the zero-cross detector.

* * * * *